US00RE43004E

(19) United States
(12) Reissued Patent
DeGroot et al.

(10) Patent Number: US RE43,004 E
(45) Date of Reissued Patent: Dec. 6, 2011

(54) HIGH MELT STRENGTH POLYMERS AND METHOD OF MAKING SAME

(75) Inventors: Alexander W. DeGroot, Lake Jackson, TX (US); James C. Stevens, Richmond, TX (US); Sylvie Y. Desjardins, Lake Jackson, TX (US); Jeffrey Weinhold, Lake Jackson, TX (US); Edmund Carnahan, Pearland, TX (US); David Gillespie, Pearland, TX (US); Daniel D. VanderLende, Sugarland, TX (US)

(73) Assignee: Dow Global Technologies LLC, Midland, MI (US)

(21) Appl. No.: 12/604,940

(22) Filed: Oct. 23, 2009

Related U.S. Patent Documents

Reissue of:
(64) Patent No.: 7,300,983
Issued: Nov. 27, 2007
Appl. No.: 10/920,485
Filed: Aug. 17, 2004

U.S. Applications:
(62) Division of application No. 10/100,687, filed on Mar. 15, 2002, now Pat. No. 6,875,816.

(60) Provisional application No. 60/276,719, filed on Mar. 16, 2001.

(51) Int. Cl.
*C08L 23/08* (2006.01)
*C08L 23/10* (2006.01)

(52) U.S. Cl. ..... 525/240; 525/236; 525/242

(58) Field of Classification Search ..... 525/240, 525/236, 242
See application file for complete search history.

(56) References Cited

U.S. PATENT DOCUMENTS

| | | | | |
|---|---|---|---|---|
| 3,984,610 | A | 10/1976 | Elston | |
| 4,500,648 | A | 2/1985 | Malpass | |
| 4,530,914 | A | 7/1985 | Ewen et al. | |
| 4,532,052 | A * | 7/1985 | Weaver et al. | 507/222 |
| 4,752,597 | A | 6/1988 | Turner | |
| 4,851,489 | A | 7/1989 | Malpass | |
| 4,935,474 | A | 6/1990 | Ewen et al. | |
| 4,937,299 | A | 6/1990 | Ewen et al. | |
| 4,939,217 | A | 7/1990 | Stricklen | |
| 5,047,485 | A | 9/1991 | DeNicola, Jr. | |
| 5,055,438 | A | 10/1991 | Canich | |
| 5,057,475 | A | 10/1991 | Canich et al. | |
| 5,064,802 | A | 11/1991 | Stevens et al. | |
| 5,096,867 | A | 3/1992 | Canich | |
| 5,132,380 | A | 7/1992 | Stevens et al. | |
| 5,272,236 | A | 12/1993 | Lai et al. | |
| 5,324,800 | A | 6/1994 | Welborn, Jr. et al. | |
| 5,470,811 | A | 11/1995 | Jejelowo et al. | |
| 5,530,072 | A | 6/1996 | Shirodkar | |
| 5,631,069 | A * | 5/1997 | Wooster et al. | 428/220 |
| 5,665,800 | A | 9/1997 | Lai et al. | |
| 5,685,128 | A | 11/1997 | Chum et al. | |
| 5,703,180 | A | 12/1997 | Tsutsui et al. | |
| 5,703,187 | A | 12/1997 | Timmers | |
| 5,783,638 | A | 7/1998 | Lai et al. | |
| 5,792,534 | A * | 8/1998 | deGroot et al. | 428/36.92 |
| 5,795,941 | A * | 8/1998 | Cree et al. | 525/240 |
| 5,849,823 | A * | 12/1998 | Kale et al. | 524/232 |
| 5,852,152 | A | 12/1998 | Walton et al. | |
| 5,902,867 | A | 5/1999 | Muskens et al. | |
| 5,965,756 | A | 10/1999 | McAdon et al. | |
| 6,001,941 | A | 12/1999 | Tsutsui et al. | |
| 6,015,868 | A | 1/2000 | Nickias et al. | |
| 6,034,021 | A | 3/2000 | Wilson et al. | |
| 6,107,147 | A | 8/2000 | Kim et al. | |
| 6,114,457 | A | 9/2000 | Markel et al. | |
| 6,114,486 | A | 9/2000 | Rowland et al. | |
| 6,143,854 | A | 11/2000 | Bamberger et al. | |
| 6,147,180 | A | 11/2000 | Markel et al. | |
| 6,185,349 | B1 | 2/2001 | Dammert et al. | |
| 6,197,910 | B1 | 3/2001 | Weng et al. | |
| 6,207,606 | B1 | 3/2001 | Lue et al. | |
| 6,265,493 | B1 * | 7/2001 | Chung et al. | 525/247 |
| 6,277,931 | B1 | 8/2001 | Jaber et al. | |
| 6,346,575 | B1 | 2/2002 | Debras et al. | |
| 6,369,176 | B1 | 4/2002 | Laughner et al. | |

FOREIGN PATENT DOCUMENTS

| | | |
|---|---|---|
| EP | 0 773 257 A2 | 5/1997 |
| EP | 0773257 | 5/1997 |
| EP | 1 059 332 A1 | 6/1999 |
| EP | 1059332 | 12/2000 |
| WO | WO 97/48735 A1 | 12/1997 |
| WO | WO-9748735 | 12/1997 |
| WO | WO 00/50466 A1 | 8/2000 |
| WO | WO-0050466 | 8/2000 |
| WO | WO 01/14434 A1 | 3/2001 |
| WO | WO-0114434 | 3/2001 |

OTHER PUBLICATIONS

International Search Report, Jan. 24, 2003.

* cited by examiner

*Primary Examiner* — Nathan M Nutter

(57) ABSTRACT

A polymer composition that has a backbone chain; and a plurality of long chain branches connected to the backbone is described. The polymer composition also has a value of $[{}^{2}g'_{LCB}-{}^{1}g'_{LCB}]\,g'_{2_{LCB}}-g'_{1_{LCB}}$ that is less than about 0.22, where $[{}^{1}g'_{LCB}]\,g'_{2_{LCB}}$ is the long chain branching index for a fraction of the composition having a $M_w$ of 100,000 and $[{}^{2}g'_{LCB}]\,g'_{1_{LCB}}$ is the long chain branching index for a fraction of the composition having a $M_w$ of 500,000.

31 Claims, 3 Drawing Sheets

Log(Molecular Weight) g/mol

HIGH MELT STRENGTH POLYMERS AND METHOD OF MAKING SAME

Matter enclosed in heavy brackets [ ] appears in the original patent but forms no part of this reissue specification; matter printed in italics indicates the additions made by reissue.

PRIOR RELATED APPLICATIONS

This application is a divisional application of U.S. patent application Ser. No. 10/100,687, filed Mar. 15, 2002, now U.S. Pat. No. 6,875,816, which claims benefit of U.S. Provisional Patent Application No. 60/276,719, filed Mar. 16, 2001, each of which is incorporated by reference herein in its entirety.

FEDERALLY SPONSORED RESEARCH STATEMENT

Not applicable.

REFERENCE TO MICROFICHE APPENDIX

Not applicable.

FIELD OF THE INVENTION

This invention relates to polyolefins with improved properties and methods of making the polyolefins.

BACKGROUND OF THE INVENTION

Ethylene homopolymers and copolymers are a well-known class of olefin polymers from which various plastic products are produced. Such products include films, fibers, coatings, and molded articles, such as containers and consumer goods. The polymers used to make these articles are prepared from ethylene, optionally with one or more copolymerizable monomers. There are many types of polyethylene. For example, low density polyethylene ("LDPE") is generally produced by free radical polymerization and consists of highly branched polymers with long and short chain branches distributed throughout the polymer. However, films of LDPE have relatively low toughness, low puncture resistance, low tensile strength, and poor tear properties, compared to linear-low density polyethylene ("LLDPE"). Moreover, the cost to manufacture LDPE is relatively high because it is produced under high pressures (e.g., as high as 45,000 psi) and high temperatures. Most LDPE commercial processes have a relatively low ethylene conversion. As such, large amounts of unreacted ethylene must be recycled and repressurized, resulting in an inefficient process with a high energy cost.

A more economical process to produce polyethylene involves use of a coordination catalyst, such as a Ziegler-Natta catalyst, under low pressures. Conventional Ziegler-Natta catalysts are typically composed of many types of catalytic species, each having different metal oxidation states and different coordination environments with ligands. Examples of such heterogeneous systems are known and include metal halides activated by an organometallic co-catalyst, such as titanium chloride supported on magnesium chloride, activated with trialkyl aluminum. Because these systems contain more than one catalytic species, they possess polymerization sites with different activities and varying abilities to incorporate comonomer into a polymer chain. The consequence of such multi-site chemistry is a product with poor control of the polymer chain architecture, when compared to a neighboring chain. Moreover, differences in the individual catalyst site produce polymers of high molecular weight at some sites and low molecular weight at others, resulting in a polymer with a broad molecular weight distribution and a heterogeneous composition. Consequently, the molecular weight distribution of such polymers is fairly broad as indicated by $M_w/M_n$ (also referred to as polydispersity index or "PDI" or "MWD") Due to the heterogeneity of the composition, their mechanical and other properties are less desirable.

Recently, a new catalyst technology useful in the polymerization of olefins has been introduced. It is based on the chemistry of single-site homogeneous catalysts, including metallocenes which are organometallic compounds containing one or more cyclopentadienyl ligands attached to a metal, such as hafnium, titanium, vanadium, or zirconium. A co-catalyst, such as oligomeric methyl alumoxane, is often used to promote the catalytic activity of the catalyst. By varying the metal component and the substituents on the cyclopentadienyl ligand, a myriad of polymer products may be tailored with molecular weights ranging from about 200 to greater than 1,000,000 and molecular weight distributions from 1.0 to about 15. Typically, the molecular weight distribution of a metallocene catalyzed polymer is less than about 3, and such a polymer is considered as a narrow molecular weight distribution polymer.

The uniqueness of metallocene catalysts resides, in part, in the steric and electronic equivalence of each active catalyst molecule. Specifically, metallocenes are characterized as having a single, stable chemical site rather than a mixture of sites as discussed above for conventional Ziegler-Natta catalysts. The resulting system is composed of catalysts which have a singular activity and selectivity. For this reason, metallocene catalyst systems are often referred to as "single site" owing to their homogeneous nature. Polymers produced by such systems are often referred to as single site resins in the art.

With the advent of coordination catalysts for ethylene polymerization, the degree of long-chain branching in an ethylene polymer was substantially decreased, both for the traditional Ziegler-Natta ethylene polymers and the newer metallocene catalyzed ethylene polymers. Both, particularly the metallocene copolymers, are substantially linear polymers with a limited level of long chain branching or linear polymers. These polymers are relatively difficult to melt process when the molecular weight distribution is less than about 3.5. Thus, a dilemma appears to exist—polymers with a broad molecular weight distribution are easier to process but may lack desirable solid state attributes otherwise available from metallocene catalyzed copolymers. On the contrary, linear or substantially linear polymers catalyzed by a metallocene catalyst have desirable physical properties in the solid state but may nevertheless lack the desired processability when in the melt.

In blown film extrusion, the bubble stability is a relatively important process parameter. If the melt strength of the polymer is too low, the bubble is not stable and thus affects the film quality. Therefore, it is desirable to produce polymers with relatively high melt strength. For these reasons, there is a need for a polymer and polymerization processes which could produce a polymer with melt processing characteristics similar to or better than LDPE (i.e., high melt strength) while exhibiting solid state properties comparable to a metallocene-catalyzed polymer.

SUMMARY OF THE INVENTION

Embodiments of the invention provide a process of making a polymer comprising (a) contacting one or more olefinic monomers in the presence of at least a high molecular weight (HMW) catalyst and at least a low molecular weight (LMW) catalyst in a polymerization reactor system; and (b) effectuating the polymerization of the one or more olefinic monomers in the polymerization reactor system to obtain an olefin polymer, wherein the LMW catalyst has an $R_v^L$, defined as $$R_v^L = \frac{[\text{vinyl}]}{[\text{vinyl}] + [\text{vinylidene}] + [\text{cis}] + [\text{trans}]}$$

wherein [vinyl] is the concentration of vinyl groups in the olefin polymer produced by the low molecular weight catalyst expressed in vinyls/1,000 carbon atoms; [vinylidene], [cis] and [trans] are the concentration of vinylidene, cis and trans groups in the olefin polymer expressed in the number of the respective groups per 1,000 carbon atoms, of greater than 0.12, and wherein the HMW catalyst has a reactivity ratio, $r_1$ of about 5 or less. In other embodiments the low molecular weight catalyst has an $R_v^L$ value that is greater than about 0.45, or greater than about 0.50. The high molecular weight catalyst of some embodiments has a reactivity ratio, $r_1$ that is about 4 or less, or about 3 or less. Some processes of the invention comprises catalyst pairs in which the $R_v^L/R_v^H$ ratio is about 0.80 to about 1.40.

In some embodiments of the process the high molecular weight catalyst has an $R_v^H$ defined as $$R_v^H = \frac{[\text{vinyl}]}{[\text{vinyl}] + [\text{vinylidene}] + [\text{cis}] + [\text{trans}]}$$

wherein [vinyl] is the concentration of vinyl groups in the olefin polymer produced by the low molecular weight catalyst expressed in vinyls/1,000 carbon atoms; [vinylidene], [cis] and [trans] are the concentration of vinylidene, cis and trans groups in the olefin polymer expressed in the number of the respective groups per 1,000 carbon atoms, and wherein a ratio of $R_v^L/R_v^H$ ranges from 0.5 to about 2.0. In some processes [$R_v^L$] $R_v^H$ is greater than about 0.15, greater than about 0.20, greater than about 0.25, or greater than about 0.35.

Polymerization reactions may be carried out under continuous solution polymerization conditions, or as a slurry process. In some embodiments, the high molecular weight catalyst or the low molecular weight catalyst or a combination thereof are supported on an inert support. Some polymerization reactions may be performed in a polymerization reactor system includes a first reactor connected to a second reactor in parallel so that mixing occurs in a third reactor. In some processes, the HMW catalyst contacts the one or more olefin monomers in the first reactor to produce a first reactor product and the LMW catalyst contacts the first reactor product in the second reactor.

In some embodiments, the first reactor is connected to the second reactor in series and the HMW catalyst contacts the one or more olefin monomers in the first reactor to produce a first reactor product and the LMW catalyst contacts the first reactor product in the second reactor. In other processes, the HMW catalyst, the LMW catalyst, and the one or more olefinic monomers are sequentially introduced into the polymerization reactor system.

Other embodiments of the invention disclose a polymer composition. In some embodiments the polymer composition comprises (a) a backbone chain and (b) a plurality of long chain branches connected to the backbone; wherein the value of [$^2g'_{LCB}$-$^1g'_{LCB}$] $g'_{2_{LCB}}$-$g'_{1_{LCB}}$ of less than 0.22, where [$^1g'_{LCB}$] $g'_{2_{LCB}}$ is the long chain branching index for a fraction of the composition having a $M_w$ of 100,000 and [$^2g'_{LCB}$] $g'_{1_{LCB}}$ is the long chain branching index for a fraction of the composition having a $M_w$ of 500,000.

Some polymer compositions herein comprise (a) a high molecular weight (HMW), branched component and (b) a low molecular weight (LMW), branched component wherein the composition is substantially free of short chain branches characteristic of LDPE and characterized by a melt strength (MS) that satisfies the following relationship:

$$MS \geq \frac{x}{I_2} + y$$

where x is greater than or equal to about 12.5 and y is greater than or equal to about 3 are described.

In other embodiments, polymers comprise (a) a high molecular weight (HMW), branched component; and (b) a low molecular weight (LMW), branched component wherein the composition is substantially free of short chain branches characteristic of LDPE and characterized by a melt strength (MS) that satisfies the melt strength formula described above where x is greater than or equal to about 3 and y is greater than or equal to about 4.5 and have a molecular weight distribution of greater than 3.

In some embodiments, the disclosed polymers have a melt strength that follows the formula wherein x is greater or equal to than about 12.5 and y is greater than or equal to about 4.5. In other embodiments x is greater than about 15 and y is greater than or equal to about 4.5. Still other compositions have a melt strength that is greater than the formula x is greater than or equal to about 20 and y is greater than or equal to about 7.5. In other embodiments the melt strength follows the formula wherein x is greater than about 5 and y is greater than or equal to about 4.5, wherein x is greater than about 7.5 and y is greater than or equal to about 4.5, or wherein x is greater than about 9.5 and y is greater than or equal to about 7.

Some polymers have a value of [$^2g'_{LCB}$-$^1g'_{LCB}$] $g'_{2_{LCB}}$-$g'_{1_{LCB}}$ is less than or equal to about 0.20, less than or equal to 0.15, or less than or equal to 0.12. Some such polymers follow one or more of the above described melt strength relationships, while others may not. Additionally some compositions have a molecular weight distribution from greater than 3.0 to about 12.0. In some embodiments the molecular weight distribution of the composition includes a high molecular weight (HMW) component and a low molecular weight (LMW) component. In some compositions, the HMW component, the LMW component, or both have a molecular weight distributions of about 1.5 to about 4.0. In some embodiments, the polymers include a HMW component with a molecular weight distribution of less than about 3.0 and a LMW component has a molecular weight distribution of less than about 3.0 In some embodiments, the composition includes a HMW component and a LMW component that have substantially equal amounts of comonomer incorporation. Some embodiments other the disclosed compositions have a ratio of the molecular weight of the HMW component to the molecular weight of the LMW component, $M_w^H/M_w^L$, that is greater than about 10. The HMW component may comprise from greater than 0% to about 50% by weight of the total composition and the LMW component comprises from about 50% by weight to less than about 100% by weight of the total composition. Preferably, the HMW component comprises from greater than 1% to about 10% by weight of the total composition and the LMW component comprises from about 90% by weight to about 99% by weight of the total composition. In other embodiments, the HMW component comprises from greater than 2% to about 5% by weight of the total composition and the LMW component comprises from about 95% by weight to about 98% by weight of the total composition.

In some embodiments, the composition has a HMW component that has a $M_w$ greater than about 300,000 g/mol while the LMW component, in some compositions has a $M_w$ less than about 200,000. Other compositions may have a HMW component or LMW component greater or less than these values. Some compositions are characterized by a degree of separation, DOS, of about 5 or higher while others have a DOS of about 20 or higher, 50 or higher, or 100 or higher. Still other compositions may be characterized by a DOS of 1000 or higher, 10,000 or higher, or 50000 or higher.

The polymers described herein may be used for a variety of purposes. Some polymers may be used as films, such as sealant film layers, shrink films, laminating films and stretch films. Some polymers are used as fibers, wires, cables, moldings, or coatings, including rotomoldings and extrusion coatings. Some compositions can be used as pipes, profiles, carpet backings, liners, and sacks, such as grocery sacks. Some polymers are useful as bags or pouches, including bags and pouches made by form-fill-seal (FFS) equipment. Some pouches are also fabricated using form-fill-seal (FFS) equipment, including vertical form-fill-seal units.

DESCRIPTION OF EMBODIMENTS OF THE INVENTION

Figure 1:
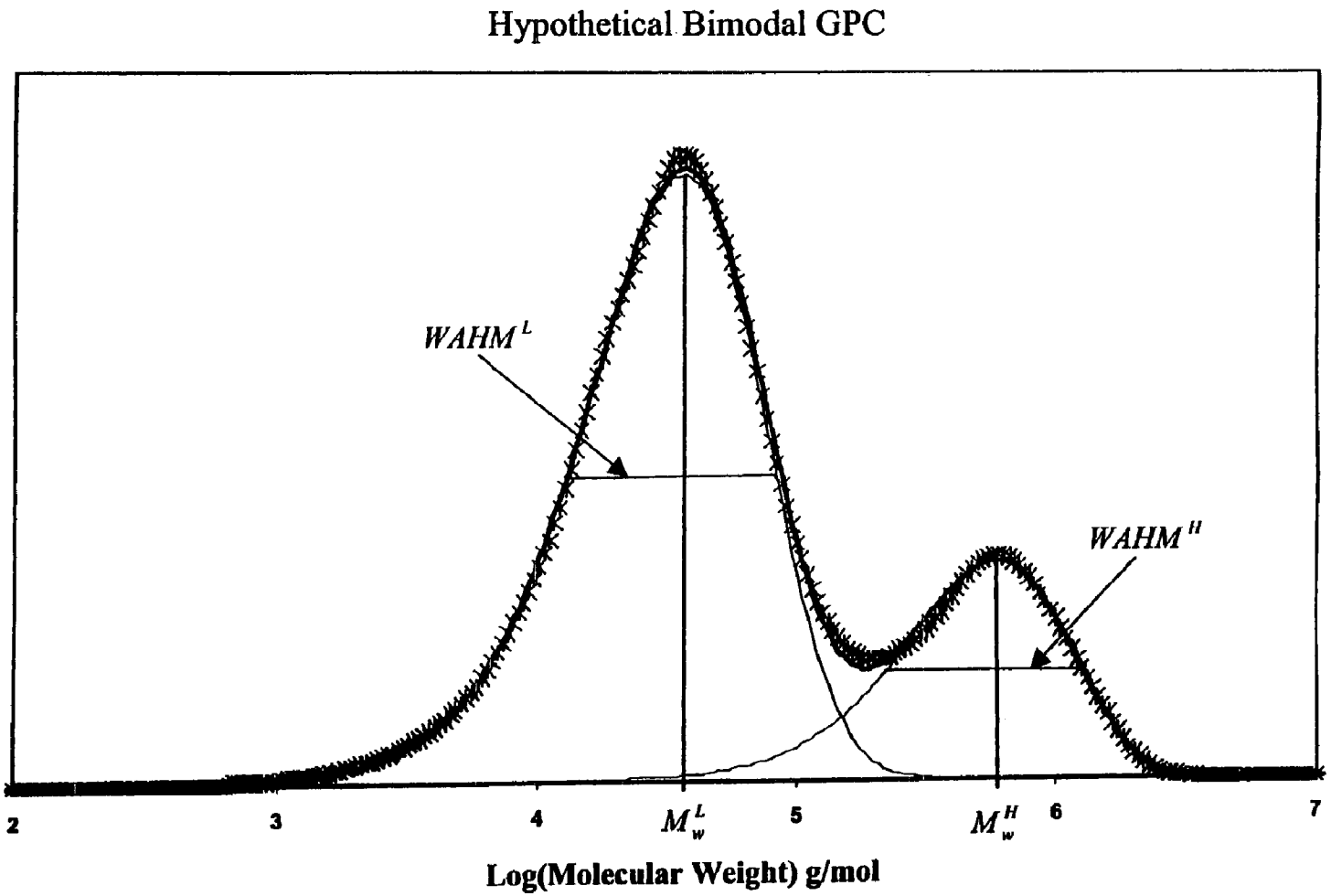
FIG. 1 is an imaginary GPC curve illustrating a bimodal molecular weight distribution.

In the following description, all numbers disclosed herein are approximate values, regardless whether the word "about" or "approximately" is used in connection therewith. They may vary by up to 1%, 2%, 5%, or sometimes 10 to 20%. Whenever a numerical range with a lower limit, $R_L$, and an upper limit $R_U$, is disclosed, any number R falling within the range is specifically disclosed. In particular, the following numbers R within the range are specifically disclosed: $R=R_L+k*(R_U-R_L)$, wherein k is a variable ranging from 1% to 100% with a 1% increment, i.e. k is 1%, 2%, 3%, 4%, 5%, . . . , 50%, 51%, 52%, . . . , 95%, 96%, 97%, 98%, 99%, or 100%. Moreover, any numerical range defined by two numbers, R, as defined in the above is also specifically disclosed.

Embodiments of the invention provide polymer compositions with relatively high melt strength. In some embodiments, a polymer composition with relatively high melt strength comprises: (a) a high molecular weight, branched component and (b) a low molecular weight, branched component wherein the composition is substantially free of short chain branches characteristic of LDPE and characterized by a melt strength (MS) that satisfies the following relationship:

$$MS \geq \frac{x}{I_2} + y \quad \text{(I)}$$

where $I_2$ is the melt index, x is greater than or equal to 12.5, and y is greater than or equal to 3. In some embodiments, the value for x in (I) is greater than about 14, greater than about 16, greater than about 20, greater than about 25, or greater than about 30 and the value of y, in some embodiments, is about 4.5, about 5.0, about 6.0, or about 7.0. In other embodiments, the melt strength is greater than or equal to formula (I) when x is 35 or 40 or y is about 8, about 10, about 15, or about 20.

Some embodiments provide polymer composition comprising: (a) a backbone chain and (b) a plurality of long chain branches connected to the backbone wherein the composition has a value of $[g'_2-g'_1]\,g'_{2_{LCB}}-g'_{1_{LCB}}$ of less than or equal to 0.22, where $[g'_1]\,g'_{2_{LCB}}$ is the branching index for a fraction of the composition having a $M_w$ of 100,000 and the $[g'_2]\,g'_{1_{LCB}}$ is the branching index for a fraction of the composition having a $M_w$ of 500,000.

In some embodiments, polymers are characterized by a melt strength (MS) that satisfies the following relationship:

$$MS \geq \frac{x}{I_2} + y \quad \text{(II)}$$

where $I_2$ is the melt index, x is greater than or equal to about 3, and y is greater than or equal to about 4.5 and a molecular weight distribution of greater than 3. In some embodiments, the value for x in (II) is greater than about 5, greater than about 7, greater than about 10, greater than about 12.5, or greater than about 15 and the value of y, in some embodiments, is about 5.0, about 6.0, or about 7.0. In other embodiments, the melt strength is greater than or equal to formula (II) when x is 35 or 40 or y is about 8, about 10, about 15, or about 20. In still other embodiments, the melt strength may satisfy a formula where x is greater than about any of about 14, about 16, about 20, greater than about 25, or about 30 and the value of y, in some embodiments, is about 4.5, about 5.0, about 6.0, or about 7.0.

Some polymers are characterized by a melt strength (MS) that satisfies the following relationship:

$$MS \geq \frac{x}{I_2} + y \quad \text{(III)}$$

where x is greater than or equal to about 3 and y is greater than or equal to about 4.5 and a molecular weight distribution of greater than 3.

While certain embodiments possess some polymeric properties that are similar to properties of LDPE (for example, melt strength), the novel polymers described in the invention can be distinguished from LDPE in a number of ways. One example of the differences between the novel polymers described herein and LDPE is the nature of the short-chain branching. Because LDPE is prepared by radical polymerization in high pressure reactors, the short-chain branches are of varying and characteristic lengths. For example, a typical LDPE with a total of 6-20 methyl groups per thousand carbon atoms contains 2-3% methyl, 31-37% ethyl, about 2% propyl, 34-37% butyl, 11-13% amyl (pentyl) as well as longer branches. The ethyl branches are mostly present as 1,3 (predominantly racemic) ethyls, or 1,3-ethyls with one ethyl group on a quaternary carbon; isolated ethyls are rare, as are hexyl groups. These distinctive branching patterns are the result of back-biting of radicals generated during the LDPE polymerization mechanism.

Thus, the novel interpolymers described herein are characterized as being substantially free of short-chain branching characteristic of LDPE. The term "substantially free of short chain branching characteristic of LDPE" means the following. For olefin polymers that do not contain 1-heptene as a (co)monomer, the level of pentyl (otherwise known as amyl) branches is less than 0.30 pentyl branches per 1,000 total carbon atoms. For olefin polymers that contain 1-heptene (co)monomer (which produces pentyl branches from insertion of the 1-heptene) but does not contain 1-hexene (co) monomer, the level of butyl branches is less than 0.6 butyl branches per 1,000 total carbon atoms. For olefin polymers that contain 1-heptene (co)monomer (which produces pentyl branches from insertion of the 1-heptene) as well as 1-hexene (co)monomer (which produces butyl branches from insertion of the 1-hexene), the level of ethyl branches is less than 0.6 ethyl branches per 1,000 total carbon atoms. For olefin polymers that contain 1-heptene (co)monomer (which produces pentyl branches from insertion of the 1-heptene) as well as 1-hexene (co)monomer (which produces butyl branches from insertion of the 1-hexene), as well as 1-butene (co)monomer (which produces ethyl branches from insertion of the 1-butene), the level of propyl branches is less than 0.03 propyl branches per 1,000 total carbon atoms.

It should be understood that one can make blends comprising the polymers according to the embodiments of the invention and other polymers, including LDPE. Therefore, it should be understood that the NMR test to determine if a polymer is "substantially free of short chain branching characteristic of LDPE" should be conducted on the polymer before producing the blend with LDPE.

The polymers described herein also differ from LDPE in that they have a relatively narrow molecular weight distribution and a controlled long-chain branch structure; on the other hand, they differ from a typical metallocene catalyzed polymer in that their processability is better. Thus, certain of the interpolymers bridge the gap between LDPE and currently available metallocene catalyzed polymers.

The term "polymer" as used herein refers to a macromolecular compound prepared by polymerizing monomers of the same or a different type. A polymer refers to homopolymers, copolymers, terpolymers, interpolymers, and so on. The term "interpolymer" used herein refers to polymers prepared by the polymerization of at least two types of monomers or comonomers. It includes, but is not limited to, copolymers (which usually refers to polymers prepared from two different monomers or comonomers), terpolymers (which usually refers to polymers prepared from three different types of monomers or comonomers), and tetrapolymers (which usually refers to polymers prepared from four different types of monomers or comonomers), and the like.

The term "bimodal" as used herein means that the MWD in a GPC curve exhibits two component polymers wherein one component polymer may even exist as a hump, shoulder or tail relative to the MWD of the other component polymer. Of course, in some embodiments, a "bimodal molecular weight distribution" may be deconvoluted with the freedom to fit more than two peaks. In some embodiments, the term "bimodal" does not include multimodal polymers, such as LDPE.

FIG. 1 illustrates an imaginary bimodal MWD and the low molecular weight and high molecular weight components derived from the deconvolution. After deconvolution, the peak width at half maxima (WAHM) and the average molecular weight ($M_w$) of each component can be obtained. Then the degree of separation ("DOS") between the two components can be calculated by the following equation:

$$\mathrm{DOS} = \frac{M_w^H - M_w^L}{\mathrm{WAHM}^H + \mathrm{WAHM}^L} \qquad \text{(IV)}$$

wherein $M_w^H$ and $M_w^L$ are the respective weight average molecular weight of the HMW component and the LMW component; and $\mathrm{WAHM}^H$ and $\mathrm{WAHM}^L$ are the respective peak width at the half maxima of the deconvoluted molecular weight distribution curve for the HMW component and the LMW component. The DOS for the new composition is about 0.01 or higher. In some embodiments, DOS is higher than about 0.05, 0.1, 0.5, or 0.8. Preferably, DOS for the bimodal components is at least about 1 or higher. For example, DOS is at least about 1.2, 1.5, 1.7, 2.0, 2.5, 3.0, 3.5, 4.0, 4.5, or 5.0. In some embodiments, DOS is between about 5.0 to abut 100, between about 100 to 500, or between about 500 to 1,000. It should be noted that DOS can be any number in the above range. In other embodiments, DOS exceeds 1,000 or even 10,000 to 25,000 or 50,000.

In some embodiments the HMW component and the LMW component are distinct. The term "distinct" as used herein in reference to the molecular weight distribution of the LMW component and the HMW component means the DOS is greater than 1.0 and there is no substantial overlapping of the two corresponding molecular weight distributions in the resulting GPC curve. That is, each molecular weight distribution is sufficiently narrow and their average molecular weights are sufficiently different that the MWD of both components substantially exhibits a baseline on its high molecular weight side as well as on its low molecular weight side.

In some embodiments, even where the HMW component and LMW component have a large DOS or are distinct, the overall MWD of the composition is still relatively narrow. In some embodiments, the MWD of the overall composition is about 3.0, about 3.5 about 4.0 or about 5.0. In other embodiments the overall MWD may be greater than about 6.0, about 8, about 10, or about 12. Some compositions may have an overall MWD greater than about 15 or 20.

One factor that influences the overall MWD is the difference between the molecular weights of the HMW component and the LMW component. In some embodiments, the ratio of the molecular weights of the HMW component and the LMW component, $M_w^H/M_w^L$ may be about 1.5, about 2.0, about 3.0 or greater than about 4.0, about 6.0, or about 8.0. Preferably $M_w^H/M_w^L$ is greater than about 10. Generally, the ratio, $M_w^H/M_w^L$, is in the range from about 12 to about 60, preferably in the range from about 15 to about 40, still more preferably from about 15 to about 30, and most preferably from about 15 to about 20. In other embodiments, the ratio $M_w^H/M_w^L$ can be greater than 60 (e.g., 70, 80, 90, or even 100), but it is generally less preferred.

Another factor that can have a substantial effect on the overall MWD is the "polymer split" of the composition. A "polymer split" is defined as the weight fraction of the high molecular weight polymer component in a polymer composition. The relative fraction of the high and low molecular weight components are determined from the deconvoluted GPC peak. Compositions with a split of 1% to 50% are preferred. Some compositions have a split of about 1.5, about 2.0 or about 2.5 wt. %. Other compositions have a split of about 3 wt. %, about 5 wt. %, about 10 wt. %, or about 15 wt. %. Still others have a split of about 20 wt. %, about 30 wt. %, or about 45 wt. %.

The interpolymers produced in accordance with some embodiments of the invention have relatively high levels of long chain branches ("LCB"). Long chain branching is formed in the novel interpolymers disclosed herein by reincorporation of vinyl-terminated polymer chains. As such, the distribution of the length of the LCBs correspond to the molecular weight distribution of vinyl-terminated polymer molecules within the polymer sample. Long-chain branches for the purposes of this invention represent the branches formed by reincorporation of vinyl-terminated macromers, not the branches formed by incorporation of the comonomers. The number of carbon atoms on the long chain branches ranges from a chain length of at least one carbon more than two carbons less than the total number of carbons in the comonomer to several thousands. For example, a long chain branch of an ethylene/octene substantially linear ethylene interpolymer is at least seven (7) carbons in length (i.e., 8 carbons less 2 equals 6 carbons plus one equals seven carbons long chain branch length). The level of LCBs refers to the number of long chain branches per 1000 carbon atoms. Typically, the level of LCBs in the interpolymers is about 0.02 branch/1000 carbons or higher. Some interpolymers may have about 0.05 to 1 LCB/1000 carbons, or even 0.05 to about 3 LCBs/1000 carbons, whereas other interpolymers may have about 0.1 LCBs/1000 carbons to about 10 LCBs/1000 carbons. Still other interpolymers may have LCB exceeding 10/1000 carbons. Preferably, the level of long chain branching is 0.05 to about 10, although higher levels of LCB may have some beneficial effects. For example, an ethylene interpolymer with LCBs is observed to possess improved processability, such as shear thinning and delayed melt fracture, as described in U.S. Pat. No. 5,272,236. It is expected that a higher level of LCB in an interpolymer may further improve the processability and melt strength.

For certain of the embodiments of the invention, the polymers can be described as having a "comb-like" LCB structure. For the purposes of this invention, a "comb-like" LCB structure refers to the presence of significant levels of polymer molecules having a relatively long backbone and having a plurality of long chain branches which are relatively short compared to the length of the backbone. LCB's that generally are less than about one third of the length of the polymer backbone on average are considered to be relatively short for the purposes of this invention. For example, a polymer comprising individual molecules having a backbone of about 5,000 carbons on average and 3 long chain branches of about 500 carbons each on average would have a "comb-like" structure.

Various methods are known for determining the presence of long chain branches. For example, long chain branching can be determined for some of the inventive interpolymers disclosed herein by using $^{13}C$ nuclear magnetic resonance (NMR) spectroscopy and to a limited extent, e.g. for ethylene homopolymers and for certain copolymers, and it can be quantified using the method of Randall, (Journal of Macromolecular Science, Rev. Macromol. Chem. Phys., C29 (2&3), p. 285-297). Although conventional $^{13}C$ nuclear magnetic resonance spectroscopy cannot determine the length of a long chain branch in excess of about six carbon atoms, there are other known techniques useful for quantifying or determining the presence of long chain branches in ethylene polymers, such as ethylene/1-octene interpolymers. For those interpolymers wherein the $^{13}C$ resonances of the comonomer overlap completely with the $^{13}C$ resonances of the long-chain branches, either the comonomer or the other monomers (such as ethylene) can be isotopically labeled so that the LCB can be distinguished from the comonomer. For example, a copolymer of ethylene and 1-octene can be prepared using $^{13}C$-labeled ethylene. In this case, the LCB resonances associated with macromer incorporation will be significantly enhanced in intensity and will show coupling to neighboring $^{13}C$ carbons, whereas the octene resonances will be unenhanced.

The branching index may also be used to quantify the degree of long chain branching in a selected thermoplastic polymer. The branching index g' is defined by the following equation:

$$g' = \left.\frac{IV_{Br}}{IV_{Lin}}\right|_{M_w} \tag{V}$$

where g' is the branching index, $IV_{Br}$ is the intrinsic viscosity of the branched thermoplastic polymer (e.g., polypropylene) and $IV_{Lin}$ is the intrinsic viscosity of the corresponding linear thermoplastic polymer having the same weight average molecular weight and molecular weight distribution as the branched thermoplastic polymer and, in the case of copolymers and terpolymers, substantially the same relative molecular proportion or proportions of monomer units. For the purposes, the molecular weight and molecular weight distribution are considered "the same" if the respective values for the branched polymer and the corresponding linear polymer are within 10% of each other. Preferably, the molecular weights are the same and the MWD of the polymers are within 10% of each other. Intrinsic viscosity, in the formula above, in its most general sense is a measure of the capacity of a polymer molecule to enhance the viscosity of a solution. This depends on both the size and the shape of the dissolved polymer molecule. Hence, in comparing a nonlinear polymer with a linear polymer of substantially the same weight average molecular weight, it is an indication of configuration of the nonlinear polymer molecule. Indeed, the above ratio of intrinsic viscosities is a measure of the degree of branching of the nonlinear polymer. A method for determining intrinsic viscosity of polyethylene is described in Macromolecules, 2000, 33, 7489-7499. In this specification the intrinsic viscosity in each instance is determined with the polymer dissolved in [decahydronaphthalene] *trichlorobenzene* at 135° C. Another method for measuring the intrinsic viscosity of a polymer is ASTM D5225-98—Standard Test Method for Measuring Solution Viscosity of Polymers with a Differential Viscometer, which is incorporated by reference herein in its entirety.

The branching index. g' is inversely proportional to the amount of branching. Thus, lower values for g' indicate relatively higher amounts of branching. The amounts of short and long chain branching each contribute to the branching index according to the formula: $g'=g'_{LCB}\times g'_{SCB}$. Thus, the branching index due to long chain branching may be calculated from the experimentally determined value for g' as described by Scholte, et al. in J. App. Polymer Sci., 29, 3763-3782 (1984), incorporated herein by reference. Preferably, the weight averaged long chain branching index $g'_{LCB}$ of the composition is less than about 0.9, 0.8, 0.7, 0.6 or 0.5. In some embodiments, the branching index is in the range from about 0.01 to about 0.4.

In some embodiments $g'_{LCB}$ is substantially uniform across the polymer composition. In some embodiments, substantially uniform across the polymer composition means that the value of $g'_{LCB}$ of the HMW component and the value of $g'_{LCB}$ for the LMW component are substantially equal. Alternatively, in some embodiments a substantially uniform long chain branching index may also be determined by measuring the branching index for two different weight fractions of the polymer composition. In such embodiments, the first weight fraction has a molecular weight, $M_w$, of 100,000 and the second fraction has a molecular weight, $M_w$, of 500,000. In the case, the polymer does not have a significant fraction with $M_w$ of 500,000, the branching index of the fraction may be determined by preparing a polymer using the same catalysts at conditions that produce a suitable amount of a fraction having a $M_w$ of 500,000. The long chain branching index of this fraction is determined and attributed the polymer lacking the 500,000 fraction. One skilled in the art knows how increase high molecular weight fractions in a polymerization process. One method for obtaining such fractions is by preparative GPC techniques. For the purposes of branching indices, the terms "substantially equal" and "substantially uniform" mean that the difference between the weight average long chain branching indices is less than or equal to about 0.22. In some embodiments, the difference in the long chain branching indices is less than or equal to about 0.21, about 0.20, about 0.18, or about 0.15. In other embodiments the difference is less than or equal to about 0.13, about 0.12, about 0.10, about 0.05, or about 0.02.

In some embodiments, high levels of branching in the HMW component may be desirable. Thus, in some embodiments, the weight average branching index [$g'_{LCB}$] $g'_{1_{LCB}}$ for the HMW component is less than 0.95, 0.93, or 0.90. In other embodiments the [$g'_{LCB}$] $g'_{1_{LCB}}$ for the HMW component, is less than 0.88, 0.85 or 0.83. In some embodiments, the LMW component may have a high degree of branching. The weight average branching index [$g'_{LCB}$] $g'_{2_{LCB}}$ for the LMW component is less than 0.95, 0.93, or 0.90. In other embodiments the [$g'_{LCB}$] $g'_{2_{LCB}}$ for the HMW component, is less than 0.88, 0.85 or 0.83.

Two other useful methods for quantifying or determining the presence of long chain branches in ethylene polymers, such as ethylene/1-octene interpolymers, are gel permeation chromatography coupled with a low angle laser light scattering detector (GPC-LALLS) and GPC-FTIR as described by Rudin, A., Modern Methods of Polymer Characterization, John Wiley & Sons, New York (1991) pp. 103-112 and Markel, E. J., et al. Macromolecules, 2000, 33, 8541-48 (2000), the disclosures of both of which are incorporated by reference.

Alternatively, the amount of long chain branching in the LMW component may be determined by comparing the deconvoluted LMW peak to polymerization models for single-site catalysts. These models are reported by Soares and Hamielec, Macromol. Theory Simul., 5, pp 547-572 (1996) and Costeux et al., accepted to Macromolecules (2002), incorporated herein by reference in its entirety. After deconvolution, the number and weight average molecular weights of the LMW component are calculated and LCBs/1000 carbons can then be determined by $$\text{LCBs/1000C}=(7000/M_n^L)((M_n^L/M_n^L)-2)$$

The molecular weight averages are determined from GPC with a light scattering detector to properly account for long chain branching and comonomer. Since all of the polymer segments under the low molecular weight peak originate from the low molecular weight catalyst, the comonomer distribution will be constant throughout the low molecular weight peak. Therefore, the presence of comonomer does not complicate the analysis.

The amount of long chain branching can also be determined by fitting the predicted molecular weight distribution to the deconvoluted LMW peak. The first step of this approach is to determine the probabilities of branching and termination based on input values of the molecular weight of the low molecular weight component, [$M_{wL}$] $M_w^L$ and LCBs/1000 carbons. The experimentally determined peak due to the LMW component is compared to a summation of the equation:

$$w(M) = \sum_y w(M, y) \tag{VII}$$

over a range of branch contents, y.

Adjusting the value of $M_n^L$ will shift the predicted molecular weight distribution so that its peak will occur at the same molecular weight as the experimental data's peak. For low molecular weight catalysts that incorporate long chain branches, the width of the predicted molecular weight distribution will only match the breadth of the experimental peak if the input LCBs/1000 carbons is greater than zero.

In some embodiments, polymers having relatively high melt strength have a relatively higher degree of long chain branching in the high molecular weight component. For instance, some polymers have a high molecular weight component that has an average of greater than about 2 branches per polymer chain. Other embodiments may have an average of greater than about 3, about 4, or about 5 branches per chain in the high molecular weight fraction. Still other polymers may have a high molecular weight component with an average of greater than about 6, about 8, or about 10 branches. In some embodiments, the number of branches on the high molecular weight component may be even higher.

The formation of long chain branching depends on a number of factors, including but not limited to, monomer (or comonomer) concentration, reactor temperature, pressure, polymer concentration, and catalyst(s) used. Generally, a higher level of long chain branching may be obtained when a polymerization reaction is operated at a higher temperature, a lower comonomer concentration, a higher polymer concentration, and using catalysts which can generate a relatively high percentage of vinyl end groups and have relatively high comonomer incorporation ability (i.e., lower $r_1$). Conversely, a lower level of long chain branching may be obtained when a polymerization reaction is operated at a lower temperature, a higher comonomer concentration, a lower polymer concentration, and using catalysts which can generate a relatively low percentage of vinyl end groups and have relatively low comonomer incorporation ability (i.e., higher $r_1$).

The polymer composition may be made by a variety of methods. Tailored polymers with desirable properties can be prepared by controlling the distribution and nature of long-chain branching between the high molecular weight component(s) and the low molecular weight component(s) of the polymer produced using more than one catalyst in the novel process described herein. For example, a suitable process comprises: (a) contacting one or more olefinic monomers in the presence of at least a high molecular weight (HMW) catalyst and at least a low molecular weight (LMW) catalyst in a polymerization reactor system and (b) effectuating the polymerization of the one or more olefinic monomers in the polymerization reactor system to obtain an olefin polymer, wherein the LMW catalyst has an $R_v$, defined as $$R_v = \frac{[\text{vinyl}]}{[\text{vinyl}] + [\text{vinylidene}] + [\text{cis}] + [\text{trans}]} \quad \text{(VIII)}$$

wherein [vinyl] is the concentration of vinyl groups in the olefin polymer produced by the low molecular weight catalyst expressed in vinyls/1,000 carbon atoms; [vinylidene], [cis] and [trans] are the concentration of vinylidene, cis and trans groups in the olefin polymer expressed in the number of the respective groups per 1,000 carbon atoms, of greater than 0.12, and wherein the HMW catalyst has a reactivity ratio, $r_1$ of about 5 or less. Preferably, the high molecular weight catalyst and the low molecular weight catalyst have the ability to incorporate a substantially similar amount of comonomers.

The process described herein may be employed to prepare any olefin polymers, including but not limited to, ethylene/propylene, ethylene/1-butene, ethylene/1-hexene, ethylene/4-methyl-1-pentene, ethylene/styrene, ethylene/propylene/styrene, and ethylene/1-octene copolymers, isotactic polypropylene/1-butene, isotactic polypropylene/1-hexene, isotactic polypropylene/1-octene, terpolymers of ethylene, propylene and a non-conjugated diene, i.e., EPDM terpolymers, as well as homopolymers of ethylene, propylene, butylene, styrene, etc.

Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_{2-20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_{1-20}$ hydrocarbyl or cyclohydrocarbyl groups. Also included are mixtures of such olefins as well as mixtures of such olefins with $C_{4-40}$ diolefin compounds.

Examples of olefin monomers include, but are not limited to ethylene, propylene, isobutylene, 1-butene, 1-pentene, 1-hexene, 1-heptene, 1-octene, 1-nonene, 1-decene, and 1-dodecene, 1-tetradecene, 1-hexadecene, 1 -octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_{4-40}$ dienes, including but not limited to 1,3-butadiene, 1,3-pentadiene, 1,4-hexadiene, 1,5-hexadiene, 1,7-octadiene, 1,9-decadiene,, other $C_{4-40}$ α-olefins, and the like. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The novel processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be advantageously prepared by following the teachings herein. Optionally, copolymers comprising ethylene, styrene and a $C_{3-20}$ alpha olefin, optionally comprising a $C_{4-20}$ diene, having improved properties over those presently known in the art can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

In the process, a high molecular weight catalyst is defined relative to a low molecular weight catalyst. A high weight molecular weight catalyst refers to a catalyst which produces a polymer with a high weight-average molecular weight $M_w^H$ from the monomers and any comonomers of choice under a set of given polymerization conditions, whereas a low molecular weight catalyst refers to a catalyst which produces a polymer with a low weight average molecular weight [$M_{wL}$] $M_w^L$ from the same monomers and comonomers under substantially the same polymerization conditions. Therefore, the terms "low molecular weight catalyst" and "high molecular weight catalyst" used herein do not refer to the molecular weight of a catalyst; rather, they refer to a catalyst's ability to make a polymer with a low or high molecular weight. The intrinsic molecular weight differences in the polymer produced by the chosen high and low molecular weight catalysts produces "polymer split" of the composition.

Thus, a high molecular weight catalyst and a low molecular weight catalyst are determined with reference to each other. One does not know whether a catalyst is a high molecular weight catalyst or a low molecular weight catalyst until after another catalyst is also selected. Therefore, the terms "high molecular weight" and "low molecular weight" used herein when referring to a catalyst are merely relative terms and do not encompass any absolute value with respect to the molecular weight of a polymer. After a pair of catalysts selected, one can easily ascertain which one is the high molecular weight catalyst by the following procedure: 1) select at least one monomer which can be polymerized by the chosen catalysts; 2) make a polymer from the selected monomer(s) in a single reactor containing one of the selected catalysts under preselected polymerization conditions; 3) make another polymer from the same monomer(s) in a single reactor containing the other catalyst under substantially the same polymerization conditions; and 4) measure the melt index $I_2$ for the respective interpolymers. The catalyst that yields a lower $I_2$ is the higher molecular weight catalyst. Conversely, the catalyst that yields a high $I_2$ is the lower molecular weight catalyst. Using this methodology, it is possible to rank a plurality of catalysts based on the molecular weight of the polymers they can produce under substantially the same conditions. As such, one may select three, four, five, six, or more catalysts according their molecular weight capability and use these catalysts simultaneously in a single polymerization reactor to produce polymers with tailored structures and properties.

In some embodiments, the high molecular weight catalysts and the low molecular weight catalysts are selected such that they have the ability to incorporate a substantially similar amount of comonomers in the polymer. In other words, under substantially the same conditions of temperature, pressure, and monomer content (including comonomer concentration), each catalyst incorporates substantially the same mole percentage of comonomers into the resulting interpolymer. One way to quantify "substantially the same" or "substantially similar" mole percentage of comonomers is as follows: where a first catalyst incorporates less than 5 mole % of comonomers under a set of polymerization conditions, a second catalyst incorporates the same mole percentage of comonomers within 2 mole %. For example, if the first catalyst incorporates 4 mole % 1-octene in an ethylene-1-octene copolymerization, then the second catalyst would exhibit substantially the same comonomer incorporation if it yields an interpolymer with about 2.0 mole % to about 6.0 mole % octene under substantially the same polymerization conditions of temperature, pressure, comonomer concentration, and comonomer type. For a catalyst with about 5 mole % to about 10 mole % comonomer incorporation, the range for "substantially the same comonomer incorporation" for a second catalyst is within 3 mole % of the comonomer incorporation. For a catalyst, with about 10 mole % to about 20 mole %, the range for "substantially the same comonomer incorporation" would be within 4 mole %. For a catalyst which incorporates 20 mole % or higher comonomers, the range for "substantially the same comonomer incorporation" for another catalyst would be within 6 mole %.

For the case of an olefin homopolymer, two catalysts are considered to have "substantially the same comonomer incorporation" if the two catalysts, under reaction conditions equivalent to the conditions used to make a homopolymer but differing in that if 1-octene is used as a comonomer in an amount such that one of the catalysts produces a 1.0 mole % octene copolymer, the other catalyst produces a 1-octene copolymer with the same mole % octene within 0.75 mole %. For the special case of a 1-octene homopolymer, 1-decene is used as the comonomer.

Preferably, for all of the ethylene homopolymers and interpolymers described immediately above, at least two of the catalysts used in a single reactor have substantially the same comonomer incorporation, and the process used is a gas phase, slurry, or solution process. More preferably, for all of the ethylene homopolymers and interpolymers described immediately above, at least two of the catalysts used in a single reactor have substantially the same comonomer incorporation, $M_w^H/M_w^L$ is in the range from about 10 to about 50, and the process used is a continuous solution process, especially a continuous solution process wherein the polymer concentration in the reactor at steady state is at least 15% by weight of the reactor contents and the ethylene concentration is 3.5% or less by weight of the reactor contents. Still more preferably, the process used is a continuous solution process wherein the polymer concentration in the reactor at steady state is at least 18% by weight of the reactor contents and the ethylene concentration is 2.5% or less by weight of the reactor contents. Most preferably, for all of the ethylene homopolymers and interpolymers described immediately above, at least two of the catalysts used in a single reactor have substantially the same comonomer incorporation, and the process used is a continuous solution process wherein the polymer concentration in the reactor at steady state is at least 20% by weight of the reactor contents and the ethylene concentration is 2.0% or less by weight of the reactor contents. For all of the ethylene homopolymers and interpolymers described immediately above, preferably the interpolymers comprise an interpolymer of ethylene and at least one olefin selected from the group consisting of $C_3$-$C_{10}$ alpha olefins, especially propylene, 1-butene, 1-hexene, and 1-octene, and the melt index of the interpolymer is preferably in the range of about 0.1 to about 500, more preferably in the range from about 0.1 to about 100.

Comonomer incorporation can be measured by many techniques that are known in the art. One technique which may be employed is $^{13}C$ NMR spectroscopy, an example of which is described for the determination of comonomer content for ethylene/alpha-olefin copolymers in Randall (Journal of Macromolecular Science, Reviews in Macromolecular Chemistry and Physics, C29 (2 & 3), 201-317 (1989)), the disclosure of which is incorporated herein by reference. The basic procedure for determining the comonomer content of an olefin interpolymer involves obtaining the $^{13}C$ NMR spectrum under conditions where the intensity of the peaks corresponding to the different carbons in the sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomer. The mole % comonomer can be determined by the ratio of the integrals corresponding to the number of moles of comonomer to the integrals corresponding to the number of moles of all of the monomers in the interpolymer, as described in Randall, for example.

It is known in the art that catalysts for olefin polymerization can change in their ability to incorporate comonomers under different reaction conditions, especially at different reactor temperatures. For example, it is known that the ability of most single-site and metallocene catalysts to incorporate higher alpha olefins in an ethylene/alpha olefin copolymerization decreases with increasing polymerization temperature. In other words, the reactivity ratio $r_1$ generally increases with increasing polymerization temperature.

The reactivity ratios of the metallocenes in general are obtained by known methods, for example, as described in "Linear Method for Determining Monomer Reactivity Ratios in Copolymerization", M. Fineman and S. D. Ross, J. Polymer Science 5, 259 (1950) or "Copolymerization", F. R. Mayo and C. Walling, Chem. Rev. 46, 191 (1950) incorporated herein in its entirety by reference. For example, to determine reactivity ratios the most widely used copolymerization model is based on the following equations:

$$M_1^* + M_1 \xrightarrow{K_{11}} M_1^* \quad (1)$$

$$M_1^* + M_2 \xrightarrow{K_{12}} M_2^* \quad (2)$$

$$M_2^* + M_1 \xrightarrow{K_{21}} M_1^* \quad (3)$$

$$M_2^* + M_2 \xrightarrow{K_{22}} M_2^* \quad (4)$$

where $M_i$ refers to a monomer molecule which is arbitrarily designated as "i" where i=1, 2; and $M_2^*$ refers to a growing polymer chain to which monomer i has most recently attached.

The $k_{ij}$ values are the rate constants for the indicated reactions. For example, in ethylene/propylene copolymerization, $k_{11}$ represents the rate at which an ethylene unit inserts into a growing polymer chain in which the previously inserted monomer unit was also ethylene. The reactivity ratios follow as: $r_1=k_{11}/k_{12}$ and $r_2=k_{22}/k_{21}$ wherein $k_{11}$, $k_{12}$, $k_{22}$ and $k_{21}$ are the rate constants for ethylene (1) or propylene (2) addition to a catalyst site where the last polymerized monomer is an ethylene ($k_{1X}$) or propylene ($k_{2X}$).

Because the change in $r_1$ with temperature may vary from catalyst to catalyst, it should be appreciated that the term "substantially the same comonomer incorporation" refers to catalysts which are compared at the same or substantially the same polymerization conditions, especially with regard to polymerization temperature. Thus, a pair of catalysts may not possess "substantially the same comonomer incorporation" at a low polymerization temperature, but may possess "substantially the same comonomer incorporation" at a higher temperature, and visa versa. For the purposes of this invention, "substantially the same comonomer incorporation" refers to catalysts which are compared at the same or substantially the same polymerization temperature. Because it is also known that different cocatalysts or activators can have an effect on the amount of comonomer incorporation in an olefin copolymerization, it should be appreciated that "substantially the same comonomer incorporation" refers to catalysts which are compared using the same or substantially the same cocatalyst(s) or activator(s). Thus, for the purposes of this invention, a test to determine whether or not two or more catalysts have "substantially the same comonomer incorporation" should be conducted with each catalyst using the same method of activation for each catalyst, and the test should be conducted at the same polymerization temperature, pressure, and monomer content (including comonomer concentration) as is used in the instant inventive process when the individual catalysts are used together.

When a low molecular weight catalyst with $r_1^L$ and a high molecular weight catalyst with $r_1^H$ are selected, the $r_1$ ratio, $r_1^H/r_1^L$, is another way to define the amount of comonomer incorporation by the low and high molecular weight catalysts. To have substantially similar or the same comonomer incorporation in some embodiments of the invention, the ratio, $r_1^H/r_1^L$, preferably should fall between about 0.2 to about 5, more preferably between about 0.25 to about 4, and most preferably between about 0.3 to about 3.5. In some embodiments, substantially similar or the same comonomer incorporation is obtained when the ratio, $r_1^H/r_1^L$, approaches about 1 (i.e., from about 0.9 to about 1.1).

Although $r_1$ may be any value, it preferably should be about 18 or less. For example, $r_1$ may be about 15, 10, 5, or 1. Generally, a lower $r_1$ indicates a higher comonomer incorporation ability for the catalyst. Conversely, a higher $r_1$ generally indicates a lower comonomer incorporation ability for the catalyst (i.e., a higher tendency to make a homopolymer). Therefore, if one desires to make a copolymer with a minimal density split, it would be preferable to use at least two catalysts with substantially similar or identical $r_1$, each of which is less than 18. On the other hand, when one desires to make a blend of homopolymers and copolymers with a significant density split, it would be preferable to employ at least two catalysts with substantially dissimilar $r_1$, at least one of which may be higher than 18.

As described above, while it is preferred to select a high molecular weight catalyst and a lower molecular weight catalyst with substantially similar comonomer incorporation capability, catalysts with different or substantially dissimilar comonomer incorporation capability may be used in embodiments of the invention. When two catalysts have substantially similar comonomer incorporation capability, the interpolymer produced has a minimal density split, i.e., minimal density variations from one polymer chain to another. In contrast, when two catalysts have different or substantially dissimilar comonomer incorporation capability, the interpolymer produced by those two catalysts has a substantial density split. Such density split has a direct impact on the physical characteristics of the interpolymer. Generally, for many applications it is more desirable to produce an interpolymer with a minimal density split.

Catalysts:

Any catalyst which is capable of copolymerizing one or more olefin monomers to make an interpolymer or homopolymer may be used in embodiments of the invention. For certain embodiments, additional selection criteria, such as molecular weight capability and/or comonomer incorporation capability, preferably should be satisfied. Suitable catalysts include, but are not limited to, single-site catalysts (both metallocene catalysts and constrained geometry catalysts), multi-site catalysts (Ziegler-Natta catalysts), and variations therefrom. They include any known and presently unknown catalysts for olefin polymerization. It should be understood that the term "catalyst" as used herein refers to a metal-containing compound which is used, along with an activating cocatalyst, to form a catalyst system. The catalyst, as used herein, is usually catalytically inactive in the absence of a cocatalyst or other activating technique. However, not all suitable catalyst are catalytically inactive without a cocatalyst and thus requires activation.

One suitable class of catalysts is the constrained geometry catalysts disclosed in U.S. Pat. No. 5,064,802, No. 5,132,380, No. 5,703,187, No. 6,034,021, EP 0 468 651, EP 0 514 828, WO 93/19104, and WO 95/00526, all of which are incorporated by references herein in their entirety. Another suitable class of catalysts is the metallocene catalysts disclosed in U.S. Pat. No. 5,044,438; No. 5,057,475; No. 5,096,867; and No. 5,324,800, all of which are incorporated by reference herein in their entirety. It is noted that constrained geometry catalysts may be considered as metallocene catalysts, and both are sometimes referred to in the art as single-site catalysts.

For example, catalysts may be selected from the metal coordination complexes corresponding to the formula:

Formula I

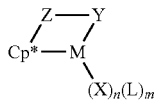

wherein: M is a metal of group 3, 4-10, or the lanthanide series of the periodic table of the elements; Cp* is a cyclopentadienyl or substituted cyclopentadienyl group bound in an $\eta^5$ bonding mode to M; Z is a moiety comprising boron, or a member of group 14 of the periodic table of the elements, and optionally sulfur or oxygen, the moiety having up to 40 non-hydrogen atoms, and optionally Cp* and Z together form a fused ring system; X independently each occurrence is an anionic ligand group, said X having up to 30 non-hydrogen atoms; n is 2 less than the valence of M when Y is anionic, or 1 less than the valence of M when Y is neutral; L independently each occurrence is a neutral Lewis base ligand group, said L having up to 30 non-hydrogen atoms; m is 0, 1, 2, 3, or 4; and Y is an anionic or neutral ligand group bonded to Z and M comprising nitrogen, phosphorus, oxygen or sulfur and having up to 40 non-hydrogen atoms, optionally Y and Z together form a fused ring system.

Suitable catalysts may also be selected from the metal coordination complex corresponds to the formula:

Formula II

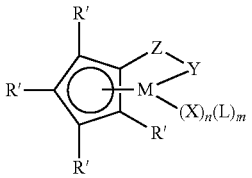

wherein R' each occurrence is independently selected from the group consisting of hydrogen, alkyl, aryl, silyl, germyl, cyano, halo and combinations thereof having up to 20 non-hydrogen atoms; X each occurrence independently is selected from the group consisting of hydride, halo, alkyl, aryl, silyl, germyl, aryloxy, alkoxy, amide, siloxy, and combinations thereof having up to 20 non-hydrogen atoms; L independently each occurrence is a neural Lewis base ligand having up to 30 non-hydrogen atoms; Y is —O—, —S—, —NR*—, —PR*—, or a neutral two electron donor ligand selected from the group consisting of OR*, SR*, $NR^*_2$, $PR^*_2$; M, n, and m are as previously defined; and Z is $SIR^*_2$, $CR^*_2$, $SiR^*_2SiR^*_2$, $CR^*_2CR^*_2$, CR*═CR*, $CR^*_2SiR^*_2$, $GeR^*_2$, BR*, $BR^*_2$; wherein: R* each occurrence is independently selected from the group consisting of hydrogen, alkyl, aryl, silyl, halogenated alkyl, halogenated aryl groups having up to 20 non-hydrogen atoms, and mixtures thereof, or two or more R* groups from Y, Z, or both Y and Z form a fused ring system.

It should be noted that whereas formula I and the following formulas indicate a monomeric structure for the catalysts, the complex may exist as a dimer or higher oligomer.

Further preferably, at least one of R', Z, or R* is an electron donating moiety. Thus, highly preferably Y is a nitrogen or phosphorus containing group corresponding to the formula —N(R"")—or—P(R"")—, wherein R"" is $C_{1-10}$ alkyl or aryl, i.e., an amido or phosphido group.

Additional catalysts may be selected from the amidosilane- or amidoalkanediyl-compounds corresponding to the formula:

Formula III

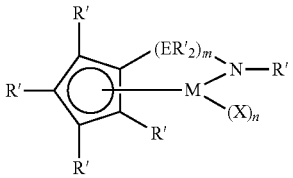

wherein: M is titanium, zirconium or hafnium, bound in an $\eta^5$ bonding mode to the cyclopentadienyl group; R' each occurrence is independently selected from the group consisting of hydrogen, silyl, alkyl, aryl and combinations thereof having up to 10 carbon or silicon atoms; E is silicon or carbon; X independently each occurrence is hydride, halo, alkyl, aryl, aryloxy or alkoxy of up to 10 carbons; m is 1 or 2; and n is 1 or 2 depending on the valence of M.

Examples of the above metal coordination compounds include, but are not limited to, compounds in which the R' on the amido group is methyl, ethyl, propyl, butyl, pentyl, hexyl, (including isomers), norbornyl, benzyl, phenyl, etc.; the cyclopentadienyl group is cyclopentadienyl, indenyl, tetrahydroindenyl, fluorenyl, octahydrofluorenyl, etc.; R' on the foregoing cyclopentadienyl groups each occurrence is hydrogen, methyl, ethyl, propyl, butyl, pentyl, hexyl, (including isomers), norbornyl, benzyl, phenyl, etc.; and X is chloro, bromo, iodo, methyl, ethyl, propyl, butyl, pentyl, hexyl, (including isomers), norbornyl, benzyl, phenyl, etc.

Specific compounds include, but are not limited to, (tert-butylamido)(tetramethyl-$\eta^5$-cyclopentadienyl)-1,2-ethanediylzirconium dimethyl, (tert-butylamido) (tetramethyl-$\eta^5$-cyclo penta dienyl)-1,2-ethanediyltitanium dimethyl, (methylamido) (tetramethyl-$\eta^5$-cyclopenta dienyl)-1,2-ethanediylzirconium dichloride, (methylamido) (tetramethyl-$\eta^5$-eyelopenta dienyl)-1,2-ethane diyltitanium dichloride, (ethylamido)(tetramethyl-$\eta^5$-cyclopentadienyl) methylenetitanium dichloro, (tertbutylamido)diphenyl(tetramethyl-$\eta^5$-cyclopentadienyl)-silane zirconium dibenzyl, (benzylamido)dimethyl-(tetramethyl-$\eta^5$-cyclopentadienyl) ilanetitaniumdichloride, phenylphosphido)dimethyl(tetramethyl-$\eta^5$-cyclopentadienyl) silane zirconium dibenzyl, and the like.

Another suitable class of catalysts is substituted indenyl containing metal complexes as disclosed in U.S. Pat. No. 5,965,756 and No. 6,015,868 which are incorporated by reference herein in their entirety. Other catalysts are disclosed in copending applications: U.S. application Ser. No. 09/230,185; and Ser. No. 09/715,380, and U.S. Provisional Application Ser. No. 60/215,456; No. 60/170,175, and No. 60/393,862. The disclosures of all of the preceding patent applications are incorporated by reference herein in their entirety. These catalysts tend to have a higher molecular weight capability.

One class of the above catalysts is the indenyl containing metal wherein:

Formula IV

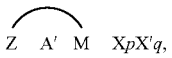

M is titanium, zirconium or hafnium in the +2, +3 or +4 formal oxidation state;

A' is a substituted indenyl group substituted in at least the 2 or 3 position with a group selected from hydrocarbyl, fluoro-substituted hydrocarbyl, hydrocarbyloxy-substituted hydrocarbyl, dialkylamino-substituted hydrocarbyl, silyl, germyl and mixtures thereof, the group containing up to 40 non-hydrogen atoms, and the A' further being covalently bonded to M by means of a divalent Z group; Z is a divalent moiety bound to both A' and M via σ-bonds, the Z comprising boron, or a member of Group 14 of the Periodic Table of the Elements, and also comprising nitrogen, phosphorus, sulfur or oxygen; X is an anionic or dianionic ligand group having up to 60 atoms exclusive of the class of ligands that are cyclic, delocalized, π-bound ligand groups; X' independently each occurrence is a neutral Lewis base, having up to 20 atoms; p is 0, 1 or 2, and is two less than the formal oxidation state of M, with the proviso that when X is a dianionic ligand group, p is 1; and q is 0, 1 or 2.

The above complexes may exist as isolated crystals optionally in pure form or as a mixture with other complexes, in the form of a solvated adduct, optionally in a solvent, especially an organic liquid, as well as in the form of a dimer or chelated derivative thereof, wherein the chelating agent is an organic material, preferably a neutral Lewis base, especially a trihydrocarbylamine, trihydrocarbylphosphine, or halogenated derivative thereof.

Preferred catalysts are complexes corresponding to the formula:

Formula V

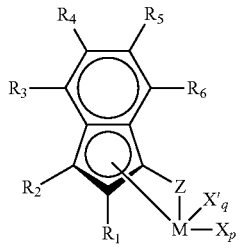

wherein $R_1$ and $R_2$ independently are groups selected from hydrogen, hydrocarbyl, perfluoro substituted hydrocarbyl, silyl, germyl and mixtures thereof, the group containing up to 20 non-hydrogen atoms, with the proviso that at least one of $R_1$ or $R_2$ is not hydrogen; $R_3$, $R_4$, $R_5$, and $R_6$ independently are groups selected from hydrogen, hydrocarbyl, perfluoro substituted hydrocarbyl, silyl, germyl and mixtures thereof, the group containing up to 20 non-hydrogen atoms; M is titanium, zirconium or hafnium; Z is a divalent moiety comprising boron, or a member of Group 14 of the Periodic Table of the Elements, and also comprising nitrogen, phosphorus, sulfur or oxygen, the moiety having up to 60 non-hydrogen atoms; p is 0, 1 or 2; q is zero or one; with the proviso that: when p is 2, q is zero, M is in the +4 formal oxidation state, and X is an anionic ligand selected from the group consisting of halide, hydrocarbyl, hydrocarbyloxy, di(hydrocarbyl) amido, di(hydrocarbyl)phosphido, hydrocarbyl sulfido, and silyl groups, as well as halo-, di(hydrocarbyl)amino-, hydrocarbyloxy- and di(hydrocarbyl)phosphino-substituted derivatives thereof, the X group having up to 20 non-hydrogen atoms, when p is 1, q is zero, M is in the +3 formal oxidation state, and X is a stabilizing anionic ligand group selected from the group consisting of allyl, 2-(N,N-dimethylaminomethyl)phenyl, and 2-(N,N-dimethyl)-aminobenzyl, or M is in the +4 formal oxidation state, and X is a divalent derivative of a conjugated diene, M and X together forming a metallocyclopentene group, and when p is 0, q is 1, M is in the +2 formal oxidation state, and X' is a neutral, conjugated or non-conjugated diene, optionally substituted with one or more hydrocarbyl groups, the X' having up to 40 carbon atoms and forming a π-complex with M.

More preferred catalysts are complexes corresponding to the formula:

Formula VI

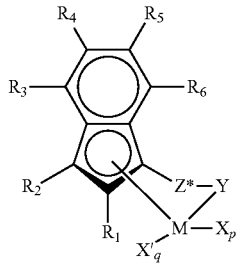

wherein: $R_1$ and $R_2$ are hydrogen or $C_{1-6}$ alkyl, with the proviso that at least one of $R_1$ or $R_2$ is not hydrogen; $R_3$, $R_4$, $R_5$, and $R_6$ independently are hydrogen or $C_{1-6}$ alkyl; M is titanium; Y is—O—, —S—, —NR*—, —PR*—; Z* is $SiR^*_2$, $CR^*_2$, $SiR^*_2SiR^*_2$, $CR^*_2CR^*_2$, $CR^*{=}CR^*$, $CR^*_2SiR^*_2$, or $GeR^*_2$; R* each occurrence is independently hydrogen, or a member selected from hydrocarbyl, hydrocarbyloxy, silyl, halogenated alkyl, halogenated aryl, and combinations thereof, the R* having up to 20 non-hydrogen atoms, and optionally, two R* groups from Z (when R* is not hydrogen), or an R* group from Z and an R* group from Y form a ring system; p is 0, 1 or 2; q is zero or one; with the proviso that: when p is 2, q is zero, M is in the +4 formal oxidation state, and X is independently each occurrence methyl or benzyl, when p is 1, q is zero, M is in the +3 formal oxidation state, and X is 2-(N,N-dimethyl)aminobenzyl; or M is in the +4 formal oxidation state and X is 1,4-butadienyl, and when p is 0, q is 1, M is in the +2 formal oxidation state, and X' is 1,4-diphenyl-1,3-butadiene or 1,3-pentadiene. The latter diene is illustrative of unsymmetrical diene groups that result in production of metal complexes that are actually mixtures of the respective geometrical isomers.

Examples of specific catalysts that may be used in embodiments of the invention include, but are not limited, the following metal complexes:

2-methylindenyl Complexes:

(t-butylamido)dimethyl($\eta^5$-2-methylindenyl)silanetitanium (II) 1,4-diphenyl-1,3-butadiene; (t-butylamido) dimethyl ($\eta^5$-2-methylindenyl)silanetitanium (II) 1,3-pentadiene; (t-butylamido) dimethyl($\eta^5$-2-methylindenyl)silanetitanium (III) 2-(N,N-dimethylamino)benzyl; (t-butylamido) dimethyl($\eta^5$-2-methylindenyl)silanetitanium (IV)dimethyl; (t-butylamido)dimethyl($\eta^5$-2-methylindenyl)silanetitanium (IV) dibenzyl; (n-butylamido)dimethyl($\eta^5$-2-methylindenyl) silanetitanium (II) 1,4-diphenyl-1,3-butadiene; (n-butylamido)dimethyl($\eta^5$-2-methylindenyl) silanetitanium (II) 1,3-pentadiene; (n-butylamido)dimethyl($\eta^5$-2-methylindenyl)silanetitanium (III) 2-(N,N-dimethylamino)benzyl; (n-butylamido)dimethyl($\eta^5$-2-methylindenyl)silanetitanium (IV) dimethyl; (n-butylamido)dimethyl($\eta^5$-2-methylindenyl)silanetitanium (IV) dibenzyl; (cyclododecylamido)dimethyl($\eta^5$-2-methylindenyl)silanetitanium (II) 1,4-diphenyl-1,3-butadiene; (cyclododecylamido)dimethyl($\eta^5$-2-methylindenyl)silanetitanium (II) 1,3-pentadiene, (cyclododecylamido)dimethyl($\eta^5$-2-methylindenyl)silanetitanium (III) 2-(N,N-dimethylamino)benzyl; (cyclododecylamido)dimethyl($\eta^5$-2-methylindenyl)silanetitanium (IV) dimethyl; (cyclododecylamido)dimethyl($\eta^5$-2-methylindenyl)silanetitanium (IV) dibenzyl; (2,4,6-trimethylanilido)dimethyl($\eta^5$-2-methylindenyl) silanetitanium (II) 1,4-diphenyl-1,3-butadiene; (2,4,6-trimethylanilido)dimethyl($\eta^5$-2-methylindenyl) silanetitanium (II) 1,3-pentadiene; (2,4,6-trimethylanilido)dimethyl($\eta^5$-2-methylindenyl) silanetitanium (III) 2-(N,N-dimethylamino)benzyl; (2,4,6-trimethylanilido)dimethyl($\eta^5$-2-methylindenyl) silanetitanium (IV)dimethyl; (2,4,6-trimethylanilido) dimethyl($\eta^5$-2-methylindenyl)silanetitanium (IV) dibenzyl; (1-adamantylamido)dimethyl($\eta^5$-2-methylindenyl)silanetitanium (II) 1,4-diphenyl-1,3-butadiene; (1-adamantylamido)dimethyl($\eta^5$-2-methylindenyl)silanetitanium (II) 1,3-pentadiene; (1-adamantylamido)dimethyl($\eta^5$-2-methylindenyl)silanetitanium (III) 2-(N,N-dimethylamino)benzyl; (1-adamantylamido)dimethyl($\eta^5$-2-methylindenyl)silane titanium (IV)dimethyl; (1-adamantylamido)dimethyl($\eta^5$-2-methylindenyl)silanetitanium (IV) dibenzyl; (t-butylamido)dimethyl($\eta^5$-2-methylindenyl)silanetitanium (II) 1,4-diphenyl-1,3-butadiene; (t-butylamido)dimethyl($\eta^5$-2-methylindenyl) silanetitanium (II) 1,3-pentadiene; (t-butylamido)dimethyl ($\eta^5$-2-methylindenyl)silanetitanium (III) 2-(N,N-dimethylamino)benzyl; (t-butylamido)dimethyl($\eta^5$-2-methylindenyl)silanetitanium (IV)dimethyl; (t-butylamido)dimethyl($\eta^5$-2-methyl indenyl)silanetitanium (IV) dibenzyl; (n-butylamido)diisopropoxy($\eta^5$-2-methylindenyl)silane titanium (II) 1,4-diphenyl-1,3-butadiene; (n-butylamido)diisopropoxy($\eta^5$-2-methylindenyl) silanetitanium (II) 1,3-pentadiene; (n-butylamido) diisopropoxy($\eta^5$-2-methylindenyl)silanetitanium (III) 2-(N,N-dimethylamino)benzyl; (n-butylamido)diisopropoxy($\eta^5$-2-methylindenyl)silanetitanium (IV)dimethyl; (n-butylamido)diisopropoxy($\eta^5$-2-methylindenyl)silanetitanium (IV) dibenzyl; (cyclododecylamido)diisopropoxy($\eta^5$-2-methylindenyl)-silanetitanium (II) 1,4-diphenyl-1,3-butadiene; (cyclododecylamido)diisopropoxy($\eta^5$-2-methylindenyl)-silanetitanium (II) 1,3-pentadiene; (cyclododecylamido)diisopropoxy($\eta^5$-2-methylindenyl)-silanetitanium (III) 2-(N,N-dimethylamino)benzyl; (cyclododecylamido)diisopropoxy($\eta^5$-2-methylindenyl)-silanetitanium (IV) dimethyl; (cyclododecylamido) diisopropoxy($\eta^5$-2-methylindenyl)-silanetitanium (IV) dibenzyl; (2,4,6-trimethylanilido)diisopropoxy($\eta^5$-2-methyl-indenyl)silanetitanium (II) 1,4-diphenyl-1,3-butadiene; (2,4,6-trimethylanilido)diisopropoxy($\eta^5$-2-methylindenyl)silanetitanium (II) 1,3-pentadiene; (2,4,6-trimethylanilido)diisopropoxy($\eta^5$-2-methylin-denyl) silanetitanium (III) 2-(N,N-dimethylamino)benzyl; (2,4,6-trimethylanilido) diisopropoxy($\eta^5$-2-methylindenyl) silanetitanium (IV)dimethyl; (2,4,6-trimethylanilido) diisopropoxy($\eta^5$-2-methylindenyl)silanetitanium (IV) dibenzyl; (1-adamantylamido)diisopropoxy($\eta^5$-2-methyl-indenyl)silanetitanium (II) 1,4-diphenyl-1,3-butadiene; (1-adamantylamido)diisopropoxy($\eta^5$-2-methylindenyl) silanetitanium (II) 1,3-pentadiene; (1-adamantylamido)diisopropoxy($\eta^5$-2-methylindenyl)silanetitanium (III) 2-(N,N-dimethylamino)benzyl; (1-adamantylamido) diisopropoxy($\eta^5$-2-methylindenyl)silanetitanium (IV) dimethyl; (1-adamantylamido)diisopropoxy($\eta^5$-2-methylindenyl)silanetitanium (IV) dibenzyl; (n-butylamido) dimethoxy($\eta^5$-2-methylindenyl)silanetitanium (II) 1,4-diphenyl-1,3-butadiene; (n-butylamido)dimethoxy($\eta^5$-2-methylindenyl)silanetitanium (II) 1,3-pentadiene; (n-butylamido)dimethoxy($\eta^5$-2-methylindenyl)silanetitanium (III) 2-(N,N-dimethylamino)benzyl; (n-butylamido) dimethoxy($\eta^5$-2-methylindenyl)silanetitanium (IV)dimethyl; (n-butylamido)dimethoxy($\eta^5$-2-methylindenyl) silanetitanium (IV) dibenzyl; (cyclododecylamido) dimethoxy($\eta^5$-2-methylindenyl)silanetitanium (II) 1,4-diphenyl-1,3-butadiene; (cyclododecylamido)dimethoxy ($\eta^5$-2-methylindenyl)silanetitanium (II) 1,3-pentadiene; (cyclododecylamido)dimethoxy($\eta^5$-2-methylindenyl)silanetitanium (III) 2-(N,N-dimethylamino)benzyl; (cyclododecylamido)dimethoxy($\eta^5$-2-methylindenyl)silanetitanium (IV)dimethyl; (cyclododecylamido)dimethoxy ($\eta^5$-2-methylindenyl)silanetitanium (IV) dibenzyl; (2,4,6-trimethylanilido)dimethoxy($\eta^5$-2-methylindenyl) silanetitanium (II) 1,4-diphenyl-1,3-butadiene; (2,4,6-trimethylanilido)dimethoxy($\eta^5$-2-methylindenyl) silanetitanium (II) 1,3-pentadiene; (2,4,6-trimethylanilido)dimethoxy($\eta^5$-2-methylindenyl) silanetitanium (III) 2-(N,N-dimethylamino)benzyl; (2,4,6-trimethylanilido)dimethoxy($\eta^5$-2-methylindenyl) silanetitanium (IV)dimethyl; (2,4,6-trimethylanilido) dimethoxy($\eta^5$-2-methylindenyl)silanetitanium (IV) dibenzyl; (1-adamantylamido)dimethoxy($\eta^5$-2-methylindenyl)silanetitanium (II) 1,4-diphenyl-1,3-butadiene; (1-adamantylamido)dimethoxy($\eta^5$-2-methylindenyl)silanetitanium (II) 1,3-pentadiene; (1-adamantylamido) dimethoxy($\eta^5$-2-methylindenyl)silanetitanium (III) 2-(N,N-dimethylamino)benzyl; (1-adamantylamido)dimethoxy ($\eta^5$-2-methylindenyl)silanetitanium (IV) dimethyl; (1-adamantylamido)dimethoxy($\eta^5$-2-methylindenyl)silanetitanium (IV) dibenzyl; (n-butylamido)ethoxymethyl ($\eta^5$-2-methylindenyl)silanetitanium (II) 1,4-diphenyl-1,3-butadiene; (n-butylamido)ethoxymethyl($\eta^5$-2-methylindenyl)silanetitanium (II) 1,3-pentadiene; (n-butylamido) ethoxymethyl($\eta^5$-2-methylindenyl)silanetitanium (III) 2-(N,N-dimethylamino)benzyl; (n-butylamido)ethoxymethyl($\eta^5$-2-methylindenyl)silanetitanium (IV)dimethyl; (n-butylamido)ethoxymethyl($\eta^5$-2-methylindenyl)silanetitanium (IV) dibenzyl; (cyclododecylamido)ethoxymethyl($\eta^5$-2-methylindenyl)silanetitanium (II) 1,4-diphenyl-1,3-butadiene; (cyclododecylamido) ethoxymethyl($\eta^5$-2-methylindenyl)silanetitanium (II) 1,3-pentadiene; (cyclododecylamido)ethoxymethyl($\eta^5$-2-methylindenyl)silanetitanium (III) 2-(N,N-dimethylamino) benzyl; (cyclododecylamido)ethoxymethyl($\eta^5$-2-methylindenyl)silanetitanium (IV)dimethyl; (cyclododecylamido)ethoxymethyl($\eta^5$-2-methylindenyl) silanetitanium (IV) dibenzyl; (2,4,6-trimethylanilido) ethoxymethyl($\eta^5$-2-methylindenyl)silanetitanium (II) 1,4-diphenyl-1,3-butadiene; (2,4,6-trimethylanilido) ethoxymethyl($\eta^5$-2-methylindenyl)silanetitanium (II) 1,3-pentadiene; (2,4,6-trimethylanilido)ethoxymethyl($\eta^5$-2-methylindenyl)silanetitanium (III) 2-(N,N-dimethylamino)benzyl; (2,4,6-trimethylanilido) ethoxymethyl($\eta^5$-2-methylindenyl)silanetitanium (IV) dimethyl; (2,4,6-trimethylanilido)ethoxymethyl($\eta^5$-2-methylindenyl)silanetitanium (IV) dibenzyl; (1-adamantylamido)ethoxymethyl($\eta^5$-2-methylindenyl) silanetitanium (II) 1,4-diphenyl-1,3-butadiene; (1-adamantylamido)ethoxymethyl($\eta^5$-2-methylindenyl)silanetitanium (II) 1,3-pentadiene; (1-adamantylamido) ethoxymethyl($\eta^5$-2-methylindenyl)silanetitanium (III) 2-(N,N-dimethylamino)benzyl; (1-adamantylamido) ethoxymethyl($\eta^5$-2-methylindenyl)silanetitanium (IV) dimethyl; (1-adamantylamido)ethoxymethyl($\eta^5$-2-methylindenyl)silanetitanium (IV) dibenzyl;

2,3-dimethylindenyl Complexes:

(t-butylamido)dimethyl($\eta^5$-2,3-dimethylindenyl)silanetitanium (II) 1,4-diphenyl-1,3-butadiene; (t-butylamido)dimethyl($\eta^5$-2,3-dimethylindenyl)silanetitanium (II) 1,3-pentadiene; (t-butylamido)dimethyl($\eta^5$-2,3-dimethylindenyl) silanetitanium (III) 2-(N,N-dimethylamino)benzyl; (t-butylamido)dimethyl($\eta^5$-2,3-dimethylindenyl)silanetitanium (IV)dimethyl; (t-butylamido)dimethyl($\eta^5$-2,3-dimethylindenyl)silanetitanium (IV) dibenzyl; (n-butylamido)dimethyl($\eta^5$-2,3-dimethylindenyl)-silanetitanium (II) 1,4-diphenyl-1,3-butadiene; (n-butylamido)dimethyl ($\eta^5$-2,3-dimethylindenyl)silanetitanium (II) 1,3-pentadiene; (n-butylamido)dimethyl($\eta^5$-2,3-dimethylindenyl)-silanetitanium (III) 2-(N,N-dimethylamino)benzyl; (n-butylamido)dimethyl($\eta^5$-2,3-dimethylindenyl)silanetitanium (IV)dimethyl; (n-butylamido)dimethyl($\eta^5$-2,3-dimethylindenyl)silanetitanium (IV) dibenzyl; (cyclododecylamido)dimethyl($\eta^5$-2,3-dimethylindenyl)silanetitanium (II) 1,4-diphenyl-1,3-butadiene; (cyclododecylamido) dimethyl ($\eta^5$-2,3-dimethylindenyl)silanetitanium (II) 1,3-pentadiene; (cyclododecylamido)dimethyl($\eta^5$-2,3-dimethylindenyl)silanetitanium (III) 2-(N,N-dimethylamino)

benzyl; (cyclododecylamido)dimethyl($\eta^5$-2,3-dimethylindenyl)silanetitanium (IV) dimethyl; (cyclododecylamido)dimethyl($\eta^5$-2,3-dimethylindenyl) silanetitanium (IV) dibenzyl; (2,4,6-trimethylanilido)dimethyl($\eta^5$-2,3-dimethyl-indenyl)silanetitanium (II) 1,4-diphenyl-1,3-butadiene; (2,4,6-trimethylanilido)dimethyl ($\eta^5$-2,3-dimethylindenyl)silanetitanium (II) 1,3-pentadiene; (2,4,6-trimethylanilido)dimethyl($\eta^5$-2,3-dimethylindenyl)silanetitanium (III) 2-(N,N-dimethylamino)benzyl; (2,4,6-trimethylanilido)dimethyl ($\eta^5$-2,3-dimethylindenyl)silanetitanium (IV)dimethyl; (2,4,6-trimethylanilido)dimethyl($\eta^5$-2,3-dimethylindenyl)silanetitanium (IV) dibenzyl; (1-adamantylamido) dimethyl($\eta^5$-2,3-dimethylindenyl)silanetitanium (II) 1,4-diphenyl-1,3-butadiene; (1-adamantylamido)dimethyl ($\eta^5$-2,3-dimethylindenyl)silanetitanium (II) 1,3-pentadiene; (1-adamantylamido)dimethyl($\eta^5$-2,3-dimethylindenyl)silanetitanium (III) 2-(N,N-dimethylamino)benzyl; (1-adamantylamido)dimethyl($\eta^5$-2,3-dimethylindenyl)silanetitanium (IV)dimethyl; (1-adamantylamido)dimethyl($\eta^5$-2,3-dimethylindenyl)silanetitanium (IV) dibenzyl; (t-butylamido)dimethyl($\eta^5$-2,3-dimethylindenyl)silanetitanium (II) 1,4-diphenyl-1,3-butadiene; (t-butyl amido)dimethyl($\eta^5$-2,3-dimethylindenyl)silanetitanium (II) 1,3-pentadiene; (t-butylamido)dimethyl($\eta^5$-2,3-dimethylindenyl)silanetitanium (III) 2-(N,N-dimethylamino)benzyl; (t-butyl amido)dimethyl($\eta^5$-2,3-dimethylindenyl)silanetitanium (IV)dimethyl; (t-butylamido)dimethyl($\eta^5$-2,3-dimethylindenyl)silanetitanium (IV) dibenzyl; (n-butylamido)diisopropoxy($\eta^5$-2,3-dimethylindenyl)silanetitanium (II) 1,4-diphenyl-1,3-butadiene; (n-butylamido)diisopropoxy($\eta^5$-2,3-dimethylindenyl)silanetitanium (II) 1,3-pentadiene; (n-butylamido)diisopropoxy($\eta^5$-2,3-dimethylindenyl)silanetitanium (III) 2-(N,N-dimethylamino)benzyl; (n-butylamido)diisopropoxy($\eta^5$-2,3-dimethylindenyl)silanetitanium (IV)dimethyl; (n-butylamido)diisopropoxy($\eta^5$-2,3-dimethylindenyl)silanetitanium (IV)dibenzyl; (cyclododecylamido)diisopropoxy($\eta^5$-2,3-dimethylindenyl)-silanetitanium (II) 1,4-diphenyl-1,3-butadiene; (cyclododecylamido)diisopropoxy($\eta^5$-2,3-dimethylindenyl)-silanetitanium (II) 1,3-pentadiene; (cyclododecylamido) diisopropoxy($\eta^5$-2,3-dimethylindenyl)-silanetitanium (III) 2-(N,N-dimethylamino)benzyl; (cyclododecylamido) diisopropoxy($\eta^5$-2,3-dimethylindenyl)-silanetitanium (IV)dimethyl; (cyclo dodecylamido)diisopropoxy($\eta^5$-2,3-dimethylindenyl)-silanetitanium (IV) dibenzyl; (2,4,6-trimethylanilido)diisopropoxy($\eta^5$-2,3-dimethyl-indenyl)silanetitanium (II) 1,4-diphenyl-1,3-butadiene; (2,4,6-trimethylanilido)diisopropoxy($\eta^5$-2,3-dimethylindenyl) silanetitanium (II) 1,3-pentadiene; (2,4,6-trimethylanilido)diisopropoxy($\eta^5$-2,3-dimethylin-denyl) silanetitanium (III) 2-(N,N-dimethylamino)benzyl; (2,4,6-trimethylanilido)diisopropoxy($\eta^5$-2,3-dimethylindenyl) silanetitanium (IV)dimethyl; (2,4,6-trimethylanilido) diisopropoxy($\eta^5$-2,3-dimethylindenyl)silanetitanium (IV) dibenzyl; (1-adamantylamido)diisopropoxy($\eta^5$ -2,3-dimethylindenyl)silanetitanium (II) 1,4-diphenyl-1,3-butadiene; (1-adamantylamido)diisopropoxy($\eta^5$-2,3-dimethylindenyl)silanetitanium (II) 1,3-pentadiene; (1-adamantylamido)diisopropoxy($\eta^5$-2,3-dimethylindenyl)silanetitanium (III) 2-(N,N-dimethylamino)benzyl; (1-adamantylamido)diisopropoxy($\eta^5$-2,3-dimethylindenyl)silanetitanium (IV)dimethyl; (1-adamantylamido)diisopropoxy($\eta^5$-2,3-dimethylindenyl)silanetitanium (IV) dibenzyl; (n-butylamido)dimethoxy($\eta^5$-2,3-dimethyl indenyl)silanetitanium (II) 1,4-diphenyl-1,3-butadiene; (n-butyl amido)dimethoxy($\eta^5$-2,3-dimethylindenyl)silanetitanium (II) 1,3-pentadiene; (n-butylamido)dimethoxy ($\eta^5$-2,3-dimethylindenyl)silanetitanium (III) 2-(N,N-dimethylamino)benzyl; (n-butyl amido)dimethoxy($\eta^5$-2,3-dimethylindenyl)silanetitanium (IV)dimethyl; (n-butylamido)dimethoxy($\eta^5$-2,3-dimethylindenyl)silanetitanium (IV) dibenzyl; (cyclododecylamido)dimethoxy ($\Theta^5$-2,3-dimethylindenyl)silanetitanium (II) 1,4-diphenyl-1,3-butadiene; (cyclododecylamido)dimethoxy($\eta^5$-2,3-dimethylindenyl)silanetitanium (II) 1,3-pentadiene; (cyclo dodecylamido)dimethoxy($\eta^5$-2,3-dimethylindenyl)silanetitanium (III) 2-(N,N-dimethyl amino)benzyl; (cyclododecylamido)dimethoxy($\eta^5$-2,3-dimethylindenyl)silanetitanium (IV) dimethyl; (cyclododecylamido) dimethoxy($\eta^5$-2,3-dimethylindenyl)silanetitanium (IV) dibenzyl; (2,4,6-trimethylanilido)dimethoxy($\eta^5$ -2,3-dimethyl-indenyl)silanetitanium (II) 1,4-diphenyl-1,3-butadiene; (2,4,6-trimethylanilido)dimethoxy($\eta^5$-2,3-dimethyl-indenyl)silane titanium (II) 1,3-pentadiene; (2,4,6-trimethylanilido)dimethoxy($\eta^5$-2,3-dimethylindenyl) silanetitanium (III) 2-(N,N-dimethylamino)benzyl; (2,4,6-trimethylanilido)dimethoxy($\eta^5$-2,3-dimethylindenyl) silanetitanium (IV) dimethyl; (2,4,6-trimethylanilido) dimethoxy($\eta^5$-2,3-dimethylindenyl)silanetitanium (IV) dibenzyl; (1-adamantylamido)dimethoxy($\eta^5$-2,3-dimethylindenyl)silanetitanium (II) 1,4-diphenyl-1,3-butadiene; (1-adamantyl amido)dimethoxy($\eta^5$-2,3-dimethylindenyl) silanetitanium (II) 1,3-pentadiene; (1-adamantylamido) dimethoxy($\eta^5$-2,3-dimethylindenyl)silanetitanium (III) 2-(N,N-dimethylamino)benzyl; (1-adamantylamido) dimethoxy($\eta^5$-2,3-dimethylindenyl)silanetitanium (IV) dimethyl; (1-adamantylamido)dimethoxy($\eta^5$-2,3-dimethylindenyl)silanetitanium (IV) dibenzyl; (n-butylamido) ethoxymethyl($\eta^5$-2,3-dimethylindenyl)-silanetitanium (II) 1,4-diphenyl-1,3-butadiene; (n-butylamido)ethoxymethyl($\eta^5$-2,3-dimethylindenyl)silanetitanium (II) 1,3-pentadiene; (n-butylamido)ethoxymethyl($\eta^5$-2,3-dimethylindenyl)silanetitanium (III) 2-(N,N-dimethylamino)benzyl; (n-butylamido)ethoxymethyl($\eta^5$-2,3-dimethylindenyl)silane titanium (IV)dimethyl; (n-butylamido)ethoxymethyl ($\eta^5$-2,3-dimethylindenyl)silanetitanium (IV) dibenzyl; (cyclododecylamido)ethoxymethyl($\eta^5$-2,3-dimethylindenyl)silanetitanium (II) 1,4-diphenyl-1,3-butadiene; (cyclododecylamido)ethoxymethyl($\eta^5$-2,3-dimethylindenyl) silanetitanium (II) 1,3-pentadiene; (cyclododecylamido) ethoxymethyl($\eta^5$-2,3-dimethylindenyl)silanetitanium (III) 2-(N,N-dimethylamino)benzyl; (cyclododecylamido) ethoxymethyl($\eta^5$-2,3-dimethylindenyl)silanetitanium (IV) dimethyl; (cyclododecyl amido)ethoxymethyl($\eta^5$-2,3-dimethylindenyl)silanetitanium (IV) dibenzyl; (2,4,6-trimethylanilido)ethoxymethyl($\eta^5$-2,3-dimethylindenyl) silanetitanium (II) 1,4-diphenyl-1,3-butadiene; (2,4,6-trimethylanilido)ethoxymethyl($\eta^5$-2,3-dimethylindenyl) silanetitanium (II) 1,3-pentadiene; (2,4,6-trimethylanilido)ethoxymethyl($\eta^5$-2,3-dimethylindenyl) silanetitanium (III) 2-(N,N-dimethylamino)benzyl; (2,4,6-trimethylanilido)ethoxymethyl($\eta^5$-2,3-dimethylindenyl) silanetitanium (V)dimethyl; (2,4,6-trimethylanilido) ethoxymethyl($\eta^5$-2,3-dimethylindenyl)silanetitanium (IV) dibenzyl; (1-adamantylamido)ethoxymethyl($\eta^5$-2,3-dimethylindenyl)silanetitanium (II) 1,4-diphenyl-1,3-butadiene; (1-adamantylamido)ethoxymethyl($\eta^5$-2,3-dimethylindenyl)silanetitanium (II) 1,3-pentadiene; (1-adamantylamido)ethoxymethyl($\eta^5$-2,3-dimethylindenyl)silanetitanium (III) 2-(N,N-dimethylamino)benzyl; (1-adamantylamido)ethoxymethyl($\eta^5$-2,3-dimethylindenyl)silanetitanium (IV) dimethyl; (1-adamantylamido) ethoxymethyl($\eta^5$-2,3-dimethylindenyl)silanetitanium (IV) dibenzyl;

3-methylindenyl Complexes:

(t-butylamido)dimethyl($\eta^5$-3-methylindenyl)silanetitanium (II) 1,4-diphenyl-1,3-butadiene; (t-butylamido)dimethyl ($\eta^5$-3-methylindenyl)silanetitanium (II) 1,3-pentadiene; (t-butylamido)dimethyl($\eta^5$-3-methylindenyl)silanetitanium (III) 2-(N,N-dimethylamino)benzyl; (t-butylamido) dimethyl($\eta^5$-3-methylindenyl)sanetitanium (IV)dimethyl; (t-butylamido)dimethyl($\eta^5$-3-methylindenyl)silanetitanium (IV) dibenzyl; (n-butylamido)dimethyl($\eta^5$-3-methylindenyl)silanetitanium (II) 1,4-diphenyl-1,3-butadiene; (n-butylamido)dimethyl(r)$^5$-3-methylindenyl)silanetitanium (II) 1,3-pentadiene; (n-butylamido)dimethyl($\eta^5$-3-methylindenyl)silanetitanium (III) 2-(N,N-dimethylamino)benzyl; (n-butylamido)dimethyl($\eta^5$-3-methylindenyl)silanetitanium (IV) dimethyl; (n-butylamido)dimethyl($\eta^5$-3-methylindenyl)silanetitanium (IV) dibenzyl; (cyclododecylamido)dimethyl($\eta^5$-3-methylindenyl)silanetitanium (II) 1,4-diphenyl-1,3-butadiene; (cyclododecylamido)dimethyl($\eta^5$-3-methylindenyl)silanetitanium (II) 1,3-pentadiene; (cyclododecylamido)dimethyl($\eta^5$-3-methylindenyl)silanetitanium (III) 2-(N,N-dimethylamino)benzyl; (cyclododecylamido)dimethyl($\eta^5$-3-methylindenyl)silanetitanium (IV) dimethyl; (cyclododecylamido)dimethyl($\eta^5$-3-methylindenyl)silanetitanium (IV) dibenzyl; (2,4,6-trimethylanilido)dimethyl($\eta^5$-3-methylindenyl) silanetitanium (II) 1,4-diphenyl-1,3-butadiene; (2,4,6-trimethylanilido)dimethyl($\eta^5$-3-methylindenyl) silanetitanium (II) 1,3-pentadiene; (2,4,6-trimethylanilido)dimethyl($\eta^5$-3-methylindenyl) silanetitanium (III) 2-(N,N-dimethylamino)benzyl; (2,4,6-trimethylanilido)dimethyl($\eta^5$-3-methylindenyl) silanetitanium (IV) dimethyl; (2,4,6-trimethylanilido) dimethyl($\eta^5$-3-methylindenyl)silanetitanium (IV) dibenzyl; (1-adamantylamido)dimethyl($\eta^5$-3-methylindenyl)silanetitanium (II) 1,4-diphenyl-1,3-butadiene; (1-adamantylamido)dimethyl($\eta^5$-3-methylindenyl)silanetitanium (II) 1,3-pentadiene; (1-adamantylamido)dimethyl($\eta^5$-3-methylindenyl)silanetitanium (III) 2-(N,N-dimethylamino)benzyl; (1-adamantylamido)dimethyl($\eta^5$-3-methylindenyl)silanetitanium (IV) dimethyl; (1-adamantylamido)dimethyl($\eta^5$-3-methylindenyl)silanetitanium (IV) dibenzyl; (t-butylamido)dimethyl($\eta^5$-3-methylindenyl)silanetitanium (II) 1,4-diphenyl-1,3-butadiene; (t-butylamido)dimethyl($\eta^5$-3-methylindenyl) silanetitanium (II) 1,3-pentadiene; (t-butylamido)dimethyl ($\eta^5$-3-methylindenyl)silanetitanium (III) 2-(N,N-dimethylamino)benzyl; (t-butylamido)dimethyl($\eta^5$-3-methylindenyl)silanetitanium (IV) dimethyl; (t-butylamido)dimethyl($\eta^5$-3-methylindenyl)silanetitanium (IV) dibenzyl; (n-butylamido)diisopropoxy($\eta^5$-3-methylindenyl)silanetitanium (II) 1,4-diphenyl-1,3-butadiene; (n-butylamido)diisopropoxy($\eta^5$-3-methylindenyl) silanetitanium (II). 1,3-pentadiene; (n-butylamido) diisopropoxy($\eta^5$-3-methylindenyl)silanetitanium (III) 2-(N,N-dimethylamino)benzyl; (n-butylamido)diisopropoxy($\eta^5$-3-methylindenyl)silanetitanium (IV) dimethyl; (n-butylamido)diisopropoxy($\eta^5$-3-methylindenyl)silanetitanium (IV) dibenzyl; (cyclododecylamido)diisopropoxy($\eta^5$-3-methylindenyl)-silanetitanium (II) 1,4-diphenyl-1,3-butadiene; (cyclododecylamido)diisopropoxy($\eta^5$-3-methylindenyl)-silanetitanium (II) 1,3-pentadiene; (cyclododecylamido)diisopropoxy($\eta^5$-3-methylindenyl)-silanetitanium (III) 2-(N,N-dimethylamino)benzyl; (cyclododecylamido)diisopropoxy($\eta^5$-3-methylindenyl)-silanetitanium (IV) dimethyl; (cyclododecylamido) diisopropoxy($\eta^5$-3-methylindenyl)-silanetitanium (IV) dibenzyl; (2,4,6-trimethylanilido)diisopropoxy($\eta^5$-3-methyl-indenyl)silanetitanium (II) 1,4-diphenyl-1,3-butadiene; (2,4,6-trimethylanilido)diisopropoxy($\eta^5$-3-methylindenyl)silanetitanium (II) 1,3-pentadiene; (2,4,6-trimethylanilido)diisopropoxy($\eta^5$-3-methylin-denyl) silanetitanium (III) 2-(N,N-dimethylamino)benzyl; (2,4,6-trimethylanilido)diisopropoxy($\eta^5$-3-methylindenyl) silanetitanium (IV) dimethyl; (2,4,6-trimethylanilido) diisopropoxy($\eta^5$-3-methylindenyl)silanetitanium (IV) dibenzyl; (1-adamantylamido)diisopropoxy($\eta^5$-3-methylindenyl)silanetitanium (II) 1,4-diphenyl-1,3-butadiene; (1-adamantylamido)diisopropoxy($\eta^5$-3-methylindenyl) silanetitanium (II) 1,3-pentadiene; (1-adamantylamido)diisopropoxy($\eta^5$-3-methylindenyl)silanetitanium (III) 2-(N,N-dimethylamino)benzyl; (1-adamantylamido) diisopropoxy($\eta^5$-3-methylindenyl)silanetitanium (IV) dimethyl; (1-adamantylamido)diisopropoxy($\eta^5$-3-methylindenyl)silanetitanium (IV) dibenzyl; (n-butylamido) dimethoxy($\eta^5$-3-methylindenyl)silanetitanium (II) 1,4-diphenyl-1,3-butadiene; (n-butylamido)dimethoxy($\eta^5$-3-methylindenyl)silane titanium (II) 1,3-pentadiene; (n-butylamido)dimethoxy($\eta^5$-3-methylindenyl)silanetitanium (III) 2-(N,N-dimethylamino)benzyl; (n-butylamido) dimethoxy($\eta^5$-3-methylindenyl)silane titanium (IV) dimethyl; (n-butylamido)dimethoxy($\eta^5$-3-methylindenyl) silanetitanium (IV) dibenzyl; (cyclododecylamido) dimethoxy($\eta^5$-3-methylindenyl)silanetitanium (II) 1,4-diphenyl-1,3-butadiene; (cyclododecylamido)dimethoxy ($\eta^5$-3-methylindenyl)silanetitanium (II) 1,3-pentadiene; (cyclododecylamido)dimethoxy($\eta^5$-3-methylindenyl)silanetitanium (III) 2-(N,N-dimethylamino)benzyl; (cyclododecylamido)dimethoxy($\eta^5$-3-methylindenyl)silane titanium (IV) dimethyl; (cyclododecylamido)dimethoxy ($\eta^5$-3-methylindenyl)silanetitanium (IV) dibenzyl; (2,4,6-trimethylanilido)dimethoxy($\eta^5$-3-methylindenyl)silanetitanium (II) 1,4-diphenyl-1,3-butadiene; (2,4,6-trimethylanilido)dimethoxy($\eta^5$-3-methylindenyl)silane titanium (II) 1,3-pentadiene; (2,4,6-trimethylanilido)dimethoxy($\eta^5$-3-methylindenyl)silane titanium (III) 2-(N,N-dimethylamino)benzyl; (2,4,6-trimethylanilido)dimethoxy($\eta^5$-3-methylindenyl)silanetitanium (IV) dimethyl; (2,4,6-trimethylanilido)dimethoxy($\eta^5$-3-methylindenyl) silanetitanium (IV) dibenzyl; (1-adamantylamido) dimethoxy($\eta^5$-3-methylindenyl)silanetitanium (II) 1,4-diphenyl-1,3-butadiene; (1-adamantylamido)dimethoxy ($\eta^5$-3-methylindenyl)silanetitanium (II) 1,3-pentadiene; (1-adamantylamido)dimethoxy($\eta^5$-3-methylindenyl)silanetitanium (III) 2-(N,N-dimethylamino)benzyl; (1-adamantylamido)dimethoxy($\eta^5$-3-methylindenyl)silanetitanium (IV) dimethyl; (1-adamantylamido)dimethoxy($\eta^5$-3-methylindenyl)silanetitanium (IV) dibenzyl; (n-butylamido)ethoxymethyl($\eta^5$-3-methylindenyl)silanetitanium (II) 1,4-diphenyl-1,3-butadiene; (n-butylamido) ethoxymethyl($\eta^5$-3-methylindenyl)silanetitanium (II) 1,3-pentadiene; (n-butylamido)ethoxymethyl($\eta^5$-3-methylindenyl)silanetitanium (III) 2-(N,N-dimethyl amino)benzyl; (n-butylamido)ethoxymethyl($\eta^5$-3-methylindenyl)silanetitanium (IV) dimethyl; (n-butylamido) ethoxymethyl($\eta^5$-3-methylindenyl)silanetitanium (IV) dibenzyl; (cyclododecylamido)ethoxymethyl($\eta^5$-3-methylindenyl)silanetitanium (II) 1,4-diphenyl-1,3-butadiene; (cyclododecylamido)ethoxymethyl($\eta^5$-3-methylindenyl) silanetitanium (II) 1,3-pentadiene; (cyclododecylamido) ethoxymethyl($\eta^5$-3-methylindenyl)silanetitanium (III)

2-(N,N-dimethylamino)benzyl; (cyclododecylamido) ethoxymethyl($\eta^5$-3-methylindenyl)silane titanium (IV) dimethyl; (cyclododecylamido)ethoxymethyl($\eta^5$-3-methylindenyl)silane titanium (IV) dibenzyl; (2,4,6-trimethylanilido)ethoxymethyl($\eta^5$-3-methylindenyl)silanetitanium (II) 1,4-diphenyl-1,3-butadiene; (2,4,6-trimethylanilido) ethoxymethyl($\eta^5$-3-methylindenyl)silanetitanium (II) 1,3-pentadiene; (2,4,6-trimethylanilido)ethoxymethyl($\eta^5$-3-methylindenyl)silanetitanium (III) 2-(N,N-dimethylamino)benzyl; (2,4,6-trimethylanilido) ethoxymethyl($\eta^5$-3-methylindenyl)silanetitanium (IV) dimethyl; (2,4,6-trimethylanilido)ethoxymethyl($\eta^5$-3-methylindenyl)silanetitanium (IV) dibenzyl; (1-adamantylamido)ethoxymethyl($\eta^5$-3-methylindenyl)silanetitanium (II) 1,4-diphenyl-1,3-butadiene; (1-adamantylamido) ethoxymethyl($\eta^5$-3-methylindenyl)silanetitanium (II) 1,3-pentadiene; (1-adamantylamido)ethoxymethyl($\eta^5$-3-methylindenyl)silanetitanium (III) 2-(N,N-dimethylamino) benzyl; (1-adamantylamido)ethoxymethyl($\eta^5$-3-methylindenyl)silane titanium (IV) dimethyl; (1-adamantylamido)ethoxymethyl ($\eta^5$-3-methylindenyl) silanetitanium (IV) dibenzyl;

2-methyl-3-ethylindenyl Complexes:

(t-butylamido)dimethyl($\eta^5$-2-methyl-3-ethylindenyl)silanetitanium (II) 1,4-diphenyl-1,3-butadiene; (t-butylamido) dimethyl($\eta^5$-2-methyl-3-ethylindenyl)silanetitanium (II) 1,3-pentadiene; (t-butylamido)dimethyl($\eta^5$-2-methyl-3-ethylindenyl)silanetitanium (III) 2-(N,N-dimethylamino) benzyl; (t-butylamido)dimethyl($\eta^5$-2-methyl-3-ethylindenyl)silanetitanium (IV) dimethyl; (t-butylamido)dimethyl ($\eta^5$-2-methyl-3-ethylindenyl)silanetitanium (IV) dibenzyl; (n-butylamido)dimethyl($\eta^5$-2-methyl-3-ethylindenyl)-silanetitanium (II) 1,4-diphenyl-1,3-butadiene; (n-butylamido)dimethyl($\eta^5$-2-methyl-3-ethylindenyl)silanetitanium (II) 1,3-pentadiene; (n-butylamido)dimethyl ($\eta^5$-2-methyl-3-ethylindenyl)-silanetitanium (III) 2-(N,N-dimethylamino)benzyl; (n-butylamido)dimethyl($\eta^5$-2-methyl-3-ethylindenyl)silane titanium (IV) dimethyl; (n-butylamido)dimethyl($\eta^5$-2-methyl-3-ethylindenyl)silanetitanium (IV) dibenzyl; (cyclododecylamido)dimethyl ($\eta^5$-2-methyl-3-ethylindenyl)silanetitanium (II) 1,4-diphenyl-1,3-butadiene; (cyclododecylamido)dimethyl ($\eta^5$-2-methyl-3-ethylindenyl)silanetitanium (II) 1,3-pentadiene; (cyclododecylamido)dimethyl($\eta^5$-2-methyl-3-ethylindenyl)silanetitanium (III) 2-(N,N-dimethyl amino)benzyl; (cyclododecyl amido)dimethyl(-2-methyl-3-ethylindenyl)silanetitanium (IV) dimethyl; (cyclododecyl amido)dimethyl($\eta^5$-2-methyl-3-ethylindenyl)silanetitanium (IV) dibenzyl; (2,4,6-trimethylanilido)dimethyl ($\eta^5$-2-methyl-3-ethyl-indenyl)silanetitanium (II) 1,4-diphenyl-1,3-butadiene; (2,4,6-trimethylanilido)dimethyl ($\eta^5$-2-methyl-3-ethylindenyl)silanetitanium (II) 1,3-pentadiene; (2,4,6-trimethylanilido)dimethyl($\eta^5$-2-methyl-3-ethylindenyl)silanetitanium (III) 2-(N,N-dimethylamino)benzyl; (2,4,6-trimethylanilido)dimethyl ($\eta^5$-2-methyl-3-ethylindenyl) silanetitanium (IV) dimethyl; (2,4,6-trimethylanilido)dimethyl($\eta^5$-2-methyl-3-ethylindenyl)silanetitanium (IV) dibenzyl; (1-adamantylamido)dimethyl($\eta^5$-2-methyl-3-ethylindenyl) silanetitanium (II) 1,4-diphenyl-1,3-butadiene; (1-adamantylamido)dimethyl($\eta^5$-2-methyl-3-ethylindenyl)silanetitanium (II) 1,3-pentadiene; (1-adamantylamido)dimethyl($\eta^5$-2-methyl-3-ethylindenyl)silanetitanium (III) 2-(N,N-dimethylamino)benzyl; (1-adamantylamido)dimethyl($\eta^5$-2-methyl-3-ethylindenyl)silanetitanium (IV) dimethyl; (1-adamantylamido) dimethyl($\eta^5$-2-methyl-3-ethylindenyl)silanetitanium (IV) dibenzyl; (t-butylamido)dimethyl($\eta^5$-2-methyl-3-ethylindenyl)-silanetitanium (II) 1,4-diphenyl-1,3-butadiene; (t-butylamido)dimethyl($\eta^5$-2-methyl-3-ethylindenyl)silanetitanium (II) 1,3-pentadiene; (t-butylamido)dimethyl ($\eta^5$-2-methyl-3-ethylindenyl)-silanetitanium (III) 2-(N,N-dimethylamino)benzyl; (t-butylamido)dimethyl($\eta^5$-2-methyl-3-ethylindenyl)silanetitanium (IV) dimethyl; (t-butylamido)dimethyl($\eta^5$-2-methyl-3-ethylindenyl) silanetitanium (IV) dibenzyl; (n-butylamido)diisopropoxy ($\eta^5$-2-methyl-3-ethyl-indenyl)silanetitanium (II) 1,4-diphenyl-1,3-butadiene; (n-butylamido)diisopropoxy($\eta^5$-2-methyl-3-ethylindenyl)silane titanium (II) 1,3-pentadiene; (n-butylamido)diisopropoxy($\eta^5$-2-methyl-3-ethylindenyl)silanetitanium (III) 2-(N,N-dimethylamino) benzyl; (n-butylamido)diisopropoxy($\eta^5$-2-methyl-3-ethylindenyl)silanetitanium (IV) dimethyl; (n-butylamido)diisopropoxy($\eta^5$-2-methyl-3-ethylindenyl)silanetitanium (IV) dibenzyl; (cyclododecylamido)diisopropoxy(-2-methyl-3-ethyl-indenyl)silanetitanium (II) 1,4-diphenyl-1,3-butadiene; (cyclododecylamido)diisopropoxy($\eta^5$-2-methyl-3-ethylindenyl)-silanetitanium (II) 1,3-pentadiene; (cyclododecylamido)diisopropoxy($\eta^5$-2-methyl-3-ethylindenyl)-silanetitanium (III) 2-(N,N-dimethylamino)benzyl; (cyclododecylamido)diisopropoxy ($\eta^5$-2-methyl-3-ethylindenyl)-silane titanium (IV) dimethyl; (cyclododecylamido)diisopropoxy($\eta^5$-2-methyl-3-ethylindenyl)-silanetitanium (IV) dibenzyl; (2,4,6-trimethylanilido)diisopropoxy($\eta^5$-2-methyl-3-ethylindenyl)silanetitanium (II) 1,4-diphenyl-1,3-butadiene; (2,4,6-trimethylanilido)diisopropoxy($\eta^5$-2-methyl-3-ethylindenyl)silanetitanium (II) 1,3-pentadiene; (2,4,6-trimethylanilido)diisopropoxy($\eta^5$-2-methyl-3-ethylindenyl)silanetitanium (III) 2-(N,N-dimethylamino) benzyl; (2,4,6-trimethylanilido)diisopropoxy($\eta^5$-2-methyl-3-ethylindenyl)silanetitanium (IV) dimethyl; (2,4,6-trimethylanilido)diisopropoxy($\eta^5$-2-methyl-3-ethylindenyl)silanetitanium (IV) dibenzyl; (1-adamantylamido)diisopropoxy($\eta^5$-2-methyl-3-ethylindenyl)silanetitanium (II) 1,4-diphenyl-1,3-butadiene; (1-adamantylamido)diisopropoxy($\eta^5$-2-methyl-3-ethylindenyl)silanetitanium (II) 1,3-pentadiene; (1-adamantylamido)diisopropoxy($\eta^5$-2-methyl-3-ethylindenyl)silanetitanium (III) 2-(N,N-dimethylamino)benzyl; (1-adamantylamido)diisopropoxy($\eta^5$-2-methyl-3-ethylindenyl)silane titanium (IV) dimethyl; (1-adamantylamido) diisopropoxy($\eta^5$-2-methyl-3-ethylindenyl)silane titanium (IV) dibenzyl; (n-butylamido)dimethoxy($\eta^5$-2-methyl-3-ethylindenyl)silane titanium (II) 1,4-diphenyl-1,3-butadiene; (n-butylamido)dimethoxy($\eta^5$-2-methyl-3-ethylindenyl)silanetitanium (II) 1,3-pentadiene; (n-butylamido) dimethoxy($\eta^5$-2-methyl-3-ethylindenyl)silanetitanium (III) 2-(N,N-dimethylamino)benzyl; (n-butylamido) dimethoxy($\eta^5$-2-methyl-3-ethylindenyl)silanetitanium (IV) dimethyl; (n-butylamido)dimethoxy($\eta^5$-2-methyl-3-ethylindenyl)silanetitanium (IV) dibenzyl; (cyclododecylamido)dimethoxy($\eta^5$-2-methyl-3-ethyl-indenyl)silanetitanium (II) 1,4-diphenyl-1,3-butadiene; (cyclododecylamido)dimethoxy($\eta^5$-2-methyl-3-ethylindenyl)silanetitanium (II) 1,3-pentadiene; (cyclododecyl amido)dimethoxy($\eta^5$-2-methyl-3-ethylindenyl)silanetitanium (III) 2-(N,N-dimethylamino)benzyl; (cyclododecylamido)dimethoxy($\eta^5$-2-methyl-3-ethylindenyl)silanetitanium (IV) dimethyl; (cyclododecylamido)dimethoxy ($\eta^5$-2-methyl-3-ethylindenyl)silanetitanium (IV) dibenzyl; (2,4,6-trimethylanilido)dimethoxy($\eta^5$-2-methyl-3-ethylindenyl)silanetitanium (II) 1,4-diphenyl-1,3-butadiene; (2,4,6-trimethylanilido)dimethoxy($\eta^5$-2-methyl-3-ethylindenyl)silanetitanium (II) 1,3-pentadiene; (2,4,6-trimethylanilido)dimethoxy($\eta^5$-2-methyl-3-ethyl-indenyl)silanetitanium (III) 2-(N,N-dimethylamino)benzyl; (2,4,6-trimethylanilido)dimethoxy($\eta^5$-2-methyl-3-ethylindenyl)silanetitanium (IV) dimethyl; (2,4,6-trimethylanilido)dimethoxy($\eta^5$-2-methyl-3-ethylindenyl) silanetitanium (IV) dibenzyl; (1-adamantylamido) dimethoxy($\eta^5$-2-methyl-3-ethylindenyl)silanetitanium (II) 1,4-diphenyl-1,3-butadiene; (1-adamantylamido) dimethoxy($\eta^5$-2-methyl-3-ethylindenyl)silanetitanium (II) 1,3-pentadiene; (1-adamantylamido)dimethoxy($\eta^5$-2-methyl-3-ethylindenyl)silanetitanium (III) 2-(N,N-dimethylamino)benzyl; (1-adamantylamido)dimethoxy($\eta^5$-2-methyl-3-ethylindenyl)silanetitanium (IV) dimethyl; (1-adamantylamido)dimethoxy($\eta^5$-2-methyl-3-ethylindenyl)silanetitanium (IV) dibenzyl; (n-butylamido) ethoxymethyl($\eta^5$-2-methyl-3-ethyl-indenyl)silanetitanium (II) 1,4-diphenyl-1,3-butadiene; (n-butylamido) ethoxy methyl($\eta^5$-2-methyl-3-ethylindenyl) silanetitanium (II) 1,3-pentadiene; (n-butylamido)ethoxy methyl($\eta^5$-2-methyl-3-ethylindenyl)silanetitanium (III) 2-(N,N-dimethylamino)benzyl; (n-butylamido)ethoxymethyl($\eta^5$-2-methyl-3-ethylindenyl)silanetitanium (IV) dimethyl; (n-butylamido)ethoxymethyl($\eta^5$-2-methyl-3-ethylindenyl)silanetitanium (IV) dibenzyl; (cyclododecylamido)ethoxymethyl($\eta^5$-2-methyl-3-ethyl-indenyl)silane-titanium (II) 1,4-diphenyl-1,3-butadiene; (cyclododecylamido)ethoxymethyl($\eta^5$-2-methyl-3-ethyl-indenyl)silane-titanium (II) 1,3-pentadiene; (cyclododecylamido)ethoxymethyl($\eta^5$-2-methyl-3-ethylindenyl)silane-titanium (III) 2-(N,N-dimethylamino)benzyl; (cyclododecylamido)ethoxymethyl($\eta^5$-2-methyl-3-ethyl-indenyl)silanetitanium (IV) dimethyl; (cyclododecyl amido)ethoxymethyl($\eta^5$-2-methyl-3-ethylindenyl)silanetitanium (IV) dibenzyl; (2,4,6-trimethylanilido)ethoxymethyl($\eta^5$-2-methyl-3-ethylindenyl)silanetitanium (II) 1,4-diphenyl-1,3-butadiene; (2,4,6-trimethylanilido) ethoxymethyl($\eta^5$-2-methyl-3-ethylindenyl)silanetitanium (II) 1,3-pentadiene; (2,4,6-trimethylanilido)ethoxymethyl ($\eta^5$-2-methyl-3-ethylindenyl)silanetitanium (III) 2-(N,N-dimethylamino)benzyl; (2,4,6-trimethylanilido)ethoxymethyl($\eta^5$-2-methyl-3-ethylindenyl)silanetitanium (IV) dimethyl; (2,4,6-trimethylanilido)ethoxymethyl($\eta^5$-2-methyl-3-ethylindenyl)silanetitanium (IV) dibenzyl; (1-adamantylamido)ethoxymethyl($\eta^5$-2-methyl-3-ethylindenyl) silanetitanium (II) 1,4-diphenyl-1,3-butadiene; (1-adamantylamido)ethoxymethyl($\eta^5$-2-methyl-3-ethyl-indenyl)silanetitanium (II) 1,3-pentadiene; (1-adamantylamido)ethoxymethyl($\eta^5$-2-methyl-3-ethylindenyl)silanetitanium (III) 2-(N,N-dimethylamino)benzyl; (1-adamantylamido)ethoxymethyl($\eta^5$-2-methyl-3-ethyl-indenyl)silanetitanium (IV) dimethyl; (1-adamantylamido)ethoxymethyl($\eta^5$-2-methyl-3-ethylindenyl)silanetitanium (IV) dibenzyl;

2,3,4,6-tetramethylindenyl Complexes:

(t-butylamido)dimethyl($\eta^5$-2,3,4,6-tetramethylindenyl)silanetitanium (II) 1,4-diphenyl-1,3-butadiene; (t-butylamido)dimethyl($\eta^5$-2,3,4,6-tetramethylindenyl)silanetitanium (II) 1,3-pentadiene; (t-butylamido)dimethyl($\eta^5$-2,3,4,6-tetramethylindenyl)silanetitanium (III) 2-(N,N-dimethylamino)benzyl; (t-butylamido)dimethyl($\eta^5$-2,3,4,6-tetramethylindenyl)silane titanium (IV) dimethyl; t-butylamido)dimethyl($\eta^5$-2,3,4,6-tetramethylindenyl)silanetitanium (IV) dibenzyl; (n-butylamido)dimethyl($\eta^5$-2,3,4,6-tetramethylindenyl)silanetitanium (II) 1,4-diphenyl-1,3-butadiene; (n-butylamido)dimethyl($\eta^5$-2,3,4,6-tetramethylindenyl)silane titanium (II) 1,3-pentadiene; (n-butylamido)dimethyl($\eta^5$-2,3,4,6-tetramethylindenyl) silane titanium (III) 2-(N,N-dimethylamino)benzyl; (n-butylamido)dimethyl($\eta^5$-2,3,4,6-tetramethylindenyl)silanetitanium (IV) dimethyl; (n-butylamido)dimethyl($\eta^5$-2,3,4,6-tetramethylindenyl)silanetitanium (IV) dibenzyl; (cyclododecylamido)dimethyl($\eta^5$-2,3,4,6-tetramethylindenyl)silanetitanium (II) 1,4-diphenyl-1,3-butadiene; (cyclododecylamido)dimethyl($\eta^5$-2,3,4,6-tetramethylindenyl)silane titanium (II) 1,3-pentadiene; (cyclododecylamido)dimethyl($\eta^5$-2,3,4,6-tetramethylindenyl)silane titanium (III) 2-(N,N-dimethylamino)benzyl; (cyclododecylamido)dimethyl($\eta^5$-2,3,4,6-tetramethylindenyl)silane titanium (IV) dimethyl; (cyclododecylamido) dimethyl($\eta^5$-2,3,4,6-tetramethylindenyl)silanetitanium (IV) dibenzyl; (2,4,6-trimethylanilido)dimethyl($\eta^5$-2,3,4,6-tetramethylindenyl)silanetitanium (II) 1,4-diphenyl-1,3-butadiene; (2,4,6-trimethylanilido)dimethyl($\eta^5$-2,3,4,6-tetramethylindenyl)silanetitanium (II) 1,3-pentadiene; (2,4,6-trimethylanilido)dimethyl($\eta^5$-2,3,4,6-tetramethyl-indenyl)silanetitanium (III) 2-(N,N-dimethylamino)benzyl; (2,4,6-trimethylanilido)dimethyl($\eta^5$-2,3,4,6-tetramethylindenyl)silane titanium (IV) dimethyl; (2,4,6-trimethylanilido)dimethyl($\eta^5$-2,3,4,6-tetramethylindenyl) silane titanium (IV) dibenzyl; (1-adamantylamido) dimethyl($\eta^5$-2,3,4,6-tetramethylindenyl)silanetitanium (II) 1,4-diphenyl-1,3-butadiene; (1-adamantylamido)dimethyl($\eta^5$-2,3,4,6-tetramethylindenyl)silane titanium (II) 1,3-pentadiene; (1-adamantylamido)dimethyl($\eta^5$-2,3,4,6-tetramethylindenyl)silane titanium (III) 2-(N,N-dimethylamino)benzyl; (1-adamantylamido)dimethyl($\eta^5$-2,3,4,6-tetramethylindenyl)silanetitanium (IV) dimethyl; (1-adamantylamido)dimethyl($\eta^5$-2,3,4,6-tetramethylindenyl)silanetitanium (IV) dibenzyl; (t-butylamido)dimethyl($\eta^5$-2,3,4,6-tetramethylindenyl)-silanetitanium (II) 1,4-diphenyl-1,3-butadiene; (t-butylamido)dimethyl($\eta^5$-2,3,4,6-tetramethylindenyl)silanetitanium (II) 1,3-pentadiene; (t-butylamido)dimethyl($\eta^5$-2,3,4,6-tetramethylindenyl)-silanetitanium (III) 2-(N,N-dimethylamino) benzyl; (t-butylamido)dimethyl($\eta^5$-2,3,4,6-tetramethylindenyl)silanetitanium (IV) dimethyl; (t-butylamido)dimethyl($\eta^5$-2,3,4,6-tetramethylindenyl)silanetitanium (IV) dibenzyl; (n-butylamido)diisopropoxy ($\eta^5$-2,3,4,6-tetramethylindenyl)silane-titanium (II) 1,4-diphenyl-1,3-butadiene; (n-butylamido)diisopropoxy($\eta^5$-2,3,4,6-tetramethylindenyl)silane-titanium (II) 1,3-pentadiene; (n-butylamido)diisopropoxy($\eta^5$-2,3,4,6-tetramethylindenyl)-silanetitanium (III) 2-(N,N-dimethylamino)benzyl; (n-butylamido)diisopropoxy($\eta^5$-2,3,4,6-tetramethylindenyl)silane-titanium (IV) dimethyl; (n-butylamido)diisopropoxy($\eta^5$-2,3,4,6-tetramethylindenyl)silane-titanium (IV) dibenzyl; (cyclododecylamido) diisopropoxy($\eta^5$-2,3,4,6-tetramethylindenyl)-silanetitanium (II) 1,4-diphenyl-1,3-butadiene; (cyclododecylamido)diisopropoxy($\eta^5$-2,3,4,6-tetramethylindenyl)silanetitanium (II) 1,3-pentadiene; (cyclododecylamido)diisopropoxy(-2,3,4,6-tetramethylindenyl)silanetitanium (III) 2-(N,N-dimethylamino)benzyl; cyclododecylamido)diisopropoxy($\eta^5$-2,3,4,6-tetramethylindenyl)silanetitanium (IV) dimethyl; (cyclododecylamido)diisopropoxy($\eta^5$-2,3,4,6-tetramethylindenyl)silanetitanium (IV) dibenzyl; (2,4,6-trimethylanilido) diisopropoxy($\eta^5$-2,3,4,6-tetramethylindenyl) silanetitanium (II) 1,4-diphenyl-1,3-butadiene; (2,4,6-trimethylanilido)diisopropoxy($\eta^5$-2,3,4,6-tetramethylindenyl)silanetitanium (II) 1,3-pentadiene; (2,4,6-trimethylanilido)diisopropoxy($\eta^5$-2,3,4,6-tetramethylindenyl)silanetitanium (III) 2-(N,N-dimethylamino)

benzyl; (2,4,6-trimethylanilido)diisopropoxy($\eta^5$-2,3,4,6-tetramethylindenyl)silanetitanium (IV) dimethyl; (2,4,6-trimethylanilido)diisopropoxy($\eta^5$-2,3,4,6-tetramethylindenyl)silanetitanium (IV) dibenzyl; (1-adamantylamido)diisopropoxy($\eta^5$-2,3,4,6-tetramethylindenyl)silanetitanium (II) 1,4-diphenyl-1,3-butadiene; (1-adamantylamido)diisopropoxy($\eta^5$-2,3,4,6-tetramethylindenyl)silanetitanium (II) 1,3-pentadiene; (1-adamantylamido)diisopropoxy($\eta^5$-2,3,4,6-tetramethylindenyl)silanetitanium (III) 2-(N,N-dimethylamino)benzyl; (1-adamantylamido)diisopropoxy($\eta^5$-2,3,4,6-tetramethylindenyl)silanetitanium (IV) dimethyl; (1-adamantylamido)diisopropoxy($\eta^5$-2,3,4,6-tetramethylindenyl)silanetitanium (IV) dibenzyl; (n-butylamido)dimethoxy($\eta^5$-2,3,4,6-tetramethylindenyl)silanetitanium (II) 1,4-diphenyl-1,3-butadiene; (n-butylamido)dimethoxy($\eta^5$-2,3,4,6-tetramethylindenyl)silanetitanium (II) 1,3-pentadiene; (n-butylamido)dimethoxy($\eta^5$-2,3,4,6-tetramethylindenyl) silanetitanium (III) 2-(N,N-dimethylamino)benzyl; (n-butylamido)dimethoxy($\eta^5$-2,3,4,6-tetramethylindenyl)silanetitanium (IV) dimethyl; (n-butylamido)dimethoxy($\eta^5$-2,3,4,6-tetramethylindenyl)silanetitanium (IV) dibenzyl; (cyclododecylamido)dimethoxy($\eta^5$-2,3,4,6-tetramethylindenyl)silanetitanium (II) 1,4-diphenyl-1,3-butadiene; (cyclododecylamido)dimethoxy($\eta^5$-2,3,4,6-tetramethylindenyl)silanetitanium (II) 1,3-pentadiene; (cyclododecylamido)dimethoxy($\eta^5$-2,3,4,6-tetramethylindenyl)silanetitanium (III) 2-(N,N-dimethylamino)benzyl; (cyclododecylamido)dimethoxy($\eta^5$-2,3,4,6-tetramethylindenyl)silanetitanium (IV) dimethyl; (cyclododecylamido)dimethoxy($\eta^5$-2,3,4,6-tetramethylindenyl)silanetitanium (IV) dibenzyl; (2,4,6-trimethylanilido)dimethoxy ($\eta^5$-2,3,4,6-tetramethylindenyl)silanetitanium (II) 1,4-diphenyl-1,3 butadiene; (2,4,6-trimethylanilido) dimethoxy($\eta^5$-2,3,4,6-tetramethylindenyl)silane titanium (II) 1,3-pentadiene; (2,4,6-trimethylanilido)dimethoxy ($\eta^5$-2,3,4,6-tetramethylindenyl)silanetitanium (III) 2-(N,N-dimethylamino)benzyl; (2,4,6-trimethylanilido) dimethoxy($\eta^5$-2,3,4,6-tetramethylindenyl)silanetitanium (IV) dimethyl; (2,4,6-trimethylanilido)dimethoxy($\eta^5$-2,3,4,6-tetramethylindenyl)silanetitanium (IV) dibenzyl; (1-adamantylamido)dimethoxy($\eta^5$-2,3,4,6-tetramethylindenyl)silanetitanium (II) 1,4-diphenyl-1,3-butadiene; (1-adamantylamido)dimethoxy($\eta^5$-2,3,4,6-tetramethylindenyl)silanetitanium (II) 1,3-pentadiene; (1-adamantylamido)dimethoxy($\eta^5$-2,3,4,6-tetramethylindenyl)silanetitanium (III) 2-(N,N-dimethylamino)benzyl; (1-adamantylamido)dimethoxy($\eta^5$-2,3,4,6-tetramethylindenyl)silanetitanium (IV) dimethyl; (1-adamantylamido) dimethoxy($\eta^5$-2,3,4,6-tetramethylindenyl)silanetitanium (IV) dibenzyl; (n-butylamido)ethoxymethyl($\eta^5$-2,3,4,6-tetramethylindenyl)silanetitanium (II) 1,4-diphenyl-1,3-butadiene; (n-butylamido)ethoxymethyl($\eta^5$-2,3,4,6-tetramethylindenyl)silanetitanium (II) 1,3-pentadiene; (n-butylamido)ethoxymethyl($\eta^5$-2,3,4,6-tetramethylindenyl)silanetitanium (III) 2-(N,N-dimethylamino)benzyl; (n-butylamido)ethoxymethyl($\eta^5$-2,3,4,6-tetramethylindenyl)silane titanium (IV) dimethyl; (n-butylamido) ethoxymethyl($\eta^5$-2,3,4,6-tetramethylindenyl)silane titanium (IV) dibenzyl; (cyclododecylamido)ethoxymethyl ($\eta^5$-2,3,4,6-tetramethylindenyl)silanetitanium (II) 1,4-diphenyl-1,3-butadiene; (cyclododecylamido) ethoxymethyl($\eta^5$-2,3,4,6-tetramethylindenyl) silanetitanium (II) 1,3-pentadiene; (cyclododecylamido) ethoxymethyl($\eta^5$-2,3,4,6-tetramethylindenyl) silanetitanium (III) 2-(N,N-dimethylamino)benzyl; (cyclododecylamido)ethoxymethyl($\eta^5$-2,3,4,6-tetramethylindenyl)silanetitanium (IV) dimethyl; (cyclododecylamido)ethoxymethyl($\eta^5$-2,3,4,6-tetramethylindenyl)silanetitanium (IV) dibenzyl; (2,4,6-trimethylanilido) ethoxymethyl($\eta^5$-2,3,4,6-tetramethylindenyl) silanetitanium (II) 1,4-diphenyl-1,3-butadiene; (2,4,6-trimethylanilido)ethoxymethyl($\eta^5$-2,3,4,6-tetramethylindenyl)silanetitanium (II) 1,3-pentadiene; (2,4,6-trimethylanilido)ethoxymethyl($\eta^5$-2,3,4,6-tetramethylindenyl)silane titanium (III) 2-(N,N-dimethylamino) benzyl; (2,4,6-trimethylanilido)ethoxymethyl($\eta^5$-2,3,4,6-tetramethylindenyl)silanetitanium (IV) dimethyl; (2,4,6-trimethylanilido)ethoxymethyl($\eta^5$-2,3,4,6-tetramethylindenyl)silanetitanium (IV) dibenzyl; (1-adamantylamido)ethoxymethyl($\eta^5$-2,3,4,6-tetramethylindenyl)silanetitanium (II) 1,4-diphenyl-1,3-butadiene; (1-adamantylamido)ethoxymethyl($\eta^5$-2,3,4,6-tetramethylindenyl)silanetitanium (II) 1,3-pentadiene; (1-adamantylamido)ethoxymethyl($\eta^5$-2,3,4,6-tetramethylindenyl)silanetitanium (III) 2-(N,N-dimethylamino)benzyl; (1-adamantylamido)ethoxymethyl($\eta^5$-2,3,4,6-tetramethylindenyl)silanetitanium (IV) dimethyl; and (1-adamantylamido)ethoxymethyl($\eta^5$-2,3,4,6-tetramethylindenyl)silanetitanium (IV) dibenzyl.

2,3,4,6,7-pentamethylindenyl Complexes:

(t-butylamido)dimethyl($\eta^5$-2,3,4,6,7-pentamethyl-indenyl) silanetitanium (II) 1,4-diphenyl-1,3-butadiene; (t-butylamido)dimethyl($\eta^5$-2,3,4,6,7-pentamethylindenyl)silanetitanium (II) 1,3-pentadiene; (t-butylamido)dimethyl($\eta^5$-2,3,4,6,7-pentamethylindenyl)silanetitanium (III) 2-(N,N-dimethylamino)benzyl; (t-butylamido)dimethyl($\eta^5$-2,3,4,6,7-pentamethylindenyl)silanetitanium (IV) dimethyl; (t-butylamido)dimethyl($\eta^5$-2,3,4,6,7-pentamethylindenyl)silanetitanium (IV) dibenzyl; (n-butylamido)dimethyl ($\eta^5$-2,3,4,6,7-pentamethyl-indenyl)silanetitanium (II) 1,4-diphenyl-1,3-butadiene; (n-butylamido)dimethyl($\eta^5$-2,3,4,6,7-pentamethylindenyl)silanetitanium (II) 1,3-pentadiene; (n-butylamido)dimethyl($\eta^5$-2,3,4,6,7-pentamethylindenyl)-silanetitanium (III) 2-(N,N-dimethylamino)benzyl; (n-butylamido)dimethyl($\eta^5$-2,3,4,6,7-pentamethylindenyl)silanetitanium (IV) dimethyl; (n-butylamido)dimethyl($\eta^5$-2,3,4,6,7-pentamethylindenyl)silanetitanium (IV) dibenzyl; (cyclododecylamido) dimethyl($\eta^5$-2,3,4,6,7-pentamethylindenyl)silanetitanium (II) 1,4-diphenyl-1,3-butadiene; (cyclododecylamido) dimethyl($\eta^5$-2,3,4,6,7-pentamethylindenyl)silanetitanium (II) 1,3-pentadiene; (cyclododecylamido)dimethyl($\eta^5$-2,3,4,6,7-pentamethylindenyl)silanetitanium (III) 2-(N,N-dimethylamino)benzyl; (cyclododecylamido)dimethyl ($\eta^5$-2,3,4,6,7-pentamethylindenyl)silanetitanium (IV) dimethyl; (cyclododecylamido)dimethyl($\eta^5$-2,3,4,6,7-pentamethylindenyl)silanetitanium (IV) dibenzyl; (2,4,6-trimethylanilido)dimethyl($\eta^5$-2,3,4,6,7-pentamethyl-indenyl)silanetitanium (II) 1,4-diphenyl-1,3-butadiene; (2,4,6-trimethylanilido)dimethyl($\eta^5$-2,3,4,6,7-pentamethylindenyl)silanetitanium (II) 1,3-pentadiene; (2,4,6-trimethylanilido)dimethyl($\eta^5$-2,3,4,6,7-pentamethyl-indenyl)silanetitanium (III) 2-(N,N-dimethylamino) benzyl; (2,4,6-trimethylanilido)dimethyl($\eta^5$-2,3,4,6,7-pentamethylindenyl)silanetitanium (IV) dimethyl; (2,4,6-trimethylanilido)dimethyl($\eta^5$-2,3,4,6,7-pentamethylindenyl)silanetitanium (IV) dibenzyl; (1-adamantylamido)dimethyl($\eta^5$-2,3,4,6,7-pentamethylindenyl)silanetitanium (II) 1,4-diphenyl-1,3-butadiene; (1-adamantylamido)dimethyl($\eta^5$-2,3,4,6,7-pentamethylindenyl)silanetitanium (II) 1,3-pentadiene; (1-adamantylamido)dimethyl($\eta^5$-2,3,4,6,7-pentamethylindenyl)silanetitanium (III) 2-(N,N-dimethylamino)benzyl;

(1-adamantylamido)dimethyl($\eta^5$-2,3,4,6,7-pentamethylindenyl)silanetitanium (IV) dimethyl; (1-adamantylamido)dimethyl($\eta^5$-2,3,4,6,7-pentamethylindenyl)silanetitanium (IV) dibenzyl; (t-butylamido)dimethyl($\eta^5$-2,3,4,6,7-pentamethylindenyl)-silanetitanium (II) 1,4-diphenyl-1,3-butadiene; (t-butylamido)dimethyl($\eta^5$-2,3,4,6,7-pentamethylindenyl)silanetitanium (II) 1,3-pentadiene; (t-butylamido)dimethyl($\eta^5$-2,3,4,6,7-pentamethylindenyl)-silanetitanium (III) 2-(N,N-dimethylamino)benzyl; (t-butylamido)dimethyl($\eta^5$-2,3,4,6,7-pentamethylindenyl)silanetitanium (IV) dimethyl; (t-butylamido)dimethyl ($\eta^5$-2,3,4,6,7-pentamethylindenyl)silanetitanium (IV) dibenzyl; (n-butylamido)diisopropoxy($\eta^5$-2,3,4,6,7-pentamethyl-indenyl)silane-titanium (II) 1,4-diphenyl-1,3-butadiene; (n-butylamido)diisopropoxy($\eta^5$ -2,3,4,6,7-pentamethylindenyl)silane-titanium (II) 1,3-pentadiene; (n-butylamido)diisopropoxy($\eta^5$-2,3,4,6,7-pentamethylindenyl)-silanetitanium (III) 2-(N,N-dimethylamino)benzyl; (n-butylamido)diisopropoxy($\eta^5$-2,3,4,6,7-pentamethylindenyl)silane-titanium (IV) dimethyl; (n-butylamido) diisopropoxy($\eta^5$-2,3,4,6,7-pentamethylindenyl)silanetitanium (IV) dibenzyl; (cyclododecylamido)diisopropoxy ($\eta^5$-2,3,4,6,7-pentamethyl-indenyl)silanetitanium (II) 1,4-diphenyl-1,3-butadiene; (cyclododecylamido) diisopropoxy($\eta^5$-2,3,4,6,7-pentamethylindenyl) silanetitanium (II) 1,3-pentadiene; (cyclododecylamido) diisopropoxy(-2,3,4,6,7-pentamethylindenyl) silanetitanium (III) 2-(N,N-dimethylamino)benzyl; (cyclododecylamido)diisopropoxy($\eta^5$-2,3,4,6,7-pentamethylindenyl)silanetitanium (IV) dimethyl; (cyclododecylamido)diisopropoxy($\eta^5$-2,3,4,6,7-pentamethylindenyl) silanetitanium (IV) dibenzyl; (2,4,6-trimethylanilido) diisopropoxy($\eta^5$-2,3,4,6,7-pentamethylindenyl) silanetitanium (II) 1,4-diphenyl-1,3-butadiene; (2,4,6-trimethylanilido)diisopropoxy($\eta^5$-2,3,4,6,7-pentamethylindenyl)silanetitanium (II) 1,3-pentadiene; (2,4,6-trimethylanilido)diisopropoxy($\eta^5$-2,3,4,6,7-pentamethylindenyl)silanetitanium (III) 2-(N,N-dimethylamino)benzyl; (2,4,6-trimethylanilido)diisopropoxy($\eta^5$-2,3,4,6,7-pentamethylindenyl)silanetitanium (IV) dimethyl; (2,4,6-trimethylanilido)diisopropoxy($\eta^5$-2,3,4,6,7-pentamethylindenyl)silanetitanium (IV) dibenzyl; (1-adamantylamido)diisopropoxy($\eta^5$-2,3,4,6,7-pentamethyl-indenyl)silanetitanium (II) 1,4-diphenyl-1,3-butadiene; (1-adamantylamido)diisopropoxy($\eta^5$-2,3,4,6,7-pentamethylindenyl)silanetitanium (II) 1,3-pentadiene; (1-adamantylamido)diisopropoxy($\eta^5$-2,3,4,6,7-pentamethylindenyl)silanetitanium (III) 2-(N,N-dimethylamino) benzyl; (1-adamantylamido)diisopropoxy($\eta^5$-2,3,4,6,7-pentamethylindenyl)silanetitanium (IV) dimethyl; (1-adamantylamido)diisopropoxy($\eta^5$-2,3,4,6,7-pentamethylindenyl)silanetitanium (IV) dibenzyl; (n-butylamido) dimethoxy($\eta^5$-2,3,4,6,7-pentamethylindenyl)silanetitanium (II) 1,4-diphenyl-1,3-butadiene; (n-butylamido) dimethoxy($\eta^5$-2,3,4,6,7-pentamethylindenyl) silanetitanium (II) 1,3-pentadiene; (n-butylamido) dimethoxy($\eta^5$-2,3,4,6,7-pentamethylindenyl) silanetitanium (III) 2-(N,N-dimethylamino)benzyl; (n-butylamido)dimethoxy($\eta^5$-2,3,4,6,7-pentamethylindenyl)silanetitanium (IV) dimethyl; (n-butylamido) dimethoxy($\eta^5$-2,3,4,6,7-pentamethylindenyl)silanetitanium (IV) dibenzyl; (cyclododecylamido)dimethoxy($\eta^5$-2,3,4,6,7-pentamethylindenyl)silanetitanium (II) 1,4-diphenyl-1,3-butadiene; (cyclododecylamido)dimethoxy ($\eta^5$-2,3,4,6,7-pentamethylindenyl)silanetitanium (II) 1,3-pentadiene; (cyclododecylamido)dimethoxy($\eta^5$-2,3,4,6,7-pentamethylindenyl)silanetitanium (III) 2-(N,N-dimethylamino)benzyl; (cyclododecylamido)dimethoxy ($\eta^5$-2,3,4,6,7-pentamethylindenyl)silanetitanium (IV) dimethyl; (cyclododecylamido)dimethoxy($\eta^5$-2,3,4,6,7-pentamethylindenyl)silanetitanium (IV) dibenzyl; (2,4,6-trimethylanilido)dimethoxy($\eta^5$-2,3,4,6,7-pentamethylindenyl)silane titanium (II) 1,4-diphenyl-1,3-butadiene; (2,4,6-trimethylanilido)dimethoxy($\eta^5$-2,3,4,6,7-pentamethylindenyl)silanetitanium (II) 1,3-pentadiene; (2,4,6-trimethylanilido)dimethoxy($\eta^5$-2,3,4,6,7-pentamethylindenyl)silanetitanium (III) 2-(N,N-dimethylamino)benzyl; (2,4,6-trimethylanilido)dimethoxy($\eta^5$-2,3,4,6,7-pentamethylindenyl)silanetitanium (IV) dimethyl; (2,4,6-trimethylanilido)dimethoxy($\eta^5$-2,3,4,6,7-pentamethylindenyl)silanetitanium (IV) dibenzyl; (1-adamantylamido) dimethoxy($\eta^5$-2,3,4,6,7-pentamethylindenyl) silanetitanium (II) 1,4-diphenyl-1,3-butadiene; (1-adamantylamido)dimethoxy($\eta^5$-2,3,4,6,7-pentamethylindenyl)silanetitanium (II) 1,3-pentadiene; (1-adamantylamido)dimethoxy($\eta^5$-2,3,4,6,7-pentamethylindenyl)silanetitanium (III) 2-(N,N-dimethylamino)benzyl; (1-adamantylamido)dimethoxy($\eta^5$-2,3,4,6,7-pentamethylindenyl)silanetitanium (IV) dimethyl; (1-adamantylamido)dimethoxy($\eta^5$-2,3,4,6,7-pentamethylindenyl)silanetitanium (IV) dibenzyl; (n-butylamido)ethoxymethyl($\eta^5$-2,3,4,6,7-pentamethyl-indenyl)silanetitanium (II) 1,4-diphenyl-1,3-butadiene; (n-butylamido)ethoxymethyl($\eta^5$-2,3,4,6,7-pentamethylindenyl)silanetitanium (II) 1,3-pentadiene; (n-butylamido)ethoxymethyl($\eta^5$-2,3,4,6,7-pentamethylindenyl)silanetitanium (III) 2-(N,N-dimethylamino)benzyl; (n-butylamido)ethoxymethyl($\eta^5$-2,3,4,6,7-pentamethylindenyl)silanetitanium (IV) dimethyl; (n-butylamido)ethoxymethyl($\eta^5$ -2,3,4,6,7-pentamethylindenyl)silanetitanium (IV) dibenzyl; (cyclododecylamido)ethoxymethyl($\eta^5$-2,3,4,6,7-pentamethylindenyl)silanetitanium (II) 1,4-diphenyl-1,3-butadiene; (cyclododecylamido)ethoxymethyl($\eta^5$-2,3,4,6,7-pentamethylindenyl)silanetitanium (II) 1,3-pentadiene; (cyclododecylamido)ethoxymethyl($\eta^5$-2,3,4,6,7-pentamethylindenyl)silane titanium (III) 2-(N,N-dimethylamino) benzyl; (cyclododecylamido)ethoxymethyl($\eta^5$-2,3,4,6,7-pentamethylindenyl)silanetitanium (IV) dimethyl; (cyclododecylamido)ethoxymethyl($\eta^5$-2,3,4,6,7-pentamethylindenyl)silanetitanium (IV) dibenzyl; (2,4,6-trimethylanilido)ethoxymethyl($\eta^5$-2,3,4,6,7-pentamethylindenyl)silanetitanium (II) 1,4-diphenyl-1,3-butadiene; (2,4,6-trimethylanilido)ethoxymethyl($\eta^5$-2,3,4,6,7-pentamethylindenyl)silanetitanium (II) 1,3-pentadiene; (2,4,6-trimethylanilido)ethoxymethyl($\eta^5$-2,3,4,6,7-pentamethylindenyl)silanetitanium (III) 2-(N,N-dimethylamino)benzyl; (2,4,6-trimethylanilido)ethoxymethyl($\eta^5$-2,3,4,6,7-pentamethylindenyl)silanetitanium (IV) dimethyl; (2,4,6-trimethylanilido)ethoxymethyl($\eta^5$-2,3,4,6,7-pentamethylindenyl)silane titanium (IV) dibenzyl; (1-adamantylamido)ethoxymethyl($\eta^5$-2,3,4,6,7-pentamethyl-indenyl)silanetitanium (II) 1,4-diphenyl-1,3-butadiene; (1-adamantylamido)ethoxymethyl($\eta^5$-2,3,4,6,7-pentamethylindenyl)silanetitanium (II) 1,3-pentadiene; (1-adamantylamido)ethoxymethyl($\eta^5$-2,3,4,6,7-pentamethylindenyl)silanetitanium (III) 2-(N,N-dimethylamino) benzyl; (1-adamantylamido)ethoxymethyl($\eta^5$-2,3,4,6,7-pentamethylindenyl)silanetitanium (IV) dimethyl; and (1-adamantylamido)ethoxymethyl($\eta^5$-2,3,4,6,7-pentamethylindenyl)silanetitanium (IV) dibenzyl.

Other catalysts, cocatalysts, catalyst systems, and activating techniques which may be used in the practice of the invention disclosed herein may include those disclosed in WO 96/23010, published on Aug. 1, 1996, the entire disclosure of which is hereby incorporated by reference; those disclosed in WO 99/14250, published Mar. 25, 1999, the entire disclosure of which is hereby incorporated by reference; those disclosed in WO 98/41529, published Sep. 24, 1998, the entire disclosure of which is hereby incorporated by reference; those disclosed in WO 97/42241, published Nov. 13, 1997, the entire disclosure of which is hereby incorporated by reference; those disclosed by Scollard, et al., in J. Am. Chem. Soc 1996, 118, 10008-10009, the entire disclosure of which is hereby incorporated by reference; those disclosed in EP 0 468 537 B1, published Nov. 13, 1996, the entire disclosure of which is hereby incorporated by reference; those disclosed in WO 97/22635, published Jun. 26, 1997, the entire disclosure of which is hereby incorporated by reference; those disclosed in EP 0 949 278 A2, published Oct. 13, 1999, the entire disclosure of which is hereby incorporated by reference; those disclosed in EP 0 949 279 A2, published Oct. 13, 1999, the entire disclosure of which is hereby incorporated by reference; those disclosed in EP 1 063 244 A2, published Dec. 27, 2000, the entire disclosure of which is hereby incorporated by reference; those disclosed in U.S. Pat. No. 5,408,017, the entire disclosure of which is hereby incorporated by reference; those disclosed in U.S. Pat. No. 5,767,208, the entire disclosure of which is hereby incorporated by reference; those disclosed in U.S. Pat. No. 5,907,021, the entire disclosure of which is hereby incorporated by reference; those disclosed in WO 88/05792, published Aug. 11, 1988, the entire disclosure of which is hereby incorporated by reference; those disclosed in WO88/05793, published Aug. 11, 1988, the entire disclosure of which is hereby incorporated by reference; those disclosed in WO 93/25590, published Dec. 23, 1993, the entire disclosure of which is hereby incorporated by reference; those disclosed in U.S. Pat. No. 5,599,761, the entire disclosure of which is hereby incorporated by reference; those disclosed in U.S. Pat. No. 5,218,071, the entire disclosure of which is hereby incorporated by reference; those disclosed in WO 90/07526, published Jul. 12, 1990, the entire disclosure of which is hereby incorporated by reference; those disclosed in U.S. Pat. No. 5,972,822, the entire disclosure of which is hereby incorporated by reference; those disclosed in U.S. Pat. No. 6,074,977, the entire disclosure of which is hereby incorporated by reference; those disclosed in U.S. Pat. No. 6,013,819, the entire disclosure of which is hereby incorporated by reference; those disclosed in U.S. Pat. No. 5,296,433, the entire disclosure of which is hereby incorporated by reference; those disclosed in U.S. Pat. No. 4,874,880, the entire disclosure of which is hereby incorporated by reference; those disclosed in U.S. Pat. No. 5,198,401, the entire disclosure of which is hereby incorporated by reference; those disclosed in U.S. Pat. No. 5,621,127, the entire disclosure of which is hereby incorporated by reference; those disclosed in U.S. Pat. No. 5,703,257, the entire disclosure of which is hereby incorporated by reference; those disclosed in U.S. Pat. No. 5,728,855, the entire disclosure of which is hereby incorporated by reference; those disclosed in U.S. Pat. No. 5,731,253, the entire disclosure of which is hereby incorporated by reference; those disclosed in U.S. Pat. No. 5,710,224, the entire disclosure of which is hereby incorporated by reference; those disclosed in U.S. Pat. No. 5,883,204, the entire disclosure of which is hereby incorporated by reference; those disclosed in U.S. Pat. No. 5,504,049, the entire disclosure of which is hereby incorporated by reference; those disclosed in U.S. Pat. No. 5,962,714, the entire disclosure of which is hereby incorporated by reference; those disclosed in U.S. Pat. No. 5,965,677, the entire disclosure of which is hereby incorporated by reference; those disclosed in U.S. Pat. No. 5,427,991, the entire disclosure of which is hereby incorporated by reference; those disclosed in WO 93/21238, published Oct. 28, 1993, the entire disclosure of which is hereby incorporated, by reference; those disclosed in WO 94/03506, published Feb. 17, 1994, the entire disclosure of which is hereby incorporated by reference; those disclosed in WO 93/21242, published Oct. 28, 1993, the entire disclosure of which is hereby incorporated by reference; those disclosed in WO 94/00500, published Jan. 6, 1994, the entire disclosure of which is hereby incorporated by reference; those disclosed in WO 96/00244, published Jan. 4, 1996, the entire disclosure of which is hereby incorporated by reference; those disclosed in WO 98/50392, published Nov. 12, 1998, the entire disclosure of which is hereby incorporated by reference; those disclosed in Wang, et al., Organometallics 1998, 17, 3149-3151, the entire disclosure of which is hereby incorporated by reference; those disclosed in Younkin, et al., Science 2000, 287, 460-462, the entire disclosure of which is hereby incorporated by reference; those disclosed by Chen and Marks, Chem. Rev. 2000, 100, 1391-1434, the entire disclosure of which is hereby incorporated by reference; those disclosed by Alt and Koppl, Chem. Rev. 2000, 100, 1205-1221, the entire disclosure of which is hereby incorporated by reference; those disclosed by Resconi, et al., Chem. Rev. 2000, 100, 1253-1345, the entire disclosure of which is hereby incorporated by reference; those disclosed by Ittel, et al., ChemRev. 2000, 100, 1169-1203, the entire disclosure of which is hereby incorporated by reference; those disclosed by Coates, Chem. Rev., 2000, 100, 1223-1251, the entire disclosure of which is hereby incorporated by reference; and those disclosed in WO 96/13530, published May 9, 1996, the entire disclosure of which is hereby incorporated by reference. Also useful are those catalysts, cocatalysts, and catalyst systems disclosed in U.S. Ser. No. 09/230,185, filed Jan. 15, 1999; U.S. Pat. No. 5,965,756; U.S. Pat. No. 6,150,297; U.S. Ser. No. 09/715,380, filed Nov. 17, 2000.

Methods for preparing the aforementioned catalysts are described, for example, in U.S. Pat. No. 6,015,868. In some embodiments, the following catalysts are used: 1) (N-1,1-dimethylethyl)-1,1-(4-methylphenyl)-1-((1,2,3,3 a,7a-n)-3-(1,3-dihydro-2H-isoindol-2-yl)-1H-inden-1-yl)silanaminato-(2-)-N—)dimethyltitanium; and 2) (N-1,1-dimethylethyl)-1,1-(4-butylphenyl)-1-((1,2,3,3a,7a-n)-3-(1,3-dihydro-2H-isoindol-2-yl)-1H-inden-1-yl) silanaminato-(2-)-N—)dimethyltitanium. The chemical structures of certain of these catalysts are illustrated in FIG. 1.

Cocatalysts:

The above-described catalysts may be rendered catalytically active by combination with an activating cocatalyst or by use of an activating technique. Suitable activating cocatalysts for use herein include, but are not limited to, polymeric or oligomeric alumoxanes, especially methylalumoxane, triisobutyl aluminum modified methylalumoxane, or isobutylalumoxane; neutral Lewis acids, such as $C_{1-30}$ hydrocarbyl substituted Group 13 compounds, especially tri(hydrocarbyl) aluminum- or tri(hydrocarbyl)boron compounds and halogenated (including perhalogenated) derivatives thereof, having from 1 to 30 carbons in each hydrocarbyl or halogenated hydrocarbyl group, more especially perfluorinated tri(aryl) boron and perfluorinated tri(aryl)aluminum compounds, mixtures of fluoro-substituted(aryl)boron compounds with alkyl-containing aluminum compounds, especially mixtures of tris(pentafluorophenyl)borane with trialkylaluminum or mixtures of tris(pentafluorophenyl)borane with alkylalumoxanes, more especially mixtures of tris(pentafluorophenyl)borane with methylalumoxane and mixtures of tris(pentafluorophenyl)borane with methylalumoxane modified with a percentage of higher alkyl groups (MMAO), and most especially tris(pentafluorophenyl)borane and tris(pentafluorophenyl)aluminum; non-polymeric, compatible, non-coordinating, ion forming compounds (including the use of such compounds under oxidizing conditions), especially the use of ammonium-, phosphonium-, oxonium-, carbonium-, silylium- or sulfonium-salts of compatible, non-coordinating anions, or ferrocenium salts of compatible, non-coordinating anions; bulk electrolysis and combinations of the foregoing activating cocatalysts and techniques. The foregoing activating cocatalysts and activating techniques have been previously taught with respect to different metal complexes in the following references: EP-A-277,003, U.S. Pat. No. 5,153,157, U.S. Pat. No. 5,064,802, EP-A-468,651 (equivalent to U.S. Ser. No. 07/547,718), EP-A-520,732 (equivalent to U.S. Ser. No. 07/876,268), and EP-A-520,732 (equivalent to U.S. Ser. No. 07/884,966 filed May 1, 1992). The disclosures of the all of the preceding patents or patent applications are incorporated by reference herein in their entirety.

Combinations of neutral Lewis acids, especially the combination of a trialkyl aluminum compound having from 1 to 4 carbons in each alkyl group and a halogenated tri(hydrocarbyl)boron compound having from 1 to 20 carbons in each hydrocarbyl group, especially tris(pentafluorophenyl)borane, further combinations of such neutral Lewis acid mixtures with a polymeric or oligomeric alumoxane, and combinations of a single neutral Lewis acid, especially tris (pentafluorophenyl)borane with a polymeric or oligomeric alumoxane are especially desirable activating cocatalysts. It has been observed that the most efficient catalyst activation using such a combination of tris(pentafluoro-phenyl)borane/alumoxane mixture occurs at reduced levels of alumoxane. Preferred molar ratios of Group 4 metal complex:tris(pentafluoro-phenylborane:alumoxane are from 1:1:1 to 1:5:10, more preferably from 1:1:1 to 1:3:5. Such efficient use of lower levels of alumoxane allows for the production of olefin polymers with high catalytic efficiencies using less of the expensive alumoxane cocatalyst. Additionally, polymers with lower levels of aluminum residue, and hence greater clarity, are obtained.

Suitable ion forming compounds useful as cocatalysts in some embodiments of the invention comprise a cation which is a Bronsted acid capable of donating a proton, and a compatible, non-coordinating anion, $A^-$. As used herein, the term "non-coordinating" means an anion or substance which either does not coordinate to the Group 4 metal containing precursor complex and the catalytic derivative derived therefrom, or which is only weakly coordinated to such complexes thereby remaining sufficiently labile to be displaced by a neutral Lewis base. A non-coordinating anion specifically refers to an anion which, when functioning as a charge balancing anion in a cationic metal complex, does not transfer an anionic substituent or fragment thereof to the cation thereby forming neutral complexes during the time which would substantially interfere with the intended use of the cationic metal complex as a catalyst. "Compatible anions" are anions which are not degraded to neutrality when the initially formed complex decomposes and are non-interfering with desired subsequent polymerization or other uses of the complex.

Preferred anions are those containing a single coordination complex comprising a charge-bearing metal or metalloid core which anion is capable of balancing the charge of the active catalyst species (the metal cation) which may be formed when the two components are combined. Also, the anion should be sufficiently labile to be displaced by olefinic, diolefinic and acetylenically unsaturated compounds or other neutral Lewis bases such as ethers or nitrites. Suitable metals include, but are not limited to, aluminum, gold and platinum. Suitable metalloids include, but are not limited to, boron, phosphorus, and silicon. Compounds containing anions which comprise coordination complexes containing a single metal or metalloid atom are, of course, known in the art and many, particularly such compounds containing a single boron atom in the anion portion, are available commercially.

Preferably such cocatalysts may be represented by the following general formula:

$$(L^*-H)_d^{30}(A)^{d-} \qquad \text{Formula VII}$$

wherein L* is a neutral Lewis base; (L*−H)+ is a Bronsted acid; $A^{d-}$ is an anion having a charge of d−, and d is an integer from 1 to 3. More preferably $A^{d-}$ corresponds to the formula: $[M'Q_4]^-$, wherein M' is boron or aluminum in the +3 formal oxidation state; and Q independently each occurrence is selected from hydride, dialkylamido, halide, hydrocarbyl, hydrocarbyloxide, halosubstituted-hydrocarbyl, halosubstituted hydrocarbyloxy, and halo-substituted silylhydrocarbyl radicals (including perhalogenated hydrocarbyl-perhalogenated hydrocarbyloxy- and perhalogenated silylhydrocarbyl radicals), the Q having up to 20 carbons with the proviso that in not more than one occurrence is Q halide. Examples of suitable hydrocarbyloxide Q groups are disclosed in U.S. Pat. No. 5,296,433.

In a more preferred embodiment, d is one, that is, the counter ion has a single negative charge and is $A^-$. Activating cocatalysts comprising boron which are particularly useful in the preparation of catalysts of this invention may be represented by the following general formula:

$$(L^*-H)^+(M'Q_4)^-; \qquad \text{Formula VIII}$$

wherein L* is as previously defined; M' is boron or aluminum in a formal oxidation state of 3; and Q is a hydrocarbyl-, hydrocarbyloxy-, fluorinated hydrocarbyl-, fluorinated hydrocarbyloxy-, or fluorinated silylhydrocarbyl-group of up to 20 non-hydrogen atoms, with the proviso that in not more than one occasion is Q hydrocarbyl. Most preferably, Q in each occurrence is a fluorinated aryl group, especially a pentafluorophenyl group. Preferred $(L^*-H)^+$ cations are N,N-dimethylanilinium, N,N-di(octadecyl)anilinium, di(o-ctadecyl)methylammonium, methylbis(hydrogenated tallowyl) ammonium, and tributylammonium.

Illustrative, but not limiting, examples of boron compounds which may be used as an activating cocatalyst are tri-substituted ammonium salts such as: trimethylammonium tetrakis(pentafluorophenyl)borate; triethylammonium tetrakis(pentafluorophenyl)borate; tripropylammonium tetrakis (pentafluorophenyl)borate; tri(n-butyl)ammonium tetrakis (pentafluorophenyl)borate; tri(sec-butyl)ammonium tetrakis (pentafluorophenyl)borate; N,N-dimethylanilinium tetrakis (pentafluorophenyl)borate; N,N-dimethylanilinium n-butyltris(pentafluorophenyl) borate; N,N-dimethylanilinium benzyltris(pentafluorophenyl) borate; N,N-dimethylanilinium tetrakis(4-(t-butyldimethylsilyl)-2, 3, 5, 6-tetrafluorophenyl) borate; N,N-dimethylanilinium tetrakis(4-(triisopropylsilyl)-2, 3, 5, 6-tetrafluorophenyl)borate; N,N-dimethylanilinium pentafluoro phenoxytris (pentafluorophenyl)borate; N,N-diethylanilinium tetrakis (pentafluorophenyl)borate; N,N-dimethyl-2,4,6-trimethylanilinium tetrakis(pentafluorophenyl)borate; trimethylammonium tetrakis(2,3,4,6-tetrafluorophenyl)borate; triethylammonium tetrakis(2,3,4,6-tetrafluorophenyl) borate; tripropylammonium tetrakis(2,3,4,6-tetrafluorophenyl)borate; tri(n-butyl)ammonium tetrakis(2,3,4,6-tetrafluorophenyl)borate, dimethyl(t-butyl)ammonium tetrakis(2,3,4,6-tetra fluorophenyl)borate; N,N-dimethylanilinium tetrakis(2,3,4,6-tetrafluorophenyl)borate; N,N-diethylanilinium tetrakis(2,3,4,6-tetrafluorophenyl)borate; and N,N-dimethyl-2,4,6-trimethylanilinium tetrakis(2,3,4,6-tetrafluorophenyl) borate; dialkyl ammonium salts such as: di-(i-propyl)ammonium tetrakis(pentafluorophenyl)borate, and dicyclohexylammonium tetrakis(pentafluorophenyl)borate; tri-substituted phosphonium salts such as: triphenylphosphonium tetrakis(pentafluorophenyl)borate, tri(o-tolyl)phosphonium tetrakis(pentafluorophenyl)borate, and tri(2,6-dimethylphenyl)phosphonium tetrakis(pentafluorophenyl)borate; di-substituted oxonium salts such as: diphenyloxonium tetrakis(pentafluorophenyl)borate, di(o-tolyl)oxonium tetrakis (pentafluorophenyl)borate, and di(2,6-dimethylphenyl)oxonium tetrakis(pentafluorophenyl)borate; di-substituted sulfonium salts such as: diphenylsulfonium tetrakis(pentafluorophenyl)borate, di(o-tolyl)sulfonium tetrakis(pentafluorophenyl)borate, and bis(2,6-dimethylphenyl)sulfonium tetrakis(pentafluorophenyl)borate.

Another suitable ion forming, activating cocatalyst comprises a salt of a cationic oxidizing agent and a non-coordinating, compatible anion represented by the formula:

$$(Ox^{e+})_d(A^{d-})_e \qquad \text{Formula IX}$$

wherein: $Ox^{e+}$ is a cationic oxidizing agent having a charge of e+; e is an integer from 1 to 3; and $A^{d-}$ and d are as previously defined.

Examples of cationic oxidizing agents include, but are not limited to, ferrocenium, hydrocarbyl-substituted ferrocenium, $Ag^+$, or $Pb^{+2}$. Preferred embodiments of $A^{d-}$ are those anions previously defined with respect to the Bronsted acid containing activating cocatalysts, especially tetrakis(pentafluorophenyl)borate.

Another suitable ion forming, activating cocatalyst comprises a compound which is a salt of a carbenium ion and a non-coordinating, compatible anion represented by the formula: $©^+ A^-$, wherein $©^+$ is a $C_{1-20}$ carbenium ion; and $A^-$ is as previously defined. A preferred carbenium ion is the trityl cation, that is triphenylmethylium.

A further suitable ion forming, activating cocatalyst comprises a compound which is a salt of a silylium ion and a non-coordinating, compatible anion represented by the formula:

$$R_3Si(X')_q^+A^- \qquad \text{Formula X}$$

wherein: R is $C_{1-10}$ hydrocarbyl, and X', q and $A^-$ are as previously defined.

Preferred silylium salt activating cocatalysts include, but are not limited to, trimethylsilylium tetrakispentafluorophenylborate, triethylsilylium tetrakispentafluorophenylborate and ether substituted adducts thereof. Silylium salts have been previously generically disclosed in J. Chem. Soc. Chem. Comm., 1993, 383-384, as well as Lambert, J. B., et al., Organometallics, 1994, 13, 2430-2443. The use of the above silylium salts as activating cocatalysts for addition polymerization catalysts is disclosed in U.S. Pat. No. 5,625,087, which is incorporated by reference herein in its entirety. Certain complexes of alcohols, mercaptans, silanols, and oximes with tris(pentafluorophenyl)borane are also effective catalyst activators and may be used in embodiments of the invention. Such cocatalysts are disclosed in U.S. Pat. No. 5,296,433, which is also incorporated by reference herein in its entirety.

The catalyst system may be prepared as a homogeneous catalyst by addition of the requisite components to a solvent in which polymerization will be carried out by solution polymerization procedures. The catalyst system may also be prepared and employed as a heterogeneous catalyst by adsorbing the requisite components on a catalyst support material such as silica gel, alumina or other suitable inorganic support material. When prepared in heterogeneous or supported form, it is preferred to use silica as the support material. The heterogeneous form of the catalyst system may be employed in a slurry polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or in part as the diluent. Likewise the α-olefin monomer or a mixture of different α-olefin monomers may be used in whole or part as the diluent. Most preferably, the major part of the diluent comprises at least the α-olefin monomer or monomers to be polymerized.

At all times, the individual ingredients, as well as the catalyst components, should be protected from oxygen and moisture. Therefore, the catalyst components and catalysts should be prepared and recovered in an oxygen and moisture free atmosphere. Preferably, therefore, the reactions are performed in the presence of a dry, inert gas such as, for example, nitrogen or argon.

The amount of long chain branching can be influenced by the catalyst selection as well as the specifics of the process conditions used in the novel process described herein. The amount of long chain branching (in terms of LCB per 1000 carbon atoms of the polymer) generally increases with higher levels of vinyl-terminated polymer chains. Because different catalysts exhibit different levels of vinyl termination relative to other forms of termination, a catalyst having a higher level of vinyl termination preferably should be selected in order to increase the amount of long-chain branching. Preferably, the ratio, $R_v$, of vinyl terminated chains to the sum of all of the thermally-induced unsaturated chain ends (for example, vinyl+vinylidene+cis+trans for an ethylene/alpha olefin copolymer) should be as high as possible.

The $R_v$ ratio is defined by the equation:

$$R_v = \frac{[\text{vinyl}]}{[\text{vinyl}] + [\text{vinylidene}] + [\text{cis}] + [\text{trans}]}$$

wherein [vinyl] is the concentration of vinyl groups in the isolated polymer in vinyls/1,000 carbon atoms; [vinylidene], [cis], and [trans] are the concentration of vinylidene, cis and trans groups in the isolated polymer in amount/1,000 carbon atoms, respectively. The determination of unsaturated chain ends can be accomplished by methods which are known in the art, including preferably NMR spectroscopy, particularly $^{13}C$ NMR spectroscopy, and most preferably $^1H$ NMR spectroscopy. An example of the use of $^1H$ NMR spectroscopy to quantify unsaturated chain ends in ethylene/alpha olefin copolymers is given in Hasegawa, et al. (J. Poly. Sci., Part A, Vol 38 (2000), pages 4641-4648), the disclosure of which is incorporated herein by reference.

In order to obtain a polymer product with relatively higher levels of LCB, catalysts preferably should be chosen that produce high levels of vinyl terminated chains. Preferably, the ratio of the vinyl groups to the sum of all of the terminal unsaturations, $R_v$, is relatively high. In some embodiments, 5 to about 50 of the polymer chains are vinyl terminated. Other suitable catalysts may produce greater or fewer numbers of vinyl groups.

In one aspect of this invention, for ethylene homopolymers produced using more than one catalyst in a single reactor, $R_v$ is $\geqq 0.14$ for each catalyst; preferably, $R_v$ is $\geqq 0.17$; more preferably $R_v$ is ≧0.19; most preferably $R_v$ is ≧0.21. For ethylene interpolymers having a density of ≧0.920 g/mL produced using more than one catalyst in a single reactor, $R_v$ is ≧0.13 for each catalyst; preferably, $R_v$ is ≧0.15, more preferably $R_v$ is ≧0.17, most preferably $R_v$ is ≧0.19. For ethylene interpolymers having a density greater than or equal to 0.900 g/mL but less than 0.920 g/mL produced using more than one catalyst in a single reactor, $R_v$ is ≧0.12 for each catalyst; preferably, $R_v$ is ≧0.14; more preferably $R_v$ is ≧0.16; most preferably $R_v$ is ≧0.18. For ethylene interpolymers having a density greater than or equal to 0.880 g/mL but less than 0.900 g/mL produced using more than one catalyst in a single reactor, $R_v$ is ≧0.10 for each catalyst; preferably, $R_v$ is ≧0.12; more preferably $R_v$ is ≧0.14; most preferably $R_v$ is ≧0.16. For ethylene interpolymers having a density less than 0.880 g/mL produced using more than one catalyst in a single reactor, $R_v$ is ≧0.08 for each catalyst; preferably, $R_v$ is ≧0.10; more preferably $R_v$ is ≧0.12; most preferably $R_v$ is ≧0.16.

In some embodiments of the invention, $R_v$ for one or both of the catalysts is substantially higher. Some catalysts have $R_v$ values of about 0.25, about 0.30, about 0.35 or about 0.40. Other catalysts are characterized by an $R_v$ of equal to or greater that about 0.50, about 0.60, or about 0.75.

In some embodiments, the catalyst pairs are selected to give substantially equal amounts of long chain branching in the HMW component and the LMW component. Thus, the ratio $R_v^L/R_v^H$ may be greater or less than 1. Preferably, the $R_v^L/R_v^H$ ratio ranges from 0.5 to about 2.0. In some embodiments, the $R_v^L/R_v^H$ ratio is about 0.60, 0.70, 0.80 or 0.90. In other embodiments, the ratio is about 1.00, about 1.20, about 1.30 or about 1.40. In still other embodiments, $R_v^L/R_v^H$ is about 1.5, about 1.6, about 1.7, about 1.8 or about 1.9. Catalyst pairs in which the low molecular weight catalyst has an $R_v$ value that is higher than the $R_v$ of the high molecular weight catalyst may be desirable for producing polymers having increased branching in the LMW component of the polymer composition.

Catalyst pairs may be selected by applying the following criteria. The vinyl generation, comonomer incorporation, and relative molecular weight response is determined for each catalyst by analysis according to General Procedure for Determining $R_v$ and Comonomer Incorporation, described below. For the low molecular weight catalyst, a $R_v$ greater than about 0.2, about 0.3, about 0.4 or about 0.5 is useful. The high molecular weight catalyst is selected according to two criteria. First, the mole % I-octene incorporation under the conditions of the test should be greater than 2%, preferably greater than 2.5%. In some embodiments, the 1-octene incorporation may be greater than about 3.0%, greater than about 4.0%, or greater than 5.0%. The incorporation of long chain branches is generally better for catalysts that can incorporate higher amounts of alpha olefins. The second criteria is based on the molecular weight of the polymer produced by the low molecular weight catalyst. The high molecular weight catalyst should produce a polymer with a $M_w$, as determined by the experiment described in Example 20, greater than about two times the $M_w$ of the polymer produced by the low molecular weight catalyst.

The molar ratio of catalyst/cocatalyst employed preferably ranges from 1:10,000 to 100:1, more preferably from 1:5000 to 10:1, most preferably from 1:1000 to 1:1. Alumoxane, when used by itself as an activating cocatalyst, is generally employed in large quantity, generally at least 100 times the quantity of metal complex on a molar basis. Tris(pentafluorophenyl)borane and tris(pentafluorophenyl)aluminum, where used as an activating cocatalyst are preferably employed in a molar ratio to the metal complex of from 0.5:1 to 10:1, more preferably from 1:1 to 6:1 most preferably from 1:1 to 5:1. The remaining activating cocatalysts are generally employed in approximately equimolar quantity with the metal complex.

In general, the polymerization may be accomplished at conditions known in the art for Ziegler-Natta or Kaminsky-Sinn type polymerization reactions, that is, temperatures from −50 to 250° C., preferably 30 to 200° C. and pressures from atmospheric to 10,000 atmospheres. Suspension, solution, slurry, gas phase, solid state powder polymerization or other process condition may be employed if desired. A support, especially silica, alumina, or a polymer (especially polytetrafluoroethylene or a polyolefin) may be employed, and desirably is employed when the catalysts are used in a gas phase or slurry polymerization process. Preferably, the support is passivated before the addition of the catalyst. Passivation techniques are known in the art, and include treatment of the support with a passivating agent such as triethylaluminum. The support is preferably employed in an amount to provide a weight ratio of catalyst (based on metal):support from about 1:100,000 to about 1:10, more preferably from about 1:50,000 to about 1:20, and most preferably from about 1:10,000 to about 1:30. In most polymerization reactions, the molar ratio of catalyst:polymerizable compounds employed preferably is from about $10^{-12}$:1 to about $10^{-1}$:1, more preferably from about $10^{-9}$:1 to about $10^{-5}$:1.

Suitable solvents for polymerization are inert liquids. Examples include, but are not limited to, straight and branched-chain hydrocarbons such as isobutane, butane, pentane, hexane, heptane, octane, and mixtures thereof, mixed aliphatic hydrocarbon solvents such as kerosene and ISOPAR (available from Exxon Chemicals), cyclic and alicyclic hydrocarbons such as cyclohexane, cycloheptane, methylcyclohexane, methylcycloheptane, and mixtures thereof; perfluorinated hydrocarbons such as perfluorinated $C_{4-10}$ alkanes, and the like, and aromatic and alkyl-substituted aromatic compounds such as benzene, toluene, xylene, ethylbenzene and the like. Suitable solvents also include, but are not limited to, liquid olefins which may act as monomers or comonomers including ethylene, propylene, butadiene, cyclopentene, 1-hexene, 1-hexane, 4-vinylcyclohexene, vinylcyclohexane, 3-methyl-1-pentene, 4-methyl-1-pentene, 1,4-hexadiene, 1-octene, 1-decene, styrene, divinylbenzene, allylbenzene, vinyltoluene (including all isomers alone or in admixture), and the like. Mixtures of the foregoing are also suitable.

The catalysts may be utilized in combination with at least one additional homogeneous or heterogeneous polymerization catalyst in separate reactors connected in series or in parallel to prepare polymer blends having desirable properties. An example of such a process is disclosed in WO 94/00500, equivalent to U.S. Ser. No. 07/904,770, as well as U.S. Ser. No. 08/10,958, filed Jan. 29, 1993. The disclosures of the patent applications are incorporated by references herein in their entirety.

The catalyst system may be prepared as a homogeneous catalyst by addition of the requisite components to a solvent in which polymerization will be carried out by solution polymerization procedures. The catalyst system may also be prepared and employed as a heterogeneous catalyst by adsorbing the requisite components on a catalyst support material such as silica gel, alumina or other suitable inorganic support material. When prepared in heterogeneous or supported form, it is preferred to use silica as the support material. The heterogeneous form of the catalyst system may be employed in a slurry polymerization. As a practical limitation, slurry polymerization takes place in liquid diluents in which the polymer product is substantially insoluble. Preferably, the diluent for slurry polymerization is one or more hydrocarbons with less than 5 carbon atoms. If desired, saturated hydrocarbons such as ethane, propane or butane may be used in whole or in part as the diluent. Likewise the α-olefin monomer or a mixture of different α-olefin monomers may be used in whole or part as the diluent. Most preferably, the major part of the diluent comprises at least the α-olefin monomer or monomers to be polymerized.

Solution polymerization conditions utilize a solvent for the respective components of the reaction. Preferred solvents include, but are not limited to, mineral oils and the various hydrocarbons which are liquid at reaction temperatures and pressures. Illustrative examples of useful solvents include, but are not limited to, alkanes such as pentane, iso-pentane, hexane, heptane, octane and nonane, as well as mixtures of alkanes including kerosene and Isopar E™, available from Exxon Chemicals Inc.; cycloalkanes such as cyclopentane, cyclohexane, and methylcyclohexane; and aromatics such as benzene, toluene, xylenes, ethylbenzene and diethylbenzene.

The polymerization may be carried out as a batch or a continuous polymerization process. A continuous process is preferred, in which event catalysts, solvent or diluent (if employed), and comonomers (or monomer) are continuously supplied to the reaction zone and polymer product continuously removed therefrom. The polymerization conditions for manufacturing the interpolymers according to embodiments of the invention are generally those useful in the solution polymerization process, although the application is not limited thereto. Gas phase and slurry polymerization processes are also believed to be useful, provided the proper catalysts and polymerization conditions are employed.

In some embodiments, the polymerization is conducted in a continuous solution polymerization system comprising two reactors connected in series or parallel. One or both reactors contain at least two catalysts which have a substantially similar comonomer incorporation capability but different molecular weight capability. In one reactor, a relatively high molecular weight product ($M_w$ from 100,000 to over 1,000,000, more preferably 200,000 to 1,000,000) is formed while in the second reactor a product of a relatively low molecular weight ($M_w$ 2,000 to 300,000) is formed. The final product is a mixture of the reactor effluents which are combined prior to devolatilization to result in a uniform mixing of the two polymer products. Such a dual reactor/dual catalyst process allows for the preparation of products with tailored properties. In one embodiment, the reactors are connected in series, that is the effluent from the first reactor is charged to the second reactor and fresh monomer, solvent and hydrogen is added to the second reactor. Reactor conditions are adjusted such that the weight ratio of polymer produced in the first reactor to that produced in the second reactor is from 20:80 to 80:20. In addition, the temperature of the second reactor is controlled to produce the lower molecular weight product. In one embodiment, the second reactor in a series polymerization process contains a heterogeneous Ziegler-Natta catalyst or chrome catalyst known in the art. Examples of Ziegler-Natta catalysts include, but are not limited to, titanium-based catalysts supported on $MgCl_2$, and additionally comprise compounds of aluminum containing at least one aluminum-alkyl bond. Suitable Ziegler-Natta catalysts and their preparation include, but are not limited to, those disclosed in U.S. Pat. No. 4,612,300, U.S. Pat. No. 4,330,646, and U.S. Pat. No. 5,869,575. The disclosures of each of these three patents are herein incorporated by reference.

In some embodiments, ethylene is added to the reaction vessel in an amount to maintain a differential pressure in excess of the combined vapor pressure of the α-olefin and diene monomers. The ethylene content of the polymer is determined by the ratio of ethylene differential pressure to the total reactor pressure. Generally the polymerization process is carried out with a pressure of ethylene of from 10 to 1000 psi (70 to 7000 kPa), most preferably from 40 to 800 psi (30 to 600 kPa). The polymerization is generally conducted at a temperature of from 25 to 250° C., preferably from 75 to 200° C., and most preferably from greater than 95 to 200° C.

The optional cocatalysts and scavenger components in the novel process can be independently mixed with each catalyst component before the catalyst components are introduced into the reactor, or they may each independently be fed into the reactor using separate streams, resulting in "in reactor" activation. Scavenger components are known in the art and include, but are not limited to, alkyl aluminum compounds, including alumoxanes. Examples of scavengers include, but are not limited to, trimethyl aluminum, triethyl aluminum, triisobutyl aluminum, trioctyl aluminum, methylalumoxane (MAO), and other alumoxanes including, but not limited to, MMAO-3A, MMAO-7, PMAO-IP (all available from Akzo Nobel).

For the novel processes described herein, the polymer properties can be tailored by adjustment of process conditions. Process conditions generally refer to temperature, pressure, monomer content (including comonomer concentration), catalyst concentration, cocatalyst concentration, activator concentration, etc., that influence the molecular weight or branching of the polymer produced. In general, for ethylene based polymers, the amount of long chain branching increases with a decrease in the concentration of ethylene. Thus, particularly in solution polymerization, the amount of long-chain branching can be controlled by adjusting the ethylene concentration, reactor temperature, and polymer concentration. In general, higher reactor temperatures lead to a higher level of polymer molecules that have unsaturated end groups. Long chain branching can be increased by selecting catalysts that generate a relatively large percentage of vinyl end groups, selecting catalysts having relatively high comonomer incorporating ability (i.e., low $r_1$), operating at relatively high reactor temperature at low ethylene and comonomer concentration, and high polymer concentration. By proper selection of process conditions, including catalyst selection, polymers with tailored properties can be produced. For a solution polymerization process, especially a continuous solution polymerization, preferred ranges of ethylene concentration at steady state are from about 0.25 weight percent of the total reactor contents to about 5 weight percent of the total reactor contents, and the preferred range of polymer concentration is from about 10% of the reactor contents by weight to about 45% of the reactor contents or higher.

Applications:

The polymers made in accordance with embodiments of the invention have many useful applications. For example, fabricated articles made from the polymers may be prepared using all of the conventional polyolefin processing techniques. Useful articles include films (e.g., cast, blown and extrusion coated), including multi-layer films, fibers (e.g., staple fibers) including use of an interpolymer disclosed herein as at least one component comprising at least a portion of the fiber's surface, spunbond fibers or melt blown fibers (using, e.g., systems as disclosed in U.S. Pat. No. 4,430,563, U.S. Pat. No. 4,663,220, U.S. Pat. No. 4,668,566, or U.S. Pat. No. 4,322,027, all of which are incorporated herein by reference), and gel spun fibers (e.g., the system disclosed in U.S.

Pat. No. 4,413,110, incorporated herein by reference), both woven and nonwoven fabrics (e.g., spun-laced fabrics disclosed in U.S. Pat. No. 3,485,706, incorporated herein by reference) or structures made from such fibers (including, e.g., blends of these fibers with other fibers, e.g., PET or cotton) and molded articles (e.g., made using an injection molding process, a blow molding process or a rotomolding process). Monolayer and multilayer films may be made according to the film structures and fabrication methods described in U.S. Pat. No. 5,685,128, which is incorporated by reference herein in its entirety. The polymers described herein are also useful for wire and cable coating operations, as well as in sheet extrusion for vacuum forming operations.

Specific applications wherein the inventive polymers disclosed herein may be used include, but are not limited to, greenhouse films, shrink film, clarity shrink film, lamination film, extrusion coating, liners, clarity liners, overwrap film, agricultural film, high strength foam, soft foam, rigid foam, cross-linked foam, high strength foam for cushioning applications, sound insulation foam, blow molded bottles, wire and cable jacketing, including medium and high voltage cable jacketing, wire and cable insulation, especially medium and high voltage cable insulation, telecommunications cable jackets, optical fiber jackets, pipes, and frozen food packages. Some such uses are disclosed in U.S. Pat. No. 6,325,956, incorporated here by reference in its entirety. Additionally, the polymers disclosed herein may replace one or more of those used in the compositions and structures described in U.S. Pat. No. 6,270,856, U.S. Pat. No. 5,674,613, U.S. Pat. No. 5,462,807, U.S. Pat. No. 5,246,783, and U.S. Pat. No. 4,508,771, each of which is incorporated herein by reference in its entirety. The skilled artisan will appreciate other uses for the novel polymers and compositions disclosed herein.

Useful compositions are also suitably prepared comprising the polymers according to embodiments of the invention and at least one other natural or synthetic polymer. Preferred other polymers include, but are not limited to, thermoplastics, such as styrene-butadiene block copolymers, polystyrene (including high impact polystyrene), ethylene vinyl alcohol copolymers, ethylene vinyl acetate copolymers, ethylene acrylic acid copolymers, other olefin copolymers (especially polyethylene copolymers) and homopolymers (e.g., those made using conventional heterogeneous catalysts). Examples include polymers made by the process of U.S. Pat. No. 4,076,698, incorporated herein by reference, other linear or substantially linear polymers as described in U.S. Pat. No. 5,272,236, and mixtures thereof. Other substantially linear polymers and conventional HDPE and/or LDPE may also be used in the thermoplastic compositions.

EXAMPLES

The following examples are given to illustrate various embodiments of the invention. They do not intend to limit the invention as otherwise described and claimed herein. All numerical values are approximate. When a numerical range is given, it should be understood that embodiments outside the range are still within the scope of the invention unless otherwise indicated. In the following examples, various polymers were characterized by a number of methods. Performance data of these polymers were also obtained. Most of the methods or tests were performed in accordance with an ASTM standard, if applicable, or known procedures.

Unless indicated otherwise, the following testing procedures are to be employed:

Density is measured in accordance with ASTM D-792. The samples are annealed at ambient conditions for 24 hours before the measurement is taken.

The molecular weight of polyolefin polymers is conveniently indicated using a melt index measurement according to ASTM D-1238, Condition 190° C./2.16 kg (formerly known as "Condition E" and also known as $I_2$). Melt index is inversely proportional to the molecular weight of the polymer. Thus, the higher the molecular weight, the lower the melt index, although the relationship is not linear. The overall 12 melt index of the novel composition is in the range of from 0.01 to 1000 g/10 minutes. Other measurements useful in characterizing the molecular weight of ethylene interpolymer compositions involve melt index determinations with higher weights, such as, for common example, ASTM D-1238, Condition 190° C./10 kg (formerly known as "Condition N" and also known as $I_{10}$). The ratio of a higher weight melt index determination to a lower weight determination is known as a melt flow ratio, and for measured $I_{10}$ and the $I_2$ melt index values the melt flow ratio is conveniently designated as $I_{10}/I_2$.

Gel Permeation Chromatography (GPC) data were generated using either a Waters 150C/ALC, a Polymer Laboratories Model PL-210 or a Polymer Laboratories Model PL-220. The column and carousel compartments were operated at 140° C. The columns used were 3 Polymer Laboratories 10 micron Mixed-B columns. The samples were prepared at a concentration of 0.1 grams of polymer in 50 milliliters of 1,2,4 trichlorobenzene. The 1,2,4 trichlorobenzene used to prepare the samples contained 200 ppm of butylated hydroxytoluene (BHT). Samples were prepared by agitating lightly for 2 hours at 160° C. The injection volume used was 100 microliters and the flow rate was 1.0 milliliters/minute. Calibration of the GPC was performed with narrow molecular weight distribution polystyrene standards purchased from Polymer Laboratories. These polystyrene standard peak molecular weights were converted to polyethylene molecular weights using the following equation (as described in Williams and Ward, J. Polym. Sci., Polym. Let., 6, 621 (1968).:

$$M_{polyethylene}=Ax(M_{polystyrene})^B$$

where M is the molecular weight, A has a value of 0.4316 and B is equal to 1.0. The molecular weight calculations were performed with the Viscotek TriSEC software.

The GPC data were then deconvoluted to give the most probable fit for two molecular weight components. There are a number of deconvolution algorithms available both commercially and in the literature. These may lead to different answers depending upon the assumptions used. The algorithm summarized here is optimized for the deconvolution problem of the two most probable molecular weight distributions (plus an adjustable error term). In order to allow for the variations in the underlying distributions due to the macromer incorporation and small fluctuations in the reactor conditions (i.e. temperature, concentration) the basis functions were modified to incorporate a normal distribution term. This term allows the basis function for each component to be "smeared" to varying degrees along the molecular weight axis. The advantage is that in the limit (low LCB, perfect concentration and temperature control) the basis function will become a simple, most probable, Flory distribution.

Three components (j=1,2,3) are derived with the third component (j=3) being an adjustable error term. The GPC data must be normalized and properly transformed into weight fraction versus $Log_{10}$ molecular weight vectors. In other words, each potential curve for deconvolution should consist of a height vector, $h_i$, where the heights are reported at known intervals of $Log_{10}$ molecular weight, the $h_i$ have been properly transformed from the elution volume domain to the $Log_{10}$ molecular weight domain, and the $h_i$ are normalized. Additionally, these data should be made available for the Microsoft EXCEL™ application.

Several assumption are made in the deconvolution. Each component, j, consists of a most probable, Flory, distribution which has been convoluted with a normal or Gaussian spreading function using a parameter, $\sigma_j$. The resulting, three basis functions are used in a Chi-square, $X^2$, minimization routine to locate the parameters that best fit the n points in $h_i$, the GPC data vector.

$$X^2(\mu_j, \sigma_j, w_j) = \sum_{i=1}^{n}\left[\sum_{j=1}^{3}\cdot\sum_{k=1}^{20} w_j \cdot M_i^2 \cdot \lambda_{j,k}^2 \cdot CumND_{j,k} \cdot e^{-\lambda_{j,k}\cdot M_i} \cdot \Delta Log_{10}M - h_i\right]^2$$

$$\lambda_{j,k} = 10^{\mu_j + \frac{k-10}{3}\cdot\sigma_j}$$

The variable, $CumND_{j,k}$, is calculated using the EXCEL™ function "NORMDIST (x, mean, standard_dev, cumulative)" with the parameters set as follows:

$x=\mu_j+(k-10)*\sigma_j/3$ $mean=\mu_j$ $standard\ dev=\sigma_j$ cumulative=TRUE Table I below summarizes these variables and their definitions. The use of the EXCEL™ software application, Solver, is adequate for this task. Constraints are added to Solver insure proper minimization.

TABLE I

Variable Definitions

| Variable Name | Definition |
|---|---|
| $\lambda_{j,k}$ | Reciprocal of the number average molecular weight of most probable (Flory) distribution for component j, normal distribution slice k |
| $\sigma_j$ | Sigma (square root of variance) for normal (Gaussian) spreading function for component j. |
| $w_j$ | Weight fraction of component j |
| K | Normalization term (1.0/$Log_e$ 10) |
| $M_i$ | Molecular weight at elution volume slice i |
| $h_i$ | Height of $log_{10}$ (molecular weight) plot at slice i |
| n | Number of slices in Log molecular weight plot |
| i | Log molecular weight slice index (1 to n) |
| j | Component index (1 to 3) |
| 1. k | Normal distribution slice index |
| $\Delta log_{10}M$ | Average difference between $log_{10}M_i$ and $log_{10}M_{i-1}$ in height vs. $log_{10}M$ plot |

The 8 parameters that are derived from the Chi-square minimization are $\mu_1$, $\mu_2$, $\mu_3$, $\sigma_1$, $\sigma_2$, $\sigma_3$, $w_1$, and $w_2$. The term $w_3$ is subsequently derived from w, and $w_2$ since the sum of the 3 components must equal 1. Table II is a summary of the Solver constraints used in the EXCEL program.

TABLE II

Constraint summary

| Description | Constraint |
|---|---|
| Maximum of fraction 1 | $w_1 < 0.95$ (User adjustable) |
| Lower limit of spreading function | $\sigma_1, \sigma_2, \sigma_3 > 0.001$ (must be positive) |
| Upper limit of spreading function | $\sigma_1, \sigma_2, \sigma_3 < 0.2$ (User adjustable) |
| Normalized fractions | $w_1 + w_2 + w_3 = 1.0$ |

Additional constraints that are to be understood include the limitation that only $\mu_j>0$ are allowed, although if solver is properly initialized, this constraint need not be entered, as the solver routine will not move any of the $\mu_j$ to values less than about 0.005. Also, the $w_j$ are all understood to be positive. This constraint can be handled outside of solver. If the $w_j$ are understood to arise from the selection of two points along the interval $0.0<P_1<P_2<1.0$; whereby $w_1=P_1$, $w_2=P_2-P_1$ and $w_3=1.0-P_2$; then constraining P1and P2are equivalent to the constraints required above for the $w_j$.

Table III is a summary of the Solver settings under the Options tab.

TABLE III

Solver settings

| Label | Value or selection |
|---|---|
| Max Time (seconds) | 1000 |
| Iterations | 100 |
| Precision | 0.000001 |
| Tolerance (%) | 5 |
| Convergence | 0.001 |
| Estimates | Tangent |
| Derivatives | Forward |
| Search | Newton |
| ALL OTHER SELECTIONS | Not selected |

A first guess for the values of $\mu_1$, $\mu_2$, $w_1$, and $w_2$ can be obtained by assuming two ideal Flory components that give the observed weight average, number average, and z-average molecular weights for the observed GPC distribution.

$$M_{n,GPC} = \left[w_1 \cdot \frac{1}{10^{\mu_1}} + w_2 \cdot \frac{1}{10^{\mu_2}}\right]^{-1}$$

$$M_{w,GPC} = \frac{[w_1 \cdot 2 \cdot 10^{\mu_1} + w_2 \cdot 2 \cdot 10^{\mu_2}]}{M_{n,GPC}}$$

$$M_{z,GPC} = \frac{[w_1 \cdot 6 \cdot 10^{\mu_1} + w_2 \cdot 6 \cdot 10^{\mu_2}]}{M_{w,GPC}}$$

$$w_1 + w_2 = 1$$

The values of $\mu_1$, $\mu_2$, $w_1$, and $w_2$ are then calculated. These should be adjusted carefully to allow for a small error term, $w_3$, and to meet the constraints in Table II before entering into Solver for the minimization step. Starting values for $\sigma_j$ are all set to 0.05.

Preparative GPC for collecting selected fractions of polymers was performed on a Waters 150C/ALC equipped with preparative pump heads and modified with a 3000 microliter injection loop and 14 milliliter sample vials. The column and carousel compartments were operated at 140° C. The preparative GPC column used was 1 Jordi Associaties 5 micron divinylbenzene (DVB) column catalog number 15105. The column dimensions were 500 mm in length and 22 mm inner diameter. 1,2,4 trichlorobenzene was used for both sample preparation and as the chromatographic mobile phase. The samples were prepared at a concentration of 0.1 grams of polymer in 50 milliliters of solvent. The solvent used to prepare the samples contained 200 ppm of butylated hydroxytoluene (BHT). Samples were prepared by agitating lightly for 2 hours at 160° C. The injection volume used was 2,500 microliters and the flow rate was 5.0 milliliters/minute.

Approximately 200-300 injections were made to collect appropriate sample amounts for off-line analysis. 16 fractions were collected spanning the full column elution range, with 8-12 fractions typically spanning the sample elution range. Elution range was verified by refractive index analysis during start-up. The collected solvent fractions were evaporated to approximately 50-60 milliliter volumes with a Buchi Rotovapor R-205 unit equipped with a vacuum controller module V-805 and a heating bath module B-409. The fractions were then allowed to cool to room temperature and the polyethylene material was precipitated by adding approximately 200 milliliters of methanol. Verification of molecular weight fractionation was done via high temperature GPC analysis with refractive index detection. Typical polydispersities of the fractions as measured by GPC analysis were approximately 1.1 to 1.4.

The weight average branching index for selected fractions was obtained from direct determination of intrinsic viscosity and molecular weight at each chromatographic data slice. The chromatographic system consisted of either a Polymer Laboratories Model PL-210 or a Polymer Laboratories Model PL-220 equipped with a Viscotek differential viscometer Model 210R, and a Precision Detectors 2-angle laser light scattering detector Model 2040. The 15-degree angle of the light scattering detector was used for the calculation of molecular weights.

The column and carousel compartments were operated at 140° C. The columns used were 3 Polymer Laboratories 10-micron Mixed-B columns. The solvent used was 1,2,4 trichlorobenzene. The samples were prepared at a concentration of 0.1 grams of polymer in 50 milliliters of solvent. The solvent used to prepare the samples contained 200 ppm of butylated hydroxytoluene (BHT). Samples were prepared by agitating lightly for 2 hours at 160° C. The injection volume used was 100 microliters and the flow rate was 1.0 milliliters/minute.

Calibration of the GPC column set was performed with narrow molecular weight distribution polystyrene standards purchased from Polymer Laboratories. The calibration of the detectors was performed in a manner traceable to NBS 1475 using a linear polyethylene homopolymer. $^{13}C$ NMR was used to verify the linearity and composition of the homopolymer standard. The refractometer was calibrated for mass verification purposes based on the known concentration and injection volume. The viscometer was calibrated with NBS 1475 using a value of 1.01 deciliters/gram and the light scattering detector was calibrated using NBS 1475 using a molecular weight of 52,000 Daltons.

The Systematic Approach for the determination of multidetector offsets was done in a manner consistent with that published by Mourey and Balke, Chromatography of Polymers: T. Provder, Ed.; ACS Symposium Series 521; American Chemical Society: Washington, D.C., (1993) pp 180-198 and Balke, et al., ; T. Provder, Ed.; ACS Symposium Series 521; American Chemical Society: Washington, D.C., (1993): pp 199-219., both of which are incorporated herein by reference in their entirety. The triple detector results were compared with polystyrene standard reference material NBS 706 (National Bureau of Standards), or DOW chemical polystyrene resin 1683 to the polystyrene column calibration results from the polystyrene narrow standards calibration curve.

Verification of detector alignment and calibration was made by analyzing a linear polyethylene homopolymer with a polydispersity of approximately 3 and a molecular weight of 115,000. The slope of the resultant Mark-Houwink plot of the linear homopolymer was verified to be within the range of 0.725 to 0.730 between 30,000 and 600,000 molecular weight. The verification procedure included analyzing a minimum of 3 injections to ensure reliability. The polystyrene standard peak molecular weights were converted to polyethylene molecular weights using the method of Williams and Ward described previously. The agreement for $M_w$ and $M_n$ between the polystyrene calibration method and the absolute triple detector method were verified to be within 5% for the polyethylene homopolymer.

The intrinsic viscosity data was obtained in a manner consistent with the Haney 4-capillary viscometer described in U.S. Pat. No. 4,463,598, incorporated herein by reference. The molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the intrinsic viscosity and molecular weight were obtained from the sample refractive index area and the refractive index detector calibration from the linear polyethylene homopolymer and all samples were found to be within experimental error of the nominal concentration. The chromatographic concentrations were assumed low enough to eliminate the need for a Huggin's constant (concentration effects on intrinsic viscosity) and second virial coefficient effects (concentration effects on molecular weight).

For samples that contain comonomer, the measured g' represents effects of both long chain branching as well as short chain branching due to comonomer. For samples that have copolymer component(s), the contribution from short chain branching structure should be removed as taught in Scholte et al., discussed above. If the comonomer is incorporated in such a manner that the short chain branching structure is proven both equivalent and constant across both the low and high molecular weight components, then the difference in long chain branching index between 100,000 and 500,000 may be directly calculated from the copolymer sample. For cases where the comonomer incorporation cannot be proven both equivalent and constant across both the high and low molecular weight components, then preparative GPC fractionation is required in order to isolate narrow molecular weight fractions with polydispersity lower than 1.4. $^{13}C$ NMR is used to determine the comonomer content of the preparative fractions.

Additionally, a calibration of g' against comonomer type for a series of linear copolymers of the same comonomer is established in order to correct for comonomer content, in cases where comonomer incorporation cannot be shown to be both equivalent and constant across both the high and low molecular weight components. The g' value is then analyzed for the isolated fraction corresponding to the desired molecular weight region of interest and corrected via the comonomer calibration function to remove comonomer effects from g'. Estimation of number of branches per molecule on the high molecular weight species.

The number of long chain branches per molecule was also determined by GPC methods. High temperature GPC results (HTGPC) were compared with high temperature GPC light scattering results (HTGPC-LS). Such measurements can be conveniently recorded on a calibrated GPC system containing both light scattering and concentrations detectors which allows the necessary data to be collected from a single chromatographic system and injection. These measurements assume that the separation mechanism by HTGPC is due to the longest contiguous backbone segment through a polymer molecule (i.e. the backbone). Therefore, it assumes that the molecular weight obtained by HTGPC produces the backbone molecular weight (linear equivalent molecular weight) of the polymer. The average sum of the molecular weight of long chain branches added to the backbone at any chromatographic data slice is obtained by subtracting the backbone molecular weight estimate from the absolute molecular weight obtained by HTGPC-LS. If there is a significant comonomer content differential between the high and low molecular weight species in the polymer, it is necessary to subtract the weight of the comonomer from the HTGPC-LS results using knowledge of the high molecular weight catalyst.

The average molecular weight of the long chain branches that are added to the high molecular weight polymer is assumed to be equivalent to the number-average molecular weight of the bulk polymer (considering both high and low molecular weight species). Alternatively, an estimate of the average molecular weight of a long chain branch can be obtained by dividing the weight-average molecular weight of the low molecular weight species (obtained through de-convolution techniques) by a polydispersity estimate of the low molecular weight species. If there is a significant comonomer content differential between the high and low molecular weight species in the polymer, it is necessary to add or subtract the differential total weight of comonomer from the number average molecular weight results first using knowledge of the comonomer incorporation for the low molecular weight catalyst.

The number of long chain branches at any chromatographic slice is estimated by dividing the sum of the molecular weight of the total long chain branches by the average molecular weight of the long chain branch. By averaging this number of long chain branches weighted by the deconvoluted high molecular weight peak, the average amount of long chain branching for the high molecular weight species is determined. Although assumptions are made in regard to GPC separation and the fact that the polymer backbone can be extended due to a long chain branch incorporating near to the chain ends of the backbone segment, we have found this measure of number of branches to be very useful in predicting resin performance.

Melt strength measurements were conducted on a Goettfert Rheotens 71.97 attached to an Model 3211 Instron capillary rheometer. A polymer melt was extruded through a capillary die (flat die, 180 degree angle) with a capillary diameter of 2.1 mm and an aspect ratio (capillary length/capillary radius) of 20 with an entrance angle of approximately 45 degrees at a constant plunger velocity. After equilibrating the samples at 190° C. for 10 minutes, the piston is run at a speed of 1 inch/minute (2.54 cm/min). The standard test temperature is 190° C. the sample is drawn uniaxially to a set of accelerating nips located 100 mm below the die with an acceleration of 2.4 mm/s$^2$. The tensile force is recorded as a function of the take-up speed of the nip rolls. Melt strength was reported as the plateau force (cN) before the strand broke. The following conditions were used in the melt strength measurements.

plunger speed=0.423 mm/s wheel acceleration=2.4 mm/s/s capillary diameter=2.1 mm capillary length=42 mm barrel diameter=9.52 mm Synthesis of (N-(1,1-dimethylethyl)-1,1-di-(4-n-butyl-phenyl)-1-((1,2,3,3a,7a-η)-3-(1,3-dihydro-2H-isoindol-2-yl)-1H-inden-1-yl)silanaminato-(2-)-N—) dimethyltitanium (Catalyst A)

(1) Preparation of dichloro(N-(1,1-dimethylethyl)-1,1-di(4-butyl-phenyl)-1-((1,2,3,3a,7a-η)-3-(1,3-dihydro-2H-isoindol-2-yl)-1H-inden-1-yl)silanaminato-(2-)-N—)-titanium

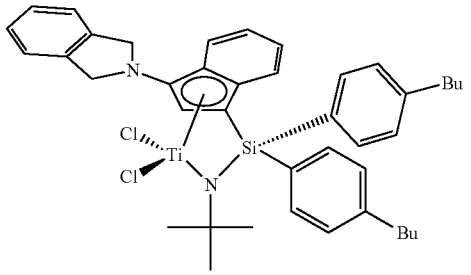

[A] Synthesis of dichloro(N-1,1-dimethylethyl)-1,1-(4-butyl-phenyl)-1-((1,2,3,3a,7a-n)-3-(1,3-dihydro-2H-isoindol-2-yl)-1H-inden-1-yl)silanaminato-(2-)-N—)titanium

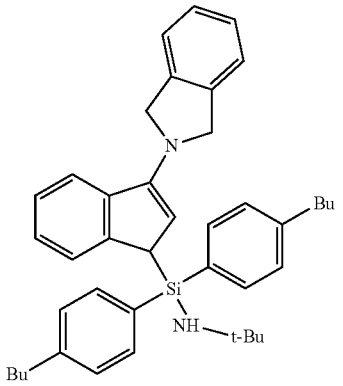

(i) Preparation of (p-Bu—Ph)$_2$SiCl$_2$

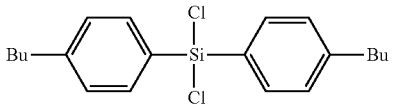

To a three-necked 250 mL round-bottom flask under a nitrogen atmosphere equipped with a reflux condenser and a 250 mL dropping funnel 4.87 g of Mg turnings (0.200 moles) were introduced. 1-bromo-4-butyl benzene (42.62 g, 0.200 moles) and 80 mL of THF were then added to the dropping funnel. At this time 10 mL of the bromobenzene/THF solution was added to the Mg turnings with a small amount of ethyl bromide. The solution was then stirred until initiation occurred. The rest of the bromo benzene/THF solution was then added dropwise to allow refluxing to occur. After addition of the bromo benzene/THF solution, the mixture was heated at reflux until the magnesium was consumed.

The resulting Grignard solution was then transferred to a 250 mL dropping funnel which was attached to a three-necked 250 mL round-bottom flask under a nitrogen atmosphere equipped with a reflux condenser. To the round bottomed flask 100 mL of heptane was introduced followed by $SiCl_4$ (15.29 g, 0.090 moles). To this solution, the Grignard solution was added dropwise. After addition was complete the resulting mixture was refluxed for 2 h and then allowed to cool to room temperature. Under an inert atmosphere the solution was filtered. The remaining salts were further washed with heptane (3×40 mL), the washings were combined with the original heptane solution.

The heptane was then removed via distillation at atmospheric pressure. The resulting viscous oil was then vacuumed distilled with collection of the product at 1 mm at 210° C. giving 19.3 g (58%). $^1H(C_6D_6)\delta$: 0.80 (t, 6H), 1.19 (m, 4 H), 1.39 (m, 4 H), 2.35 (t, 4 H), 7.0 (d, 4H), 7.7 (d, 4H).

(ii) Preparation of (p-Bu—Ph)$_2$Si(Cl)(NH—t-Bu)

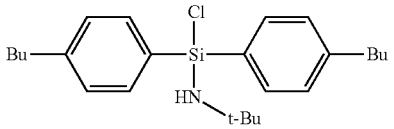

Dichloro-di(p-butylphenyl)silane (4.572 g, 12.51 mmol) was dissolved in 45 mL of methylene chloride. To this solution was added 1.83 g, 25.03 mmol of t-BuNH$_2$. After stirring overnight Solvent was removed under reduced pressure. The residue was extracted with 45 mL of hexane and filtered. Solvent was removed under reduced pressure leaving 4.852 g of product as an off-white oil. $^1H(C_6D_6)$ δ: 0.75 (t, 6 H), 1.15 (s, 9 H), 1.2 (m, 4 H), 1.4 (m, 4 H), 1.51 (s, 1 H), 2.4 (t, 4 H), 7.05 (d, 4 H), 7.8 (d, 4 H).

(iii) Preparation of (p-Bu—Ph)$_2$Si(3-isoindolino-indenyl)(NH—t-Bu)

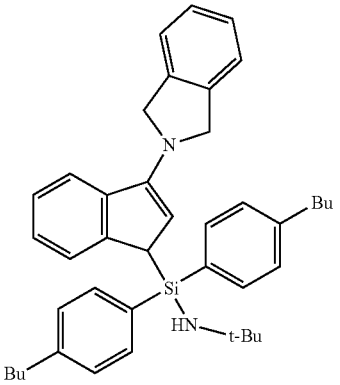

To a 4.612 g (11.47 mmol) of (p-Bu-Ph)$_2$Si(Cl)(NH-t-Bu) dissolved in 20 mL of THF was added 2.744 g (8.37 mmol) of lithium 1-isoindolino-indenide dissolved in 30 mL of THF. After the reaction mixture was stirred overnight, solvent was removed under reduced pressure. The residue was extracted with 50 mL of hexane and filtered. Solvent removal gave 6.870 g of product as very viscous red-brown oil. Yield 91.0% $^1H$ ($C_6D_6$) δ: 0.75 (m, 6 H), 1.15 (s, 9 H), 1.25 (m, 4 H), 2.4 (m, 4H), 4.2 (s, 1H), 4.5 (dd, 4 H), 5.6 (s, 1H) 6.9-7.7 (m, 16 H).

[B] Preparation of dilithium salt of (p-Bu-Ph)$_2$Si(3-isoindolino-indenyl)(NH-t-Bu). To a 50 mL of hexane solution containing 6.186 g (10.33 mmol) of (p-Bu-Ph)$_2$Si(3-isoindolino-indenyl)(NH-t-Bu) was added 13.5 mL of 1.6 M n-BuLi solution. A few minutes after n-BuLi addition a yellow precipitate appeared. After stirring overnight the yellow precipitate was collected on the frit, washed with 4×20 mL of hexane and dried under reduced pressure to give 4.4181 g of product as yellow powder. Yield 70.0%.

[C] Preparation of dichloro(N-1,1-dimethylethyl)-1,1-(4-butyl-phenyl)-1-((1,2,3,3a,7a-n)-3-(1,3-dihydro-2H-isoindol-2-yl)-1H-inden-1-yl)silanaminato-(2-)-N—)titanium

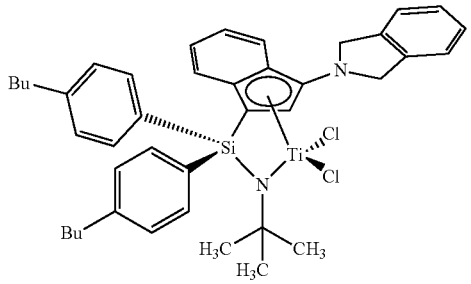

In the drybox 2.620 g (7.1 mmol) of $TiCl_3(THF)_3$ was suspended in 40 mL of THF. To this solution 4.319 g (7.07 mmol) of dilithium salt of (p-Bu-Ph)$_2$Si(3-isoindolino-indenyl)(NH-t-Bu) dissolved in 60 mL of THF was added within 2 min The solution was then stirred for 60 min. After this time 1.278 g of $PbCl_2$ (4.60 mmol) was added and the solution was stirred for 60 min. The THF was then removed under reduced pressure. The residue was extracted with 50 mL of toluene and filtered. Solvent was removed under reduced pressure leaving black crystalline solid. Hexane was added (35 mL) and the black suspension was stirred for 0.5 hr. Solid was collected on the frit, washed with 2×30 mL of hexane and dried under reduced pressure to give 4.6754 g of product as black-blue crystalline solid. Yield 92.4%. $^1H$ (toluene-$d_6$) δ: 0.75 (m, 6 H), 1.25 (m, 4 H), 1.5 (m, 4 H), 1.65 (s, 9 H), 2.5 (t, 4 H), 4.5 (d, 2 H), 5.0 (d, 2 H), 6.0 (s, 1 H), 6.8-8.2 (m, 16 H).

(2) Preparation of (N-1,1-dimethylethyl)-1,1-(4-butyl-phenyl)-1-((1,2,3,3a,7a-n)-3-(1,3-dihydro-2H-isoindol-2-yl)-1H-inden-1-yl)silanaminato-(2-)-N—)-dimethyltitanium

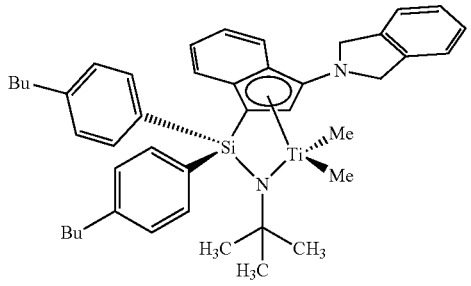

The dichloro(N-1,1-dimethylethyl)-1,1-(4-butyl-phenyl)-1-((1,2,3,3a,7a-n)-3-(1,3-dihydro-2H-isoindol-2-yl)-1H-inden-1-yl)silanaminato-(2-)-N—)titanium (1.608 g, 2.25 mmol) was suspended in 35 mL of toluene. To this solution was added 3 mL (4.75 mmol) of 1.6 M MeLi ether solution. Reaction color changed at once from dark green-black to dark red. After stirring for 1 hr solvent was removed under reduced pressure. The residue was extracted with 55 mL of hexane and filtered. Solvent was removed leaving 1.456 g of red solid. Yield 96%. $^1$H (toluene-$d_8$) δ: 0.3 (s, 3 H), 0.8 (m, 6 H), 1.05 (s, 3 H), 1.25 (m, 4 H), 1.5 (m, 4 H), 1.75 (s, 9 H), 2.5 (m, 4 H), 4.5 (d, 2 H), 4.8 (d, 2 H), 5.7 (s, 1 H), 6.7-8.3 (m, 16 H).

Synthesis of rac-[1,2-ethanediylbis(1-indenyl)]zirconium (1,4-diphenyl-1,3-butadiene) (Catalyst B)

Catalyst B can be synthesized according to Example 11 of U.S. Pat. No. 5,616,664, the entire disclosure of which patent is incorporated herein by reference.

Synthesis of ($C_5Me_4SiMe_2N^tBu$)Ti($\eta^4$-1,3-pentadiene) (Catalyst C)

Catalyst C can be synthesized according to Example 17 of U.S. Pat. No. 5,556,928, the entire disclosure of which patent is incorporated herein by reference.

Synthesis of dimethylsilyl(2-methyl-s-indacenyl)(t-butylamido)titanium 1,3-pentadiene (Catalyst D)

Catalyst D can be synthesized according to Example 23 of U.S. Pat. No. 5,965,756, the entire disclosure of which patent is incorporated herein by reference.

Synthesis of [(3-Phenylindenyl)$SiMe_2N^tBut$]$TiMe_2$ (Catalyst E)

Catalyst F can be synthesized according to Example 2 of U.S. Pat. No. 5,866,704, the entire disclosure of which patent is incorporated herein by reference.

Synthesis of dimethylamidoborane-bis-$\eta^5$-(2-methyl-4-naphthylinden-1-yl)zirconium $\eta^4$-1,4-diphenyl-1,3-butadiene (Catalyst F)

Catalyst G can be synthesized according to Example 12 of WO 0020426, the entire disclosure of which patent is incorporated herein by reference.

Synthesis of (N-(1,1-dimethylethyl)-1,1-dimethyl-1-((1,2,3,3a,9a,-h)-5,6,7,8-tetrahydro-3-phenyl-5,5,8,8-tetramethyl-1H-benz(f)inden-1-yl)silanaminato(2-)N)dimethyltitanium (Catalyst G)

Catalyst H can be synthesized according to Example 13 of WO 9827103, the entire disclosure of which patent is incorporated herein by reference.

Synthesis of bis(n-butylcyclopentadienyl)zirconium dimethyl (Catalyst H)

Bis(n-butylcyclopentadienylzirconium dichloride can be purchased from Boulder Scientific. In a drybox, 12.00 g of bis(n-butylcyclopentadienylzirconium dichloride was dissolved in 100 mL of diethyl ether in an 8 oz jar. 20.765 mL of 3.0 M methyl magnesium chloride in THF (available from Aldrich Chemical Company) was added dropwise via syringe with stirring. After stirring for 30 minutes, the volatiles were removed under vacuum. The residue was extracted with hexane, and filtered through Celite. The hexane was stripped under vacuum to afford a brown liquid, which was identified by $^1$H and $^{13}$C NMR spectroscopy. The yield was 7.6 g.

Synthesis of meso-[dimethylsilylbis(1-indenyl)]hafnium dimethyl (Catalyst I)

The meso dimethyl hafnium compound can be obtained from the racemic hafnium dichloride according to the following procedure. Rac-dimethylsilylbis(indenyl)hafnium dichloride was purchased from Boulder Scientific Co. In an inert atmosphere drybox, 1.002 g of rac-dimethylsilylbis(indenyl)hafnium dichloride was dissolved in approximately 30 mL of dry THF. To this solution was added with stirring 1.3 mL of $CH_3MgCl$ (3.0 M in THF, Aldrich) via syringe. The solution turned slightly darker and was allowed to stir at room temperature for 45 minutes. The THF was subsequently removed under vacuum. The residue was dissolved in hot methylcyclohexane, filtered through Celite, and cooled. Small crystals immediately formed upon cooling. The solution was re-warmed, and allowed to cool slowly. The crystalline product was collected by filtration and characterized by $^1$H and $^{13}$C NMR spectroscopy, as well as single-crystal X-ray diffraction.

Synthesis of Armeenium Borate [methylbis(hydrogenatedtallowalkyl)ammonium tetrakis (pentafluoro phenyl)borate]

Armeenium borate can be prepared from ARMEEN® M2HT (available from Akzo-Nobel), HCl, and Li [$B(C_6F_5)_4$] according to Example 2 of U.S. Pat. No. 5,919,983, the entire disclosure of which is herein incorporated by reference.

Preparation of Antioxidant/Stabilizer Additive solution: The additive solution was prepared by dissolving 6.66 g of Irgaphos 168 and 3.33 g of Irganox 1010 in 500 mL of toluene. The concentration of this solution is therefore 20 mg of total additive per 1 mL of solution.

General Procedure for Determining $R_v$ and Comonomer Incorporation

Solution semi-batch reactor copolymerizations of ethylene and octene are carried out in a 1 gallon metal autoclave reactor equipped with a mechanical stirrer, a jacket with circulating heat transfer fluid, which can be heated or cooled in order to control the internal reactor temperature, an internal thermocouple, pressure transducer, with a control computer and several inlet and output valves. Pressure and temperature are continuously monitored during the polymerization reaction. Measured amounts of 1-octene are added to the reactor containing about 1442 g Isopar E as solvent. The reactor is heated up to the reaction temperature with stirring (typically about 1,000 rpm or higher) and then pressurized with ethylene at the desired pressure until the solvent is saturated. The active catalyst is prepared in a drybox by syringing together solutions of the appropriate catalyst, cocatalyst, and any scavenger (if desired) components with additional solvent to give a total volume which can be conveniently added to the reactor (typically 10-20 mL total). If desired, a portion of the scavenger (typically an aluminum alkyl, alumoxane, or other alkyl-aluminum compound) may be added to the reactor separately prior to the addition on the active catalyst solution. The active catalyst solution is then transferred by syringe to a catalyst addition loop and injected into the reactor over approximately 4 minutes using a flow of high pressure solvent. The polymerization is allowed to proceed for the desired length of time while feeding ethylene on demand to maintain a constant pressure. The amount of ethylene consumed during the reaction is monitored using a mass flowmeter. Immediately following the desired polymerization time, the polymer solution is then dumped from the reactor using a bottom-valve through a heated transfer line into a nitrogen-purged glass kettle containing 10-20 mL of isopropanol, which acts as a catalyst kill. An aliquot of the additive solution described above is added to this kettle and the solution stirred thoroughly (the amount of additive used is chosen based on the total ethylene consumed during the polymerization, and is typically targeted at a level of about 1000-2000 ppm). The polymer solution is dumped into a tray, air dried overnight, then thoroughly dried in a vacuum oven for two days. The weights of the polymers are recorded and the efficiency calculated as grams of polymer per gram of transition metal. Because the polymerization of ethylene and alpha olefins is quite exothermic, there is usually an increase in the temperature (an exotherm) of the reaction solution which is observed after the active catalyst is added. The process control computer can be used to keep the reaction temperature relatively constant during the polymerization reaction by cooling the jacket of the reactor, but some deviation from the set point is usually observed, especially for catalysts having a relatively fast initial rate of polymerization. If too much active catalyst is added to the semi-batch reactor, the exotherm can be quite large, and the monomer concentrations, especially the ethylene concentration, can deviate significantly from the equilibrium concentration. Because the polymer molecular weight and the comonomer incorporation depend significantly on the ethylene concentration, it is important to control the exotherm. For the semi-batch reactor polymerizations reported herein, the exotherm was generally kept below 5° C. or less. Various catalysts differ significantly in their rates of polymerization and thus, the amount of exotherm. The exotherm can be controlled by adjusting the amount or rate of addition of the catalyst.

Using the general solution semi-batch reactor polymerization procedure described above, 17 g of 1-octene was added along with 1455 g of ISOPAR-E. This was heated to 160° C., and saturated with ethylene at about 166 psi total reactor pressure. A catalyst solution was prepared by combining solutions of selected Catalyst precursor, Armeenium borate, and MMAO-3A to give 5 μmoles of metal, 6.5 μmoles of Armeenium borate, and 25 μmoles of Al. The catalyst solution was added to the reactor as described in the general procedure. After 10 minutes reaction time, the bottom valve was opened and the reactor contents transferred to the glass kettle containing isopropanol. The additive solution was added and the polymer solution was stirred to mix well. The contents were poured into a glass pan, cooled and allowed to stand in a hood overnight, and dried in a vacuum oven for 2 days.

One method to quantify and identify unsaturation in ethylene-octene Copolymers is $^{1}H$ NMR. The sensitivity of $^{1}H$ NMR spectroscopy is enhanced by utilizing the technique of peak suppression to eliminate large proton signals from the polyethylene back bone. This allows for a detection limit in the parts per million range in approximately one hour data acquisition time. This is in part achieved by a 100,000-fold reduction of the signal from the —$CH_2$— protons which in turn allows for the data to be collected using a higher signal gain value. As a result, the unsaturated end groups can be rapidly and accurately quantified for high molecular weight polymers.

The samples were prepared by adding approximately 0.100 g of polymer in 2.5 ml of solvent in a 10 mm NMR tube. The solvent is a 50/50 mixture of 1,1,2,2-tetrachloroethane-d2 and perchloroethylene. The samples were dissolved and homogenized by heating and vortexing the tube and its contents at 130° C. The data was collected using a Varian Unity Plus 400 MHz NMR spectrometer. The acquisition parameters used for the Presat experiment include a pulse width of 30 us, 200 transients per data file, a 1.6 sec acquisition time, a spectral width of 10000 Hz, a file size of 32K data points, temperature setpoint 110° C., D1 delay time 4.40 sec, Satdly 4.0 sec, and a Satpwr of 16.

Comonomer content was measured by $^{13}C$ NMR Analysis. The samples were prepared by adding approximately 3 g of a 50/50 mixture of tetrachloroethane-d2/orthodichlorobenzene to 0.4 g sample in a 10 mm NMR tube. The samples were dissolved and homogenized by heating the tube and its contents to 150° C. The data was collected using a JEOL Eclipse 400 MHz NMR or Varian Unity Plus 400 MHz spectrometer, corresponding to a $^{13}C$ resonance frequency of 100.4 MHz. The data was acquired using NOE, 1000 transients per data file, a 2 sec pulse repetition delay, spectral width of 24,200 Hz and a file size of 32K data points, with the probe head heated to 130° C.

The various amounts of unsaturations and comonomer incorporation by different catalysts prepared by the above-described semi-batch procedure were calculated. Values for the $R_v$, and the 1-octene incorporation of exemplary catalysts obtained by these methods are recorded in Table IV.

TABLE IV

Catalyst Properties

| | Catalyst | $R_v$ | Mole % 1-octene | $M_w$ |
|---|---|---|---|---|
| A | (N-(1,1-dimethylethyl)-1,1-di-(4-nbutylphenyl)-1-((1,2,3,3a,7a-η)-3-(1,3-dihydro-2H-isoindol-2-yl)-1H-inden-1-yl)-silanaminato-(2-)-N-)dimethyltitanium | 0.20 | 2.62 | 196,000 |
| B | rac-[1,2-ethanediylbis(1-indenyl)]zirconium (1,4-diphenyl-1,3-butadiene) | 0.44 | 0.64 | 19,200 |
| C | $(C_5Me_4SiMe_2N^tBu)Ti(\eta^4\text{-}1,3\text{-pentadiene})$ | 0.17 | 2.01 | 82,000 |
| D | dimethylsilyl(2-methyl-s-indacenyl)(t-butylamido) titanium 1,3-pentadiene | 0.23 | 2.28 | 119,400 |
| E | [(3-Phenylindenyl)SiMe2NtBut]TiMe2 | 0.39 | 2.01 | 85,700 |
| F | dimethylamidoborane-bis-$\eta^5$-(2-methyl-4-naphthylinden-1-yl)zirconium $\eta^4$-1,4-diphenyl-1,3-butadiene | 0.34 | 3.33 | 44,000 |
| G | (N-(1,1-dimethylethyl)-1,1-dimethyl-1-((1,2,3,3a,9a,-h)-5,6,7,8-tetrahydro-3-phenyl-5,5,8,8-tetramethy1-1H-benz-(f)inden-1-yl)silanaminato(2-)N)-dimethyltitanium | 0.44 | 2.97 | 105,000 |
| H | bis(n-butylcyclopentadienyl)zirconium dimethyl | 0.16 | 0.3 | 10,000 |
| I | meso-dimethylsilylbis(1-indenyl)]hafnium dimethyl | 0.07 | 1.11 | 21,600 |

General 1 Gallon Continuous Solution Ethylene Polymerization Procedure

Purified ISOPAR-E solvent, ethylene, and hydrogen are supplied to a 1 Liter reactor equipped with a jacket for temperature control and an internal thermocouple. The solvent feed to the reactor is measured by a mass-flow controller. A variable speed diaphragm pump controls the solvent flow rate and increases the solvent pressure to the reactor. The catalyst feeds are mixed with the solvent stream at the suction of the solvent pump and are pumped to the reactor with the solvent. The cocatalyst feed is added to the monomer stream and continuously fed to the reactor separate from the catalyst stream. The ethylene stream is measured with a mass flow meter and controlled with a Research Control valve. A mass flow controller is used to deliver hydrogen into the ethylene stream at the outlet of the ethylene control valve. The temperature of the solvent/monomer is controlled by use of a heat exchanger before entering the reactor. This stream enters the bottom of the reactor. The catalyst component solutions are metered using pumps and mass flow meters, and are combined with the catalyst flush solvent. This stream enters the bottom of the reactor, but in a different port than the monomer stream. The reactor is run liquid-full at 450 psig with vigorous stirring. The process flow is in from the bottom and out of the top. All exit lines from the reactor are steam traced and insulated. Polymerization is stopped with the addition of a small amount of water, and other additives and stabilizers can be added at this point. The stream flows through a static mixer and a heat exchanger in order to heat the solvent/polymer mixture. The solvent and unreacted monomer are removed at reduced pressure, and the product is recovered by extrusion using a devolatilizing extruder. The extruded strand is cooled under water and chopped into pellets. The operation of the reactor is controlled with a process control computer.

Example 1

Ethylene Polymerization with Catalysts A and B

Using the general continuous solution polymerization procedure described above, ethylene and ISOPAR-E solvent were fed into the reactor at rates of about 4.50 lbs/hour and 26.50 lbs/hour, respectively. The temperature was maintained at about 140° C., and saturated. The polymer of Example 1 was prepared by feeding Catalyst A and Catalyst B, Armeenium borate, and MMAO-3A to the reactor to produce a catalyst concentration of 1.2 ppm, a ratio of catalyst A to catalyst B of 0.34, 22.8 ppm of Armeenium borate, and 4.3 ppm of Al according to the general procedure. The polymer of Example 2 was prepared by feeding Catalyst A and Catalyst B, Armeenium borate, and MMAO-3A to the reactor to produce a catalyst concentration of 0.60 ppm, a ratio of catalyst A to catalyst B of 0.33, 7.6 ppm of Armeenium borate, and 4.3 ppm of Al according to the general procedure. Other process parameters are recorded in Table I.

Examples 2-11

Ethylene Polymerization with Catalysts A and B

The general procedure for continuous solution polymerization described above was repeated for Examples 2-9. Various parameters of the reaction are recorded in Table I.

Examples 11-13

Ethylene/1-Octene Interpolymers Using Catalysts A and B

Ethylene/1-Octene interpolymers were prepared using the general continuous solution procedure described above. Ethylene, 1-octene, and ISOPAR-E solvent were fed into the reactor at rates of about 4.50 lbs/hour, 0.70 lbs/hour, and 30.20 lbs/hour, respectively. The temperature was maintained at about 140° C., and saturated. Examples 3 and 4 were prepared by feeding Catalyst A and Catalyst B, Armeenium borate, and MMAO-3A to the reactor to produce a catalyst concentration of 2.36 ppm, a ratio of catalyst A to catalyst B of 0.44, 53.2 ppm of Armeenium borate, and 8.6 ppm of Al according to the general procedure. Other process parameters are also recorded in Table V.

TABLE V

Polymerization conditions and properties of resulting polymer

| Example | temperature, C. | ethylene flow, lb./hr | solvent. flow, lb/hr | octene flow, lb/hr | $H_2$ flow, sccm | ethylene conversion, % |
|---|---|---|---|---|---|---|
| 1 | 140.3 | 4.50 | 22.6 | 0.00 | 50.0 | 90.23 |
| 2 | 139.0 | 4.50 | 26.5 | 0.00 | 5.0 | 90.08 |
| 3 | 140.2 | 4.50 | 29.2 | 0.00 | 0.0 | 90.20 |
| 4 | 138.5 | 4.50 | 31.0 | 0.00 | 4.1 | 94.88 |
| 5 | 140.2 | 4.50 | 31.0 | 0.00 | 4.7 | 94.88 |
| 6 | 139.8 | 4.50 | 31.0 | 0.00 | 6.9 | 95.15 |
| 7 | 140.9 | 4.50 | 31.0 | 0.00 | 99.9 | 97.67 |
| 8 | 140.7 | 4.50 | 31.0 | 0.00 | 75.0 | 98.57 |
| 9 | 140.8 | 4.50 | 31.0 | 0.00 | 64.9 | 98.53 |
| 10 | 141.0 | 4.50 | 26.50 | 0.00 | 0.00 | 90.23 |
| 11 | 140.7 | 4.50 | 26.50 | 0.00 | 0.00 | 90.19 |
| 12 | 130.3 | 4.50 | 30.20 | 0.70 | 0.00 | 89.97 |
| 13 | 130.9 | 4.50 | 30.20 | 0.70 | 0.00 | 90.28 |

| Example | ppm metal Cat A/ Cat B | efficiency, g/g metal | production rate, lb/hr | polymer density, g/mL | $I_2$ | $I_{10}/I_2$ |
|---|---|---|---|---|---|---|
| 1 | 0.65/0.35 | 14,900,000 | 4 | 0.9638 | — | — |
| 2 | 0.65/0.35 | 20,300,000 | 4 | 0.9609 | — | — |
| 3 | 0.65/0.35 | 20,500,000 | 4 | 0.9616 | — | — |
| 4 | 0.65/0.35 | 9,500,000 | 4 | 0.9561 | — | — |
| 5 | 0.65/0.35 | 9,500,000 | 4 | 0.9594 | — | — |
| 6 | 0.65/0.35 | 9,500,000 | 4 | 0.9582 | — | — |
| 7 | 13.52/2.48 | 500,000 | 4 | 0.9579 | — | — |
| 8 | 13.52/2.48 | 600,000 | 4 | 0.9539 | — | — |
| 9 | 13.52/2.48 | 600,000 | 4 | 0.9537 | — | — |
| 10 | 0.31/0.90 | 30,900,000 | 4 | 0.9643 | 9.17 | 8.66 |
| 11 | 0.15/0.45 | 34,000,000 | 4 | 0.9643 | 10.86 | 8.43 |
| 12 | 0.72/1.64 | 4,500,000 | 4 | 0.9432 | 1.31 | 16.34 |
| 13 | 0.72/1.64 | 4,500,000 | 4 | 0.9431 | 0.97 | 16.24 |

| Example | Wt % ethylene | Wt % polymer | ppm $H_2$ of reactor feed | Mw | Mn | MWD |
|---|---|---|---|---|---|---|
| 1 | 100 | — | — | 94,500 | 12,200 | 7.75 |
| 2 | 100 | — | — | 170,400 | 24200 | 7.04 |
| 3 | 100 | — | — | 189,900 | 18,700 | 10.16 |
| 4 | 100 | — | — | 186,400 | 21,600 | 8.63 |
| 5 | 100 | — | — | 149,800 | 20,500 | 7.31 |
| 6 | 100 | — | — | 159,500 | 13,900 | 11.47 |
| 7 | 100 | — | — | 71,700 | 8750 | 8.19 |
| 8 | 100 | — | — | 87,000 | 15,400 | 5.65 |
| 9 | 100 | — | — | 99,600 | 16,000 | 6.23 |
| 10 | 100 | — | — | 56,700 | 18,900 | 3.00 |
| 11 | 100 | — | — | 54,300 | 36,100 | 2.89 |
| 12 | 97.4 | — | — | 112,200 | 35,100 | 5.61 |
| 13 | 97.2 | — | — | 115,100 | 35,600 | 5.40 |

Figure 2:
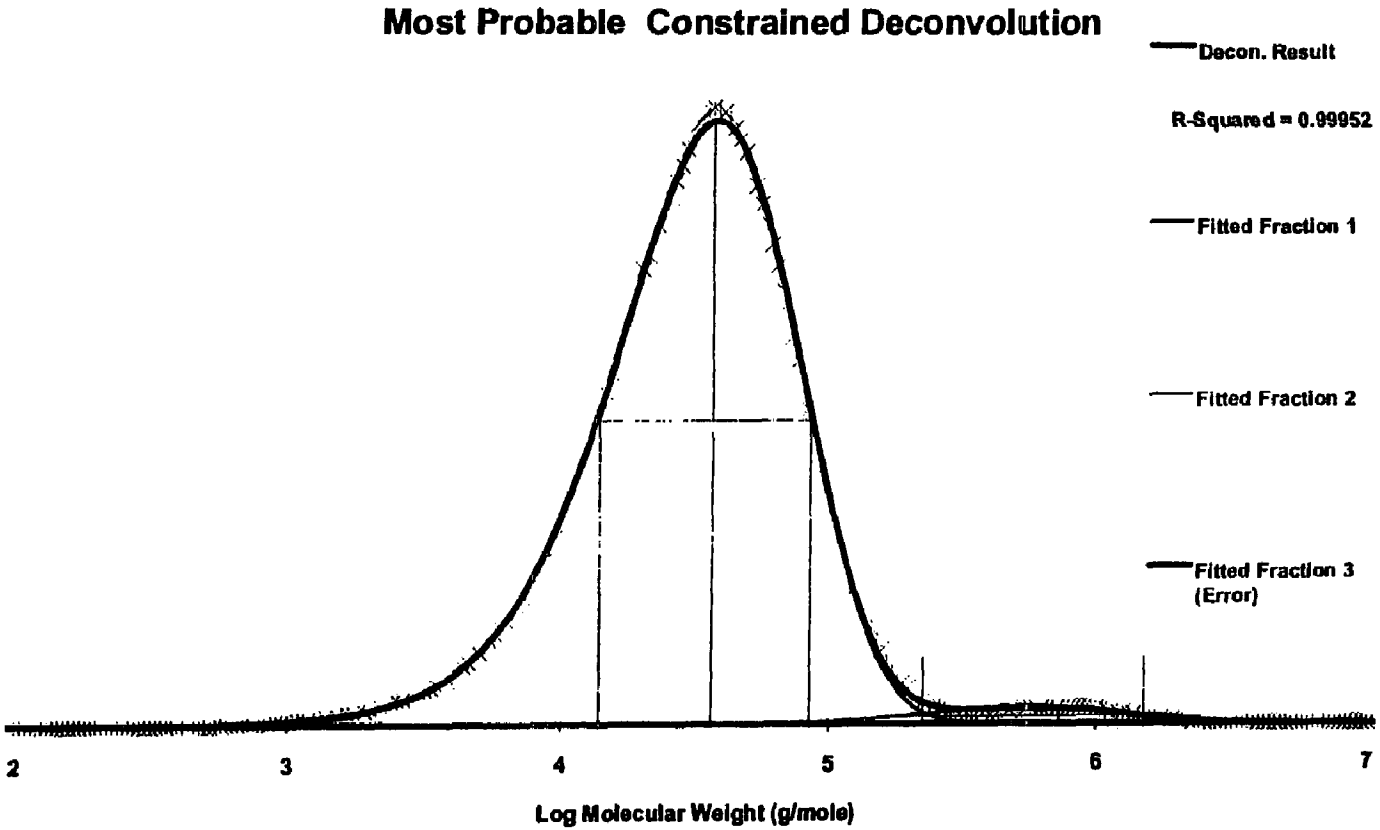
FIG. 2 shows a GPC spectrum and its deconvoluted peaks for a polymer made in accordance with one embodiment of the invention.

The GPC traces of the polymers of Examples 1-4 were deconvoluted to resolve ion of the high molecular weight component and the low molecular weight FIG. 2 shows the molecular weight distribution and the deconvoluted contributions from the high molecular weight component and the low molecular weight component for the polymer of Example 2. The results of the deconvolutions for Examples 1-13 are collected in Table VI.

TABLE VI

Deconvoluted Polymer Properties

| Example | Split | $M_w$ of High MW Fraction | $M_n$ of High MW Fraction | MWD of High MW Fraction | $M_w$ of Low MW Fraction | $M_n$ of Low MW Fraction | MWD of Low MW Fraction | $M_w^H/M_w^L$ |
|---|---|---|---|---|---|---|---|---|
| 1 | 0.28 | 291708 | 136383 | 2.14 | 32,517 | 13790 | 2.36 | 8.98 |
| 2 | 0.20 | 606850 | 297850 | 2.04 | 39,335 | 17816 | 2.21 | 15.43 |
| 3 | 0.24 | 743170 | 365057 | 2.04 | 38817 | 17897 | 2.17 | 19.15 |
| 4 | 0.30 | 578758 | 283139 | 2.04 | 39415 | 17713 | 2.23 | 14.68 |
| 5 | 0.23 | 575660 | 285589 | 2.02 | 40421 | 17785 | 2.27 | 14.24 |
| 6 | 0.28 | 540461 | 266306 | 2.03 | 39871 | 17603 | 2.27 | 13.56 |
| 7 | 0.72 | 110248 | 45076 | 2.45 | 15566 | 6301 | 2.47 | 7.08 |
| 8 | 0.86 | 99920 | 41537 | 2.41 | 11688 | 4734 | 2.47 | 8.55 |
| 9 | 0.74 | 137167 | 56167 | 2.44 | 17418 | 7049 | 2.47 | 7.88 |
| 10 | 0.03 | 663,868 | 268,196 | 2.48 | 40,908 | 18,409 | 2.22 | 16.22 |
| 11 | 0.03 | 555,572 | 273,900 | 2.03 | 40,669 | 18,298 | 2.22 | 13.66 |
| 12 | 0.12 | 691,422 | 345,719 | 2.00 | 38,821 | 18,292 | 2.12 | 17.81 |
| 13 | 0.13 | 659,512 | 327,888 | 2.01 | 38,981 | 18,279 | 2.13 | 16.91 |

The polymers from Examples 1-13 were characterized by numerous techniques. Table VII summarizes the physical properties of the polymers of Examples 10-13 obtained in this study. Also included in Table VII for comparison are data for LDPE 6821 and LDPE 170A, which are commercial free-radical LDPE resins available from The Dow Chemical Company.

TABLE VII

Polymer Characterization Data

| Resin | | Example 1 | Example 2 | Example 3 | Example 4 | LDPE 682I | LDPE 170A |
|---|---|---|---|---|---|---|---|
| Density | grams/cc | 0.9643 | 0.9643 | 0.9432 | 0.9431 | 0.9211 | 0.9225 |
| $I_5$ | | 27.99 | 29.60 | 5.74 | 4.27 | 2.38 | 2.96 |
| $I_{10}$ | g/10 min | 79.47 | 91.54 | 21.40 | 15.75 | 8.25 | 9.86 |
| $I_2$ | g/10 min | 9.17 | 10.86 | 1.31 | 0.97 | 0.6923 | 0.5643 |
| $I_{10}/I_2$ | — | 8.66 | 8.43 | 16.34 | 16.24 | 11.9 | 17.5 |
| GPC Data | | | | | | | |
| Mw | — | 56,700 | 54,300 | 112,200 | 115,100 | 84,000 | 91,700 |
| Mp | — | 35600 | 36100 | 35100 | 35600 | 61,300 | 56,500 |
| Mn | — | 18,900 | 36,100 | 35,100 | 35,600 | 25,300 | 17,000 |
| Mw/Mn | — | 3.00 | 2.89 | 5.61 | 5.40 | 3.32 | 5.39 |
| Melt Strength | cN | 7 | 7 | 33 | 36 | 18 | 16 |

Figure 3:
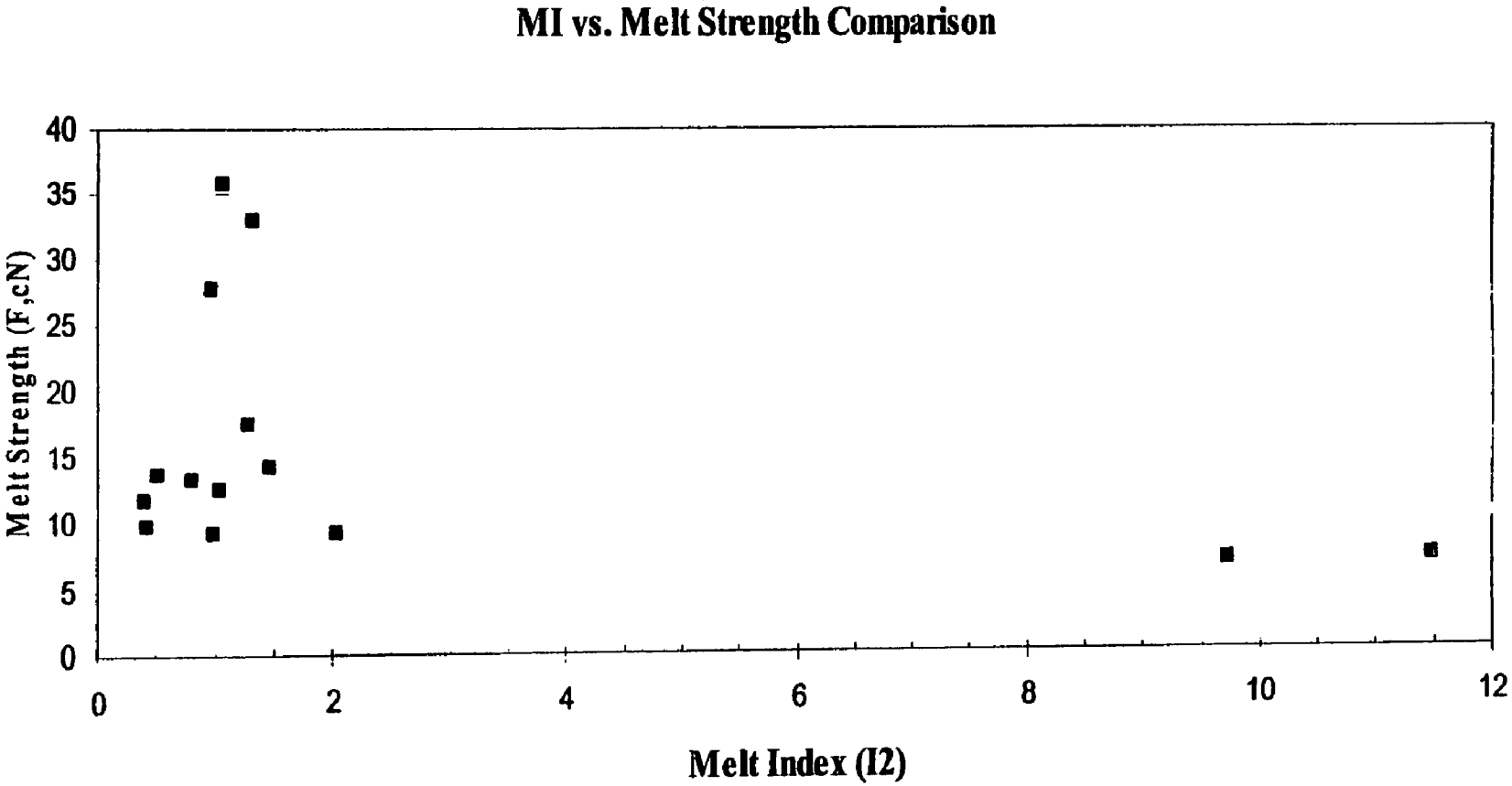
FIG. 3 is a plot of the melt strength as a function of melt index of polymers in accordance with some embodiments of the invention.

The melt strength as a function of the melt index is illustrated in FIG. 3. As FIG. 3 suggests some interpolymers have melt strengths that indicate a higher bubble stability for film fabrication and improved blow molding.

Examples 14-19

5 [Gallon] *Liter* Continuous Polymerization of Ethylene

The general procedure described above for the 1 Gallon continuous polymerization of ethylene was applied to a larger 5 [gallon] *liter* continuous polymerization reactor. Two catalyst solutions containing 5 ppm of Catalyst A and 10 ppm of catalyst B, respectively, were prepared and added to separate 4 L catalyst storage tanks. These two solutions were fed at a controlled rate and combined in a continuous stream with a continuous stream of ISOPAR-E solvent along with a continuous stream of MMAO-3A to give a molar ratio of catalyst metals:Al of 1:5. The catalyst solution was fed continuously into the reactor at a rate sufficient to maintain the reactor temperature at approximately 140° C. and an ethylene conversion of about 92%. The Armeenium borate cocatalyst solution was mixed with the monomer feed and added separately and continuously fed as an ISOPAR-E solution having a molar ratio of boron:metal of 1.1:1. The production rate for each example was approximately 3.8 Kr/Hour. For each example, the hydrogen feed and catalyst mixture were adjusted to produce an a product having a melt index ($I_2$) of approximately 1.0. Details for the reactor conditions are recorded in Table VIII.

The polymer solution was continuously removed from the reactor exit and was contacted with a solution containing 100 ppm of water for each part of the polymer solution, and polymer stabilizers. The resulting exit stream was mixed, heated in a heat exchanger, and the mixture was introduced into a separator where the molten polymer was separated from the solvent and unreacted monomers. The resulting molten polymer was extruded and chopped into pellets after being cooled in a water bath. Product samples were collected over 1 hour time periods, after which time the melt index and density was determined for each sample. The melt strength and melt index of the resulting polymers were measured and are also reported in Table VIII.

TABLE VIII

Process Conditions and Polymer Properties for Examples 14-19

| Example | Solv kg/lh | Ethyl kg/hr | $H_2$ sml/min | Temp ° C. | Catalyst B gr/hr | Catalyst A gr/hr | Conv % | $I_2$ | Melt Strength Force (cN) | Melt Strength Velocity mm/s |
|---|---|---|---|---|---|---|---|---|---|---|
| 14 | 32 | 4.34 | 0 | 143 | 27 | 135 | 91.5 | 0.97 | 28 | 41.6 |
| 15 | 32 | 3.8 | 19 | 140 | 50 | 45 | 90 | 1.27 | 19 | 60.8 |
| 16 | 34 | 3.8 | 38 | 140 | 50 | 50 | 92 | 1.05 | 13 | 89.4 |
| 17 | 34 | 3.8 | 38 | 140 | 50 | 50 | 92 | 0.80 | 13 | 77.4 |
| 18 | 34 | 3.8 | 54 | 141 | 55 | 67 | 91.5 | 0.99 | 9 | 134.3 |
| 19 | 34 | 3.8 | 54 | 141 | 55 | 69 | 92 | 0.82 | 9 | 73.2 |

FIG. 2 plots the melt strength data for ethylene interpolymers of Examples 1-4 and 14-19, as well as for LDPE 6821 as a function of the melt index ($I_2$).

As demonstrated above, embodiments of the invention provide a new process for making olefin polymers. The novel process may offer one or more of the following advantages. First, the costs associated with this process are similar to those for metallocene catalyzed processes. Good catalyst efficiency is obtained in such a process. The processability of the polymer produced by the process is often better than that of a metallocene catalyzed polymer produced with a single catalyst. Therefore, it is now possible to produce an interpolymer with better processability without sacrificing efficiency and thus incurring higher costs. Because at least two catalysts are used in the polymerization process, it is possible to adjust the density split and the polymer split by selecting the proper catalysts, if desired. By controlling the density split and/or the polymer split, one may design a series of polymers with desired characteristics and properties. With such a process, it is possible to adjust the density split and the polymer split from 0 to 100%. By proper selection of catalysts, it is also possible to increase the level of long chain branching substantially. Moreover, a comb-like long chain branching structure is obtained.

The polymers in accordance with embodiments of the invention may offer one or more of the following advantages. First, the processability and optical properties of certain of the interpolymers are similar to LDPE, while the mechanical properties of certain of the interpolymers are better than LDPE. Moreover, the improved processability is not obtained at the expense of excessive broadening of the molecular weight distribution. The interpolymers also retain many of the desired characteristics and properties of a metallocene catalyzed polymer. In essence, some polymers prepared in accordance with embodiments of the invention combine the desired attributes of LDPE and metallocene catalyzed polymers. Some polymers have higher melt strength than LDPEs at the same molecular weight. Additional advantages are apparent to those skilled in the art.

While the invention has been described with a limited number of embodiments, these specific embodiments are not intended to limit the scope of the invention as otherwise described and claimed herein. Modification and variations from the described embodiments exist. For example, while the high molecular weight catalysts and the low molecular weight catalysts are described with reference to a single site or metallocene catalyst, suitable catalysts are not so limited. It is possible to combine a Ziegler-Natta catalyst with a single site or metallocene catalyst, provided that the catalyst meet the selection criteria for producing a desired polymer. A person of ordinary skill in the art recognizes that catalyst activities may vary, depending on the temperature, pressure, monomer concentration, polymer concentration, hydrogen partial pressure and so on. It should also be recognized that co-catalysts may impact the catalyst's ability to produce interpolymers and the capability to incorporate comonomers. Therefore, one pair of catalysts which does not fulfill the selection criteria under one set of reaction conditions may nevertheless be used in embodiments of the invention under another set of reaction conditions. While all of the embodiments are described with reference to a pair of catalysts, it by no means precludes the use of three, four, five, or more catalysts simultaneously in a single reactor with similar or different capability for molecular weight and/or comonomer incorporation. Although the process is described with reference to the production of interpolymers, homopolymers, such as homopolyethylene, homopolypropylene, homopolybutylene, etc. may also be produced by the process described herein. These homopolymers are expected to have a high level of long chain branching and thus exhibit improved processability while maintaining the desired characteristics possessed by the homopolymers produced by one metallocene catalyst. It should be recognized that the process described herein may be used to make terpolymers, tetrapolymers, or polymers with five or more comonomers. The incorporation of additional comonomers may result in beneficial properties which are not available to copolymers. While the processes are described as comprising one or more steps, it should be understood that these steps may be practiced in any order or sequence unless otherwise indicated. These steps may be combined or separated. Finally, any number disclosed herein should be construed to mean approximate, regardless of whether the word "about" or "approximate" is used in describing the number. The appended claims intend to cover all such variations and modifications as falling within the scope of the invention.

What is claimed is:

1. An olefin homopolymer or interpolymer composition, comprising:

a) a backbone chain; and b) a plurality of long chain branches connected to the backbone;

c) a fraction of the composition having a weight averaged molecular weight, [Mw] $M_w$, of 100,000;

d) a fraction of the composition having a weight averaged molecular weight, [Mw] $M_w$, of 500,000; and e) a value of $[{}^2g'_{LCB}-{}^1g'_{LCB}]$ $g'_{2_{LCB}}-g'_{1_{LCB}}$ of less than about 0.22, where $[{}^1g'_{LCB}]$ $g'_{2_{LCB}}$ is the long chain branching index for the fraction of the composition having a $M_w$ of 100,000 and $[{}^2g'_{LCB}]$ $g'_{1_{LCB}}$ is the long chain branching index for the fraction of the composition having a $M_w$ of 500,000.

2. The composition of claim 1, wherein $[{}^2g'_{LCB}-{}^1g'_{LCB}]$ $g'_{2_{LCB}}-g'_{1_{LCB}}$ is less than or equal to 0.20.

3. The composition of claim 1, wherein [$^2g'_{LCB}$-$^1g'_{LCB}$] $g'_{2_{LCB}}$-$g'_{1_{LCB}}$ is less than or equal to 0.15.

4. The composition of claim 1, wherein [$^2g'_{LCB}$-$^1g'_{LCB}$] $g'_{2_{LCB}}$-$g'_{1_{LCB}}$ is less than or equal to 0.12.

5. The composition of claim 1, wherein the composition has a molecular weight distribution greater than 3.0.

6. The composition of claim 1, wherein the composition has a molecular weight distribution from greater than 3.0 to about 12.0.

7. The composition of claim 1 comprising a high molecular weight (HMW) component and a low molecular weight (LMW) component.

8. The composition of claim 7 wherein the composition is multimodal.

9. The composition of claim 7, wherein the composition is bimodal.

10. The composition according to [any one of claims 1, 7, 8, or 9] *claim 7*, wherein the HMW component has a Mw/Mn of about 1.5 to about 4.0.

11. The composition according to [any one of claims 1, 7, 8, or 9] *claim 7*, wherein the LMW component has a Mw/Mn of about 1.5 to about 4.0.

12. The composition according to [any one of claims 1, 7, 8, or 9] *claim 7*, wherein the HMW component has a Mw greater than about 300,000 g/mol.

13. The composition according to [any one of claims 1, 7, 8, or 9] *claim 7*, wherein the LMW component has a Mw less than about 200,000.

14. The composition of claim 1, wherein the composition is characterized by a DOS of about 5 or higher.

15. The composition of claim 1, wherein the composition is characterized by a DOS of about 5 to about 50,000.

16. The composition of claim 1, wherein the composition is characterized by a DOS of about 20 or higher.

17. The composition of claim 1, wherein the composition is characterized by a DOS of about 20 to about 50,000.

18. The composition of claim 1, wherein the composition is characterized by a DOS of 50 or higher.

19. The composition of claim 1, wherein the composition is characterized by a DOS of 100 or higher.

20. The composition of claim 1, wherein the composition is characterized by a DOS of 1000 or higher.

21. The composition of claim 1, wherein the composition is characterized by a DOS of 10000 or higher.

22. The composition according to [any one of claims 1, 7, 8, or 9] *claim 7*, wherein the HMW component has a molecular weight distribution of less than about 3.0 and the LMW component has a molecular weight distribution of less than about 3.0.

23. The composition according to [any one of claims 1, 7, 8, or 9] *claim 7*, wherein the HMW component and the LMW component have a substantially equal comonomer incorporation.

24. The composition according to [any one of claims 1, 7, 8, or 9] *claim 7*, wherein composition has a ratio of the molecular weight of the HMW component to the molecular weight of the LMW component, that is greater than about 10.

25. The composition according to [any one of claims 1, 7, 8, or 9] *claim 7*, wherein the HMW component comprises from greater than 0% to about 50% by weight of the total composition and the LMW component comprises from about 50% by weight to less than about 100% by weight of the total composition.

26. The composition according to [any one of claims 1, 7, 8, or 9] *claim 7*, wherein the HMW component comprises from greater than 1% to about 10% by weight of the total composition and the LMW component comprises from about 90% by weight to about 99% by weight of the total composition.

27. The composition according to [any one of claims 1, 7, 8, or 9] *claim 7*, wherein the HMW component comprises from greater than 2% to about 5% by weight of the total composition and the LMW component comprises from about 95% by weight to about 98% by weight of the total composition.

28. The composition of claim 1 wherein the composition has a melt strength (MS) that satisfies the following relationship:

$$MS \geq \frac{x}{I_2} + y$$

where x is greater than or equal to about 12.5 and y is greater than or equal to about 3.

29. The composition of claim 1 wherein the composition has a melt strength (MS) that satisfies the following relationship:

$$MS \geq \frac{x}{I_2} + y$$

where x is greater than or equal to about 12.5 and y is greater than or equal to about 4.5.

30. The composition of claim 1 wherein the composition has a melt strength (MS) that satisfies the following relationship:

$$MS \geq \frac{x}{I_2} + y$$

where x is greater than or equal to about 15.0 and y is greater than or equal to about 4.5.

31. The composition of claim 1 wherein the composition has a melt strength (MS) that satisfies the following relationship:

$$MS \geq \frac{x}{I_2} + y$$

where x is greater than or equal to about 20 and y is greater than or equal to about 7.5.

* * * * *